United States Patent
Schindler et al.

(10) Patent No.: US 12,527,773 B2
(45) Date of Patent: Jan. 20, 2026

(54) FLAVI-BLOCK: A PAN-FLAVIVIRUS INHIBITOR

(71) Applicant: Baden-Württemberg Stiftung GmbH, Stuttgart (DE)

(72) Inventors: Michael Schindler, Reutlingen (DE); Marcel Günther, Tubingen (DE); Kamyar Hadian, Munich (DE); Marcos Vinicius Pereira Gondim, Sicklerville, NJ (US); Natalia Ruetalo Buschinger, Tübingen (DE); Karl Kenji Schorpp, Munich (DE); Linda Wiltzer-Bach, Stolberg (DE)

(73) Assignee: Baden-Württemberg Stiftung GmbH, Stuttgart, DE (US)

( * ) Notice: Subject to any disclaimer, the term of this patent is extended or adjusted under 35 U.S.C. 154(b) by 434 days.

(21) Appl. No.: 18/248,512

(22) PCT Filed: Oct. 15, 2020

(86) PCT No.: PCT/EP2020/079010
§ 371 (c)(1),
(2) Date: Apr. 10, 2023

(87) PCT Pub. No.: WO2022/078602
PCT Pub. Date: Apr. 21, 2022

(65) Prior Publication Data
US 2023/0372310 A1    Nov. 23, 2023

(51) Int. Cl.
*A61K 31/428* (2006.01)
*A61P 31/14* (2006.01)

(52) U.S. Cl.
CPC .......... *A61K 31/428* (2013.01); *A61P 31/14* (2018.01)

(58) Field of Classification Search
CPC ............................ A61K 31/428; A61P 31/14
See application file for complete search history.

(56) References Cited

U.S. PATENT DOCUMENTS

| 2016/0074346 A1 | 3/2016 | Fraser et al. |
| 2017/0057978 A1* | 3/2017 | Iadonato .............. C07D 277/82 |

OTHER PUBLICATIONS

Kaila, N. et al., Identification and structural determination of a potent P-selectin inhibitor, 2001, Bioorg Med Chem vol. 9, pp. 801-806.

Sweeney N.L. et al., Benzothiazole and pyrrolone Falvivirus inhibitors targeting viral helicase, 2015, ACS Infect. Dis. vol. 1, pp. 140-148.

* cited by examiner

*Primary Examiner* — Timothy R Rozof
(74) *Attorney, Agent, or Firm* — HelixIP LLP

(57) ABSTRACT

The present invention relates to specific compounds for use in the prevention or treatment of viral infections caused by RNA viruses.

10 Claims, 43 Drawing Sheets

Figure 12:
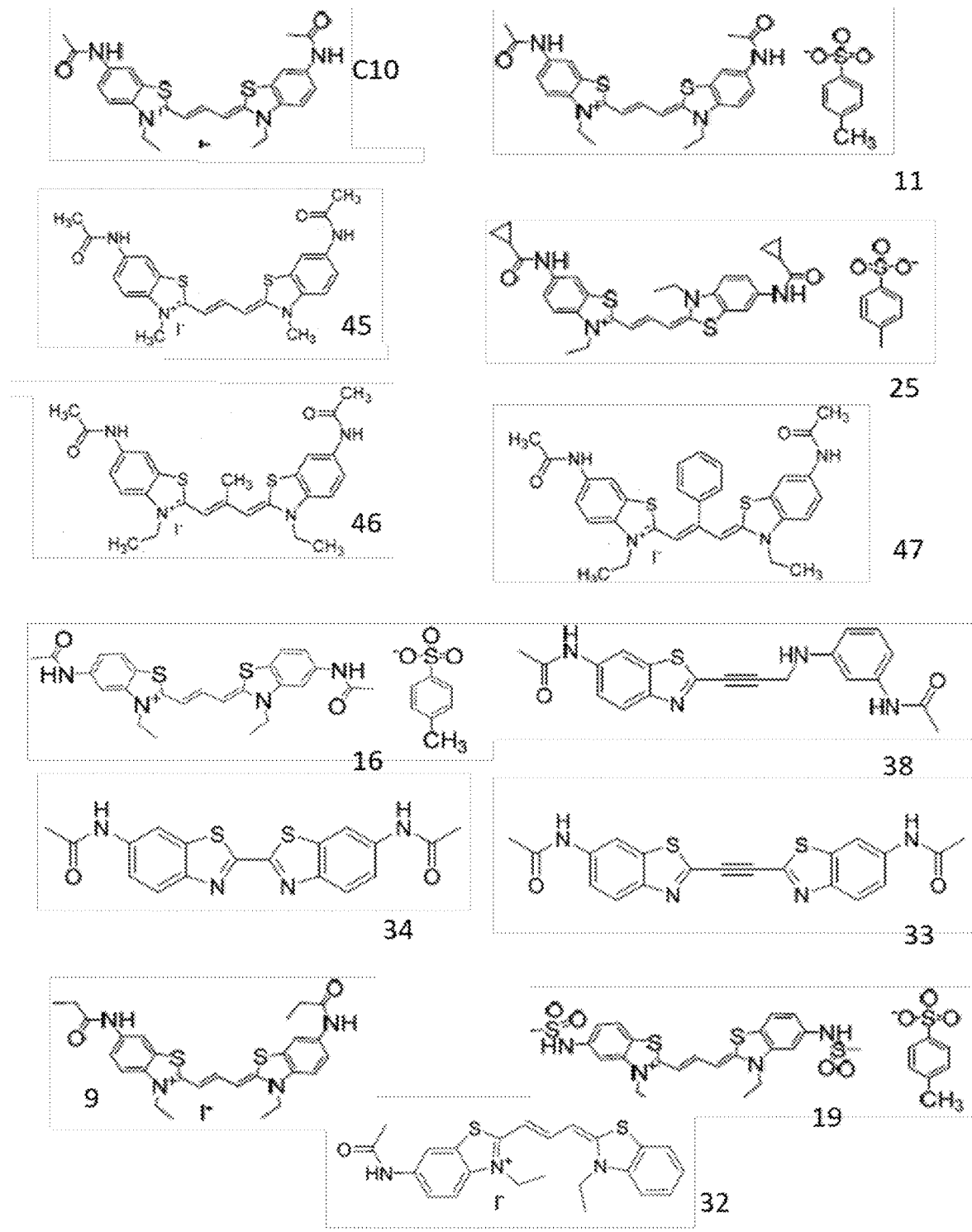

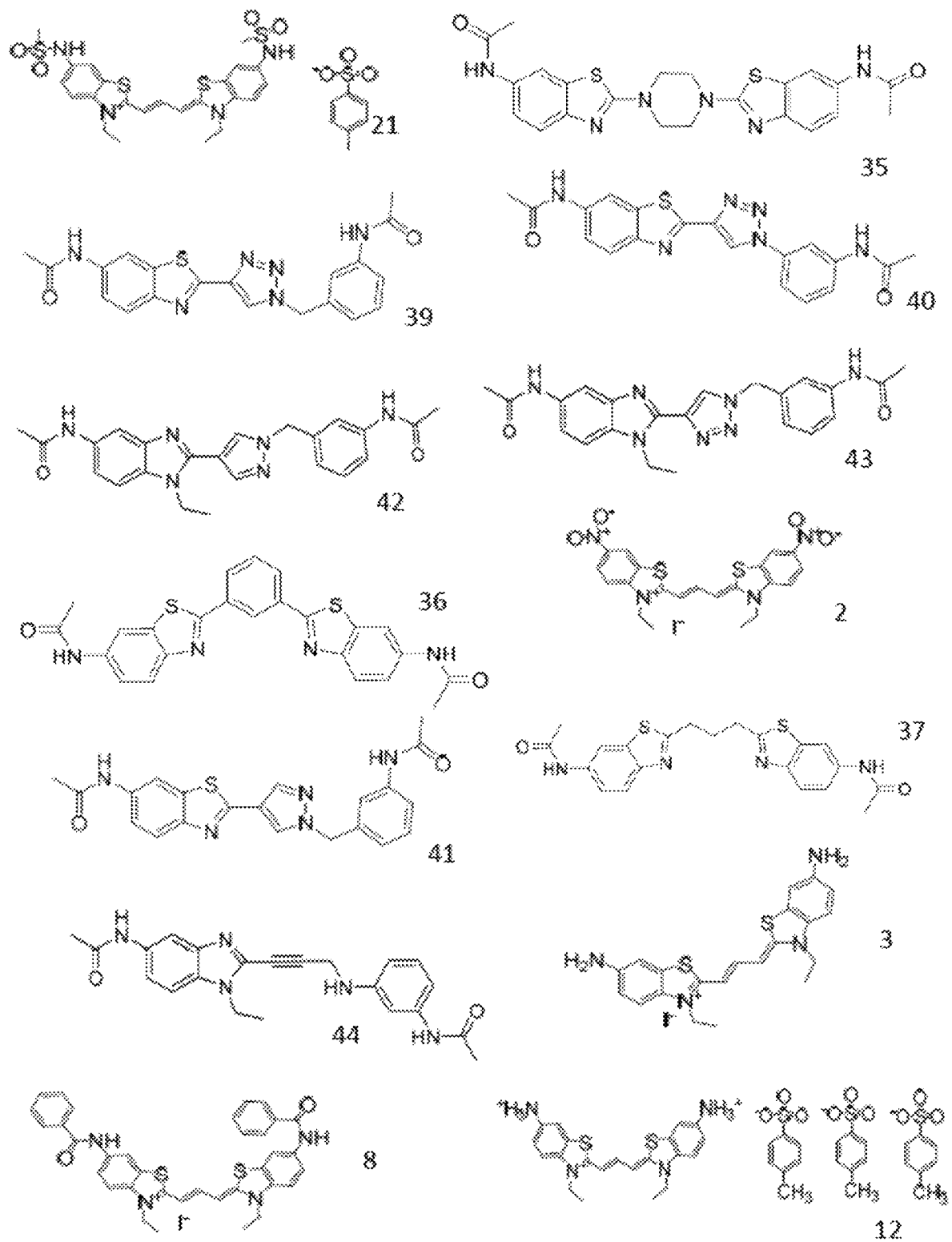
Figure 12 (con'd)

Figure 13 (cont'd)

$Y = -3.91 \cdot 10^{-8} x^2 + 0.000826x - 0.00103$ (correlation coefficient r = 0.9988)

FLAVI-BLOCK: A PAN-FLAVIVIRUS INHIBITOR

This application is a 371 of PCT/EP2020/079010, having an international filing date of Oct. 15, 2020, the content of which is incorporated by reference in its entirety.

The present invention relates to specific compounds for use in the prevention or treatment of viral infections caused by RNA viruses.

An RNA virus is a virus whose genome consists of ribonucleic acid (RNA). RNA virus is a collective term that does not define any taxonomic relations. In terms of taxonomy and classification, RNA viruses are divided into Group 3 with a double-stranded RNA genome, Group 4 with a single-stranded positive-sense RNA genome (ssRNA(+)), and Group 5 with a single-stranded negative-sense RNA genome (ssRNA(−)). For ssRNA(+) viruses, the genome sequence corresponds to that of the later mRNA which is translated into protein directly at the ribosomes. In the case of ssRNA(−) viruses, an RNA double strand is generated, whose newly formed complementary RNA strand corresponds to the mRNA and can be translated into protein.

A highly relevant group within the very numerous ssRNA (+) viruses is the family of Flaviviridae. This family includes the genera *Hepacivirus* and *Flavivirus*, both of which include viruses of human pathological relevance, such as Hepatitis C virus (HCV), Dengue virus (DENV), West-Nile virus (WNV), Zika virus (ZIKV), Tick-borne encephalitis virus (TBEV), Japanese encephalitis virus (JEV), Saint Louis encephalitis virus (SLEV), and Yellow fever virus (YFV), the first of the above belonging to the genus *Hepacivirus* and the latter to the genus *Flavivirus*.

150 to 200 million people worldwide are infected with HCV and estimated 390 million people per year get infected with the emerging DENV. HCV causes chronic infection of the liver, ultimately leading to liver cirrhosis and hepatocellular carcinoma, whereas DENV can cause hemorrhagic fever with a lethality of up to 25%. In addition, other emerging viruses are WNV and ZIKV.

In the last years, several drugs were approved by the FDA and also European regulatory authorities for the treatment of HCV, including first as well as second generation protease inhibitors (NS3/4) and RNA-dependent RNA (RdR)-polymerase inhibitors (NS5B). Early NS3/4 inhibitors were problematic due to adverse side effects as well as resistance development. However, upon the establishment of second generation protease inhibitors, as well as RdR-polymerase inhibitors, resistance development is strongly suppressed. Recent data indicates no or only low development of resistances and also interferon-free therapy regimens are feasible. Nevertheless, the barrier towards resistance regarding protease inhibitors is low. In contrast, RNA polymerase inhibitors have a high barrier towards resistance, but their potency seems limited against certain genotypes.

Current HCV inhibitors are targeted against the protease and RNA-polymerase. However, targeting an alternative step in the HCV life cycle, i.e., release of infectious particles and the HCV core protein, might be a very promising approach for the development of novel antiviral drugs. In particular, the HCV core protein, which forms the capsid, is highly conserved and it could, therefore, be expected that respective capsid inhibitors are active against all HCV genotypes. Moreover, other ssRNA(+) viruses, in particular other members of the family of Flaviviridae, have very similar capsid proteins with conserved structural elements, which could provide broad antiviral activity of respective release inhibitors against a wide range of viruses. There is currently no therapy for the treatment of DENV or other emerging flaviviruses. Hence, respective inhibitors targeting conserved flavivirus capsid structures could be the first direct acting antiviral drugs against a broad range of clinically highly relevant viruses.

Accordingly, the technical problem underlying the present invention is the provision of novel antiviral drugs that act against a broad range of such viruses.

The solution to the above technical problem is achieved by the embodiments characterized in the claims.

In particular, in a first aspect, the present invention relates to a compound according to Formula (I) for use in the prevention or treatment of a viral infection caused by an RNA virus:

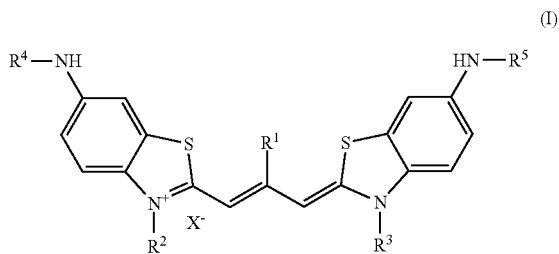

(I)

wherein
$R^1$ is H or methyl,
$R^2$ is methyl or ethyl,
$R^3$ is methyl or ethyl,
$R^4$ is H, acetyl, propionyl, benzoyl, cyclopropionyl, or methylsulfonyl,
$R^5$ is H, acetyl, propionyl, benzoyl, cyclopropionyl, or methylsulfonyl, and
$X^-$ is a monovalent anion.

In preferred embodiments, in the above Formula (I), $R^4$ and $R^5$ are, independently, acetyl, propionyl, benzoyl, cyclopropionyl, or methylsulfonyl, wherein acetyl is particularly preferred.

In preferred embodiments, the compound for use of the present invention is selected from the group consisting of

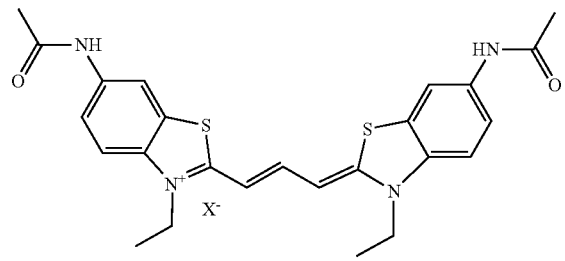

(Compound C10)

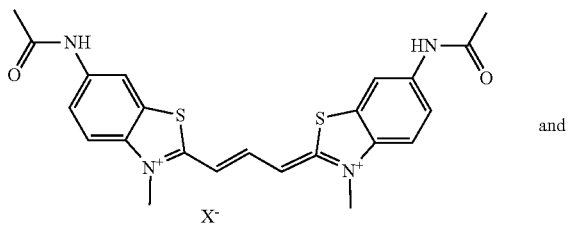

(Compound 45)

and

-continued (Compound 46)

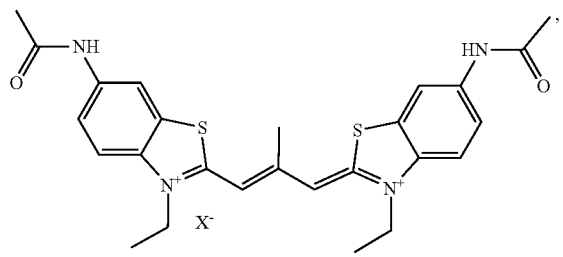

wherein compound C10 is particularly preferred.

The above compound C10, using iodide as exemplary anion $X^-$, has the IUPAC designation 6-acetamido-2-((1E,3E)-3-(6-acetamido-3-ethylbenzo[d]thiazol-2(3H)-ylidene) prop-1-en-1-yl)-3-ethylbenzo[d]thiazol-3-ium iodide.

Further, the above compound 45, using iodide as exemplary anion $X^-$, has the IUPAC designation 6-acetamido-2-((1E,3E)-3-(6-acetamido-3-methylbenzo[d]thiazol-2(3H)-ylidene)prop-1-en-1-yl)-3-methylbenzo[d]thiazol-3-ium iodide.

Furthermore, the above compound 46, using iodide as exemplary anion $X^-$, has the IUPAC designation 6-acetamido-2-((1E,3E)-3-(6-acetamido-3-ethylbenzo[d]thiazol-2(3H)-ylidene)-2-methylprop-1-en-1-yl)-3-ethylbenzo[d]thiazol-3-ium iodide.

Methods for the synthesis of the above compounds C10, 45, and 46 are known in the art.

The counter-ion $X^+$ present in the compounds of the present invention is not particularly limited and includes any, preferably pharmaceutically acceptable, monovalent anions known in the art. Specifically, $X^+$ can be selected from the group consisting of $I^-$, $Cl^-$, tosylate, and mesylate, wherein $I^+$ is particularly preferred. In this context, the counter-ion derives from the alkylating agent used during synthesis of the compound.

In preferred embodiments, the compound for use of the present invention is able to bind to a capsid protein of the RNA virus, and/or to crosslink the same.

The compounds of the present invention are advantageously characterized by a low half maximal inhibitory concentration ($IC_{50}$) and a high half maximal cytotoxic concentration ($CC_{50}$). Unwanted side effects can thus be minimized.

The compounds of the present invention are for use in the prevention or treatment of a viral infection caused by an RNA virus. In preferred embodiments, said viral infection is caused by a single-stranded positive-sense RNA (ssRNA(+)) virus, preferably wherein the ssRNA(+) virus is a member of the family Flaviviridae, more preferably wherein the ssRNA (+) virus is a member of the genus *Hepacivirus* or the genus *Flavivirus*.

In specific embodiments, said virus is selected from the group consisting of Hepatitis C virus (HCV), Dengue virus (DENV), Zika virus (ZIKV), West-Nile virus (WNV) and the closely related Kunjin virus (KUNV), Tick-borne encephalitis virus (TBEV), Japanese encephalitis virus (JEV), Saint Louis encephalitis virus (SLEV), and Yellow fever virus (YFV), wherein HCV and DENV are particularly preferred.

In other specific embodiments, the RNA virus infection which is to be prevented or treated in the present invention is causative of a condition or disease, selected from the group consisting of Hepatitis C, Dengue fever, Zika fever or Zika virus disease, West-Nile fever, Kunjin encephalitis, Tick-borne encephalitis, Japanese encephalitis, Saint Louis encephalitis, and Yellow fever, wherein Hepatitis C and Dengue fever are particularly preferred.

The subject in which a viral infection caused by an RNA virus is to be prevented or treated according to the present invention is preferably a mammalian subject, more preferably a human subject.

In a second aspect, the present invention relates to a pharmaceutical composition, comprising a compound as defined for the first aspect of the present invention.

In preferred embodiments, the pharmaceutical compositions of the present invention further comprise at least one of a pharmaceutically acceptable carrier, diluent and excipient. Respective carriers, diluents and excipients are not particularly limited and are known in the art.

Further, the pharmaceutical compositions of the present invention can contain one or more further therapeutic agents, e.g. antiviral agents, as known in the art.

In this aspect, all definitions and limitations defined for the first aspect of the present invention apply in an analogous manner.

In a third aspect, the present invention relates to a method for the prevention or treatment of a viral infection caused by an RNA virus, comprising the step of administering a prophylactically or therapeutically effective amount of a compound as defined for the first aspect of the present invention and/or a pharmaceutical composition as defined for the second aspect of the present invention to a subject in need thereof.

In this aspect, all definitions and limitations defined for the first or second aspect of the present invention apply in an analogous manner.

Specifically, in preferred embodiments, said viral infection is caused by a single-stranded positive-sense RNA (ssRNA(+)) virus, preferably wherein the ssRNA(+) virus is a member of the family Flaviviridae, more preferably wherein the ssRNA(+) virus is a member of the genus *Hepacivirus* or the genus *Flavivirus*.

In specific embodiments, said virus is selected from the group consisting of Hepatitis C virus (HCV), Dengue virus (DENV), Zika virus (ZIKV), West-Nile virus (WNV), Kunjin virus (KUNV), Tick-borne encephalitis virus (TBEV), Japanese encephalitis virus (JEV), Saint Louis encephalitis virus (SLEV), and Yellow fever virus (YFV), wherein HCV and DENV are particularly preferred.

In other specific embodiments, the RNA virus infection which is to be prevented or treated in present invention, is causative of a condition or disease, selected from the group consisting of Hepatitis C, Dengue fever, Zika fever or Zika virus disease, West-Nile fever, Kunjin encephalitis, Tick-borne encephalitis, Japanese encephalitis, Saint Louis encephalitis, and Yellow fever, wherein Hepatitis C and Dengue fever are particularly preferred.

The subject in which a viral infection caused by an RNA virus is to be prevented or treated according to the present invention is preferably a mammalian subject, more preferably a human subject.

Suitable doses and dosage regimens, as well as suitable prophylactically or therapeutically effective amounts, for the uses and methods of the present invention are not particularly limited and can be easily determined by the person skilled in the art. By way of example, a suitable dose or a suitable prophylactically or therapeutically effective amount of the compounds of the present invention may be in the rage of 1 to 10 mg/kg body weight, preferably 3 to 7 mg/kg body weight, more preferably about 5 mg/kg body weight.

As used herein, the term "about" is a modifier of ±10% of a specified value, preferably ±9%, ±8%, ±7%, ±6%, ±5%, ±4%, ±3%, ±2%, or ±1%. By way of example, the term "about 5 mg/kg body weight" can refer to a range of "4.5 mg/kg body weight to 5.5 mg/kg body weight".

In the present invention, small molecular weight compounds inhibiting the release of infectious RNA viruses and/or inhibiting their infectivity, including Hepatitis C virus (HCV), Dengue virus (DENV), West-Nile virus (WNV), Kunjin virus (KUNV) and Zika virus (ZIKAV), in the nanomolar range were discovered. These compounds act on the release of infectious particles from infected cells and the infectivity of particles by interfering with the viral capsid through interaction with single core proteins. It could be shown that the compounds of the present invention interact with capsid protein and crosslink the same. Altogether, the herein discovered compounds have broad antiviral activity against RNA viruses, in particular members of the family Flaviviridae, most likely due to the highly conserved structure of capsid proteins among said viruses. Members of said viral family, especially DENV and WNV, are emerging vector borne viral infections with high pathogenic potential and a dramatic increase in incidence in the last years.

Specifically, in an initial FRET-based screening approach to identify drug target candidates for the inhibition of Hepatitis C virus Core multimerization, compound C10 as described herein was identified as a promising antiviral agent. In the last years, the antiviral activity of C10 was tested against various flaviviruses including ZIKAV, DENV and WNV, which are all emerging vector borne diseases. C10 is also active against these pathogens in the nanomolar range. Furthermore, structure-activity relationship (SAR) studies were performed and the "chemospace" around compound C10 explored. In these studies, variants were found having superior activity and less toxicity. Additionally, structural analyses were performed and the mode of action verified which is most likely binding of the compounds of the present invention to viral capsid proteins and, thus, induction of cross-linking leading to the loss of viral particle infectivity. For in vivo testing, compound C10 was administered to mice. In general, C10 was not toxic at high concentrations, exerted microsomal and plasma stability and had a half-life of about 2 h in serum.

The figures show:

FIG. 1:

Screening of Small Molecule Inhibitors

Substances of the Chemical Diversity Library (2688 in total) with a final concentration of 10 μM were added to HCV Core-YFP and HCV Core-CFP co-transfected cells, and the intensity of the FRET signal was measured with a High Content Imager (Operetta, Perkin Elmer). RFU=relative fluorescence units, grey dot=no inhibitory effect, red dot=inhibitory effect of 50% reduction of the FRET signal.

FIG. 2:

Validation of Antiviral Effects of 20 Hits

Huh7.5 cells were electroporated with HCV-JC1-Luc (reporter virus expressing luciferase via IRES) RNA and treated 24 h later with the best 20 candidates (10 μM). After another 24 h the supernatants were harvested. To quantify infectious particles, untreated Huh7.5 cells were inoculated with the supernatants and 36 h later the luciferase activity was measured. The viability of the same cells was determined 24 h after treatment with inhibitor by MTT assay (tetrazolium salt which is reduced in metabolically active cells resulting in a color change). For both parameters, 100% corresponds to the release or viability of the untreated or DMSO treated control. uninf.=not infected; untr.=not treated. Mean values and SD were derived from n =3 independent infections.

FIG. 3:

Assessment of Potential C10 Side Effects on Expression and Secretion of an Unrelated Protein Huh7.5 cells were electroporated with a plasmid encoding *Gaussia* luciferase, treated with C10 and *Gaussia* luciferase activity was analyzed from supernatants. Reduction of *Gaussia* luciferase activity at concentrations higher than 40 μM might be attributed to adverse effects.

Figure 4A:
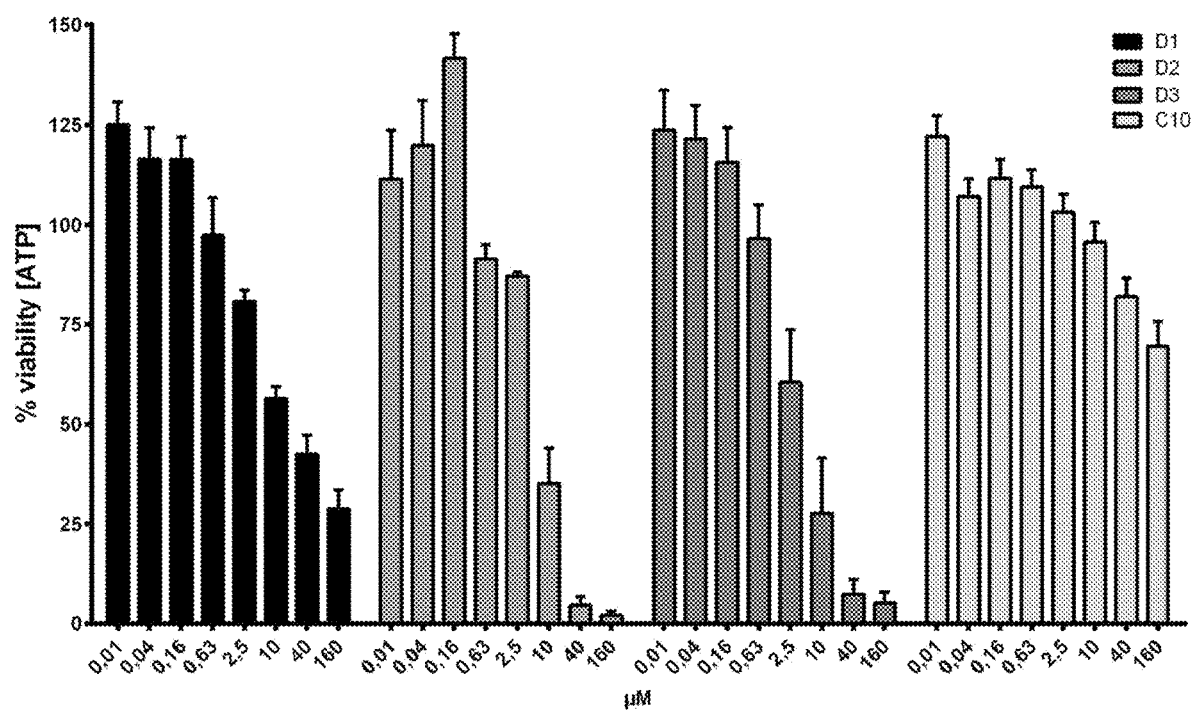

FIG. 4:

Assessment of Cytotoxicity (A) Huh7.5 cells ($1.5 \times 10^4$ cells/well) were seeded in DMEM supplemented with 10% FCS, 1 mM sodium pyruvate, 1% non-essential amino acids and 2 mM glutamine into a 96-well plate and treated in triplicates with the indicated concentrations (μM) of C10, D1, D2, and D3 for 24 h. The final concentration of DMSO in all samples was 0.5%. Cell viability was measured via the presence of ATP using the Promega Cell Titer Glo kit according to the manufacturer's instructions. Luminescence was detected using the Cytation3 by Biotek. For data analysis all values were normalized to the DMSO control and shown as percent viability in a bar diagram; n≥6 with SEM. (B) The same set of data as shown in FIG. 4A was plotted in a line graph. (C) The graph results from an experiment whose setup is comparable to the one resulting in FIG. 4A except that HeLa-LC5-RIC cells ($1.0 \times 10^4$ cells/well) were used; n=3 with SEM. (D) As for FIG. 4A, Huh7.5 cells ($1.0 \times 10^4$ cells/well) were seeded and incubated with C10 at the indicated concentrations for the indicated time points before measurement of viability using the Promega Cell Titer Glo kit. For data analysis, all values were normalized to the DMSO control and shown as percent viability in a bar diagram; n≥6 with SEM.

FIG. 5:

Antiviral Effect on HCV (Virus Release)

Figure 5A:
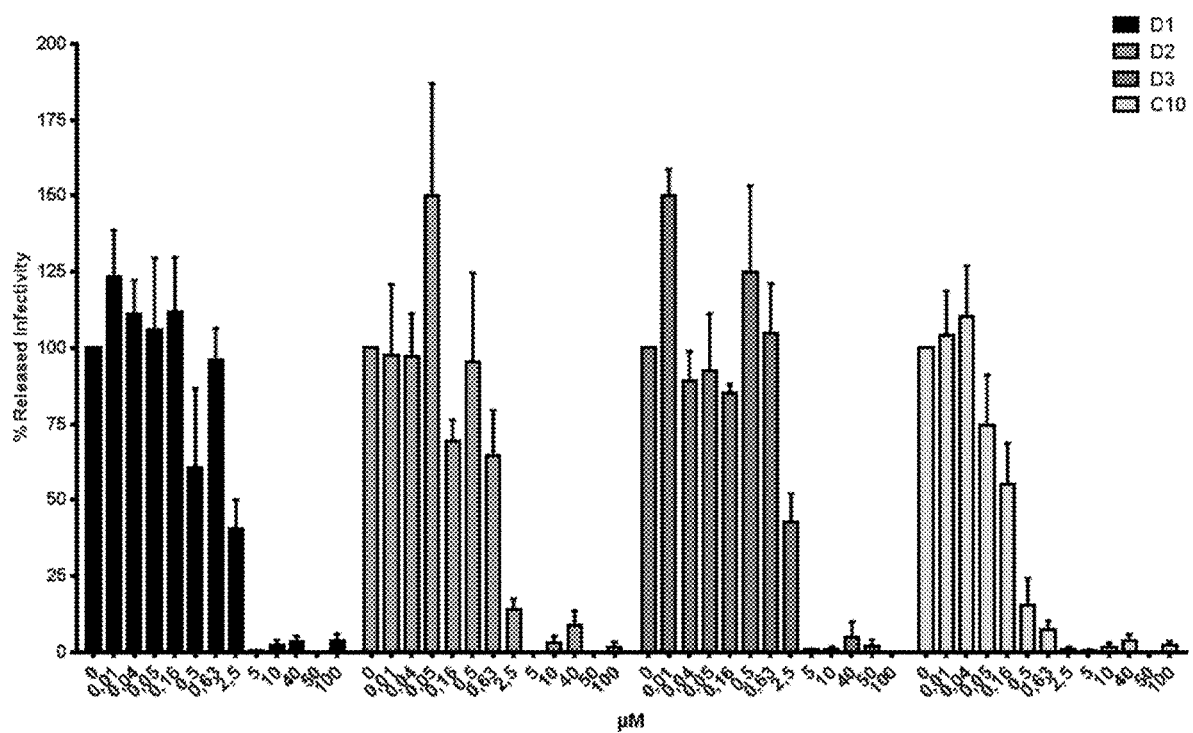

(A) Huh7.5 cells ($4 \times 10^6$ cells/100 μl) were electroporated with 10 μg RNA of Jc1-Luc-IRES using the Neon Transfection System by Thermo Fisher with 1 pulse at 1300 V for 30 ms. Electroporated cells were resuspended in DMEM supplemented with 10% FCS, 1 mM sodium pyruvate, 1% non-essential amino acids and 2 mM glutamine and seeded into a 96-well plate ($2 \times 10^4$ cells/well). 48 h after electroporation medium was exchanged and cells were treated in triplicates with the indicated concentrations (μM) of C10, D1, D2, and D3 for 24 h (100 μl total volume/well). The final concentration of DMSO in all samples was 0.5%. Supernatants (90 Pb) were used to infect naive Huh7.5 cells ($1.5 \times 10^4$ cells/well). 2 h after infection, 90 μl of fresh complete medium was added and cells were incubated for 48 h. Reinfected cells were lysed in 60 μl luciferase extraction buffer (0.1 M potassium phosphate pH 7.8, 1% Triton-X-100, 1 mM dithiothreitol), of which 40 μl were used for analysis of firefly luciferase activity. Luminescence was detected using the Cytation3 by Biotek. For data analysis, all values were normalized to the DMSO control and shown as percent infectivity in a bar diagram; n≥6 with SD. (B) The same sets of data as shown in FIG. 5A were plotted in a line graph.

FIG. 6:

Therapeutic Index (Virus Release)

Shown is a graph displaying the $CC_{50}$ and corresponding $EC_{50}$ values for derivatives D1 (A), D2 (B) and D3 (C), and compound C10 (D).

FIG. 7:

Interaction with HCV Core Protein

Purified protein (2.7 µg of core protein containing residues 1-117) was mixed with different concentrations of C10 or D1 and with or without the crosslinker disuccinimidyl suberate (DSS, Thermofisher) and incubated at room temperature (RT) for 1 h. The crosslinking reaction was quenched by addition of 1 µl 1 M glycine and further incubation for 15 min at RT. Samples were mixed with Laemmli buffer and boiled for 10 min, then incubated at 4° C. for 15 min before separation using 12% SDS-PAGE. Shown is a representative Western blot probed with anti-Core antibody (1:1000, clone C7-50 by Abcam). Bands of the size expected for dimeric and monomeric Core are indicated.

FIG. 8:

Antiviral Effect on DENV (Virus Release and Entry)

(A) Vero cells were seeded and infected with DENV-2 at a multiplicity of infection (MOI) of 5. For co-treatment cells were incubated with a premixed suspension of drug and virus, for post-treatment with virus only for 2 h. Cells were subsequently washed with PBS and cultivated for co-treatment in DMEM supplemented with 2% FCS, for post-treatment in DMEM supplemented with 2% FCS spiked with the indicated concentrations of C10. The drug containing medium for post-treated cells was removed after 2 h and replenished with fresh DMEM supplemented with 2% FCS. 24 h after infection the supernatants were used for a Plaque assay. (B) RNA extraction; n=3 with SEM. (C, D) Cells were lysed for Western blot analysis using antibodies against viral proteins NS3 and NS5 and tubulin as a loading control.

FIG. 9:

C10 Inhibits DENV Infection

Vero cells were infected with DENV1-4 at an MOI of 1 for 2 h (post infection, p.i., (A)), after which virus was removed, and fresh maintenance medium containing 2% FCS together with the indicated concentration of C10 added. For co-treat condition (c.t., (B)), Vero cells were infected with DENV1-4 at an MOI of 1 in the presence of C10 for 2 h, followed by removal of the virus/C10 inoculums, and addition of fresh 2% fetal calf serum maintenance medium. Culture medium was collected 22 h later, and viral titers determined by plaque assay or RT-qPCR (C). Results represent the mean ±SD for duplicate wells from a single assay, representative of 2 independent experiments (cf. Tables 2A and 2B, infra, for pooled data).

FIG. 10:

C10 Inhibits ZIKV Infection

Vero cells were infected with ZIKV at an MOI of 1 for 2 h (post infection), after which virus was removed, and fresh maintenance medium containing 2% FCS together with the indicated concentration of C10 added. For co-treat condition, Vero cells were infected with ZIKV at an MOI of 1 in the presence of C10 for 2 h, followed by removal of the virus/C10 inoculums, and addition of fresh 2% fetal calf serum maintenance medium. Culture medium was collected 22 h later, and viral titers determined by plaque assay or RT-qPCR. Results represent the mean ±SD for duplicate wells from a single assay (cf. Table 2 for pooled data).

FIG. 11:

C10 Inhibits KUNV Infection

Vero cells were infected with KUNV at an MOI of 1 for 2 h (post infection), after which virus was removed, and fresh maintenance medium containing 2% FCS together with the indicated concentration of C10 added. For co-treat condition, Vero cells were infected with KUNV at an MOI of 1 in the presence of C10 for 2 h, followed by removal of the virus/C10 inoculums, and addition of fresh 2% fetal calf serum maintenance medium. Culture medium was collected 22 h later, and viral titers determined by plaque assay or RT-qPCR. Results represent the mean ±SD for duplicate wells from a single assay, representative of 2 independent experiments (cf. Table 2 for pooled data).

FIG. 12:

A set of derivatives of compounds C10.

FIG. 13:

Purification and Characterization of HCV and DENV Capsid Proteins

For both capsid proteins, a scheme of the construct used for expression in $E.coli$ is shown. Purification results were analyzed by 18% SDS-PAGE and Coomassie staining. SEC was done using a S200 16/60 column in an ÄKTA Pure system. The CD spectrum was recorded for a 0.3 mg/mL concentrated protein using a J-720 spectropolarimeter, Jasco. IEX: ionic exchange; FT: flow-through; b/GF: before gel filtration.

FIG. 14:

C10 Shows a Crosslinking Effect Specific for Flavivirus Capsid Proteins (A) Recombinant HCV core D1 domain at a concentration of 10 µM was incubated with increasing concentrations of C10, from 0 to 100 µM for 30 minutes at RT. The result of the reaction was analyzed by 15% SDS-PAGE followed by Western blot with an HCV core antibody. The same experiment was done for recombinant DENV capsid protein, using a 10 µM concentration of C10. The different species formed are indicated with arrows. (B) To assess the specificity of C10, GFP and HIV capsid proteins were incubated with C10. DSS was included as a positive control. C10 was tested from 0 to 100 µM and DSS from 0 to 5 mM as indicated by the producer. The sizes of monomer and dimer for both proteins are indicated. The run was performed in 12% SDS-PAGE. Specific antibodies against each of the proteins were used in each case.

FIG. 15:

Analysis of Antiviral Activity and Cytotoxicity of C10 and its Derivatives (A) Antiviral activity was assessed using the RLuc reporter gene, which is expressed via a T2A tag with the rest of the viral genome, both for HCV and DENV. Huh7.5 viral producing cells were treated for 48 h and 24 h respectively, using DMSO as the negative control, C10 and the 26 dimeric derivatives of C10 at 1 and 10 µM concentrations. The supernatant of the different conditions was used to re-infect naïve cells, which were then tested in an RLuc assay, 72 or 24 h post-infection. The graphs show the percentage of reduction in RLuc signal normalized against DMSO. The percentage of reduction is color-coded according to the reference. The cytotoxicity of those compounds was tested using the CellTiterGlo kit from Promega. Naïve cells were seeded in 96-well plates and treated with the compounds during 48 h. The graph shows the percentage of viable cells after the treatment and is color-coded as the reference indicates. (B) The IC50 value for C10, N°45 and N°46 was calculated against HCV with the same experimental approach described in A, but using serial dilutions of the compounds from 20 to 0.0024 µM. IC50 values were calculated by GraphPad 8 using an algorithm to fit a non-linear regression curve. The values and the most relevant parameters of the regression are listed in the table.

Figure 14A:
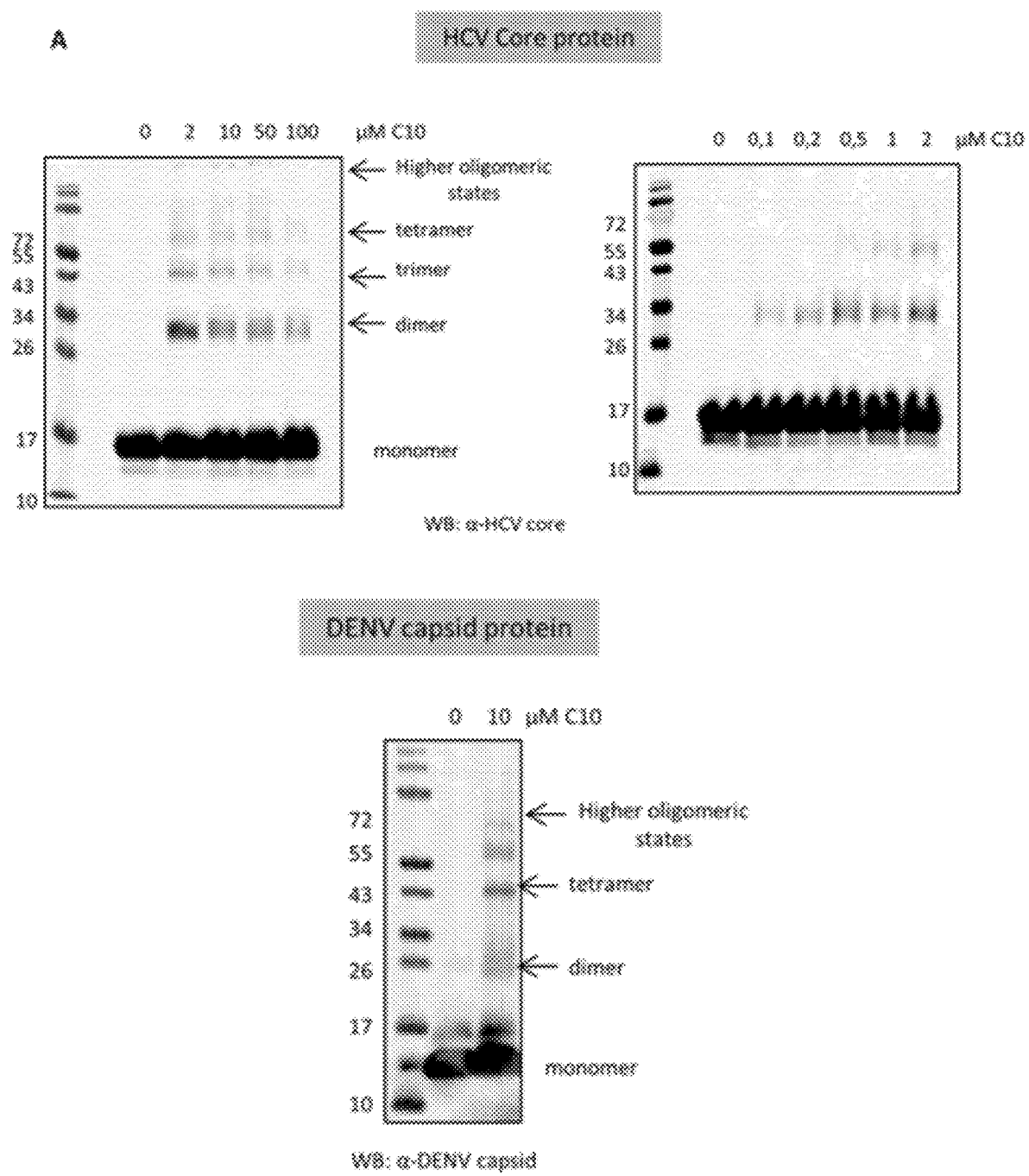

FIG. 16:

Crosslinking Ability of the C10 Derivatives Against HCV and DENV Capsid Proteins The same experimental design as in FIG. 14A was used. The different compounds were tested at a concentration of 10 µM and the result was detected by Western blot.

FIG. 17:

Effect of C10 on Zebrafish Development and Hematopoietic Stem Cell Formation

Zebrafish embryos were exposed 20-30 min after fertilization to differing concentrations of the compounds C10 and D1 (5 µM; 15 µM; 25 µM) or to medium containing the corresponding solvent (DMSO) concentration. Therefore, 3-5 embryos were sorted into each of three wells of a 96 well plate containing 200 µl of medium. For phenotype analysis, triplicates were imaged after 6-7 h post fertilization (hpf) at approximately shield stage, after 24 hpf and after 48 hpf. Dead +unfertilized embryos were removed. For imaging at 24 hpf +48 hpf; embryos were anesthetized using MESAB. (A) Diagramm showing the percentage of embryos at each time point either developing normal (blue color) or with the indicated phenotype. (B) representative images of embryos treated with the indicated compounds, or controls at the respective time points. (C) To additionally elucidate the influence on hematopoietic stem cell formation, approx. half of the embryos were sampled at 36 hpf and an in situ staining for runx-1+c-myb was performed. Shown are representative images of hematopoietic stem cell formation with the treatment indicated.

FIG. 18:

Plasma Interference with Compound C10 and Internal Standard

Chromatographic graphs.

FIG. 19:

Calibration Curve for the Quantification of C10 (weight=1/x)

The regression analysis of compound C10 was performed by plotting the peak area ratio (y) against the compound concentration in calibration solutions (x, ng/ml). The validity of the calibration curve (relationship between peak area and concentration of compound) is proved by the correlation coefficient (R) calculated for the quadratic regression.

FIG. 20:

Plasma Concentration-Time Curve of Compound C10

Plasma concentration-time curve of compound C10 in male Balb/c mice following intravenous (5 mg/kg) administration (n=4).

FIG. 21:

Summary of the Results of the PK Study for Compound C10 in Mice

Plasma levels of C10 following PO and IV dosing in male Balb/c mice.

FIG. 22:

Stability Data

Plasma stability data for test and reference compounds.

FIG. 23:

Stability Data

Mouse microsomal stability data for test compound and 2 reference (Imipramine and Propranolol) compounds.

The present invention will be further illustrated by the following examples without being limited thereto.

EXAMPLES

Example 1

Screening of a Substance Library of Low Molecular Weight Compounds

A FRET-based screening approach was chosen to identify drug candidates with respect to the inhibition of RNA viruses. Hepatitis C virus (HCV) was chosen as a representative virus with huge clinical relevance and the approach was to screen for substances that inhibit self-interaction of the HCV core protein. The "Chemical Diversity Library" with a total of 2688 compounds served as substance library.

Figure 1:
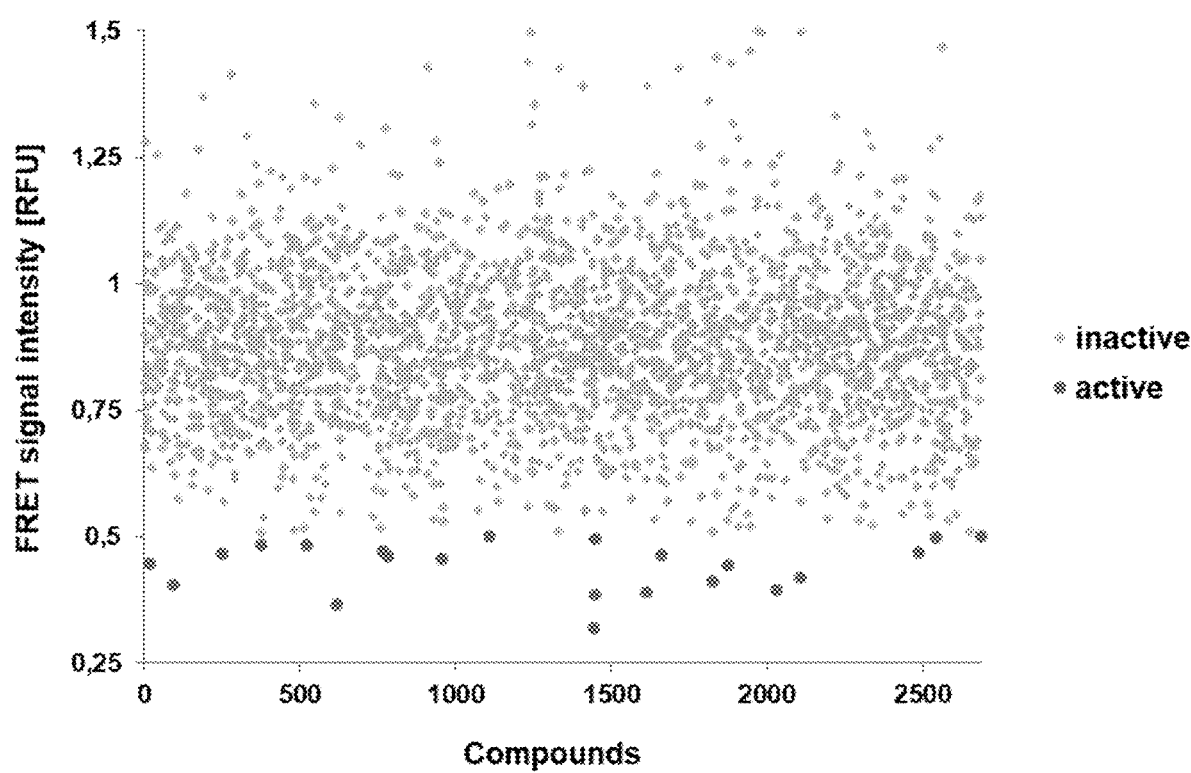

The substances were added to HCV-Core-YFP and HCV-Core-CFP co-transfected cells in a final concentration of 10 µM and the intensity of the FRET signal was measured with a high content imager (Operetta, Perkin Elmer). The result is shown in FIG. 1. It was found that 0.8 % of all tested compounds yielded positive hits.

Example 2

Validation of the Antiviral Effects of 20 Hits

Huh7.5 hepatocellular carcinoma cells were electroporated with HCV-JC1-Luc (reporter virus expressing luciferase via IRES) RNA and treated 24 h later with the best 20 candidates (10 µM) identified in Example 1. After another 24 h, the supernatants were harvested. To quantify infectious particles, untreated Huh7.5 cells were inoculated with the supernatants and luciferase activity was measured 36 h later (FIG. 2).

Figure 2:
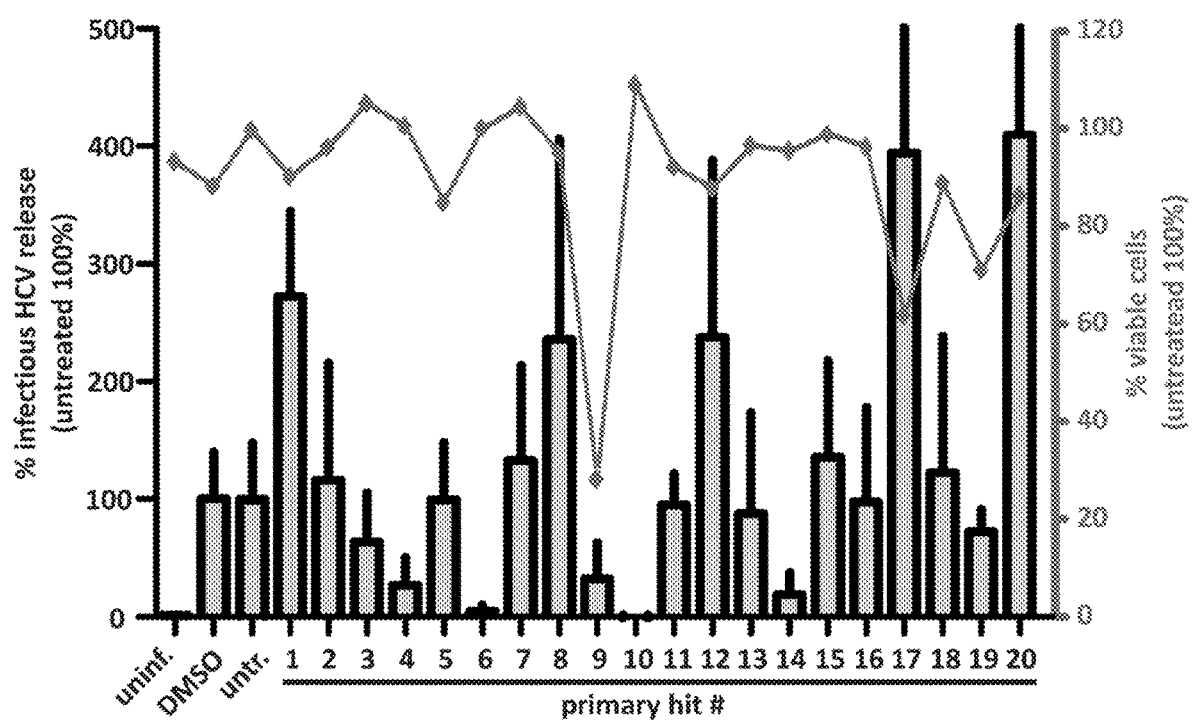

The viability of the same cells was determined 24 h after treatment with the candidate substances by MTT assay (tetrazolium salt reduced in metabolically active cells resulting in a color change) (FIG. 2). For both parameters, 100% of release or viability corresponds to the untreated or DMSO-treated control.

It is shown that compound C10 has the highest antiviral activity with no negative effect on cell viability.

Example 3

Influence on Protein Expression and Secretion

Figure 3:
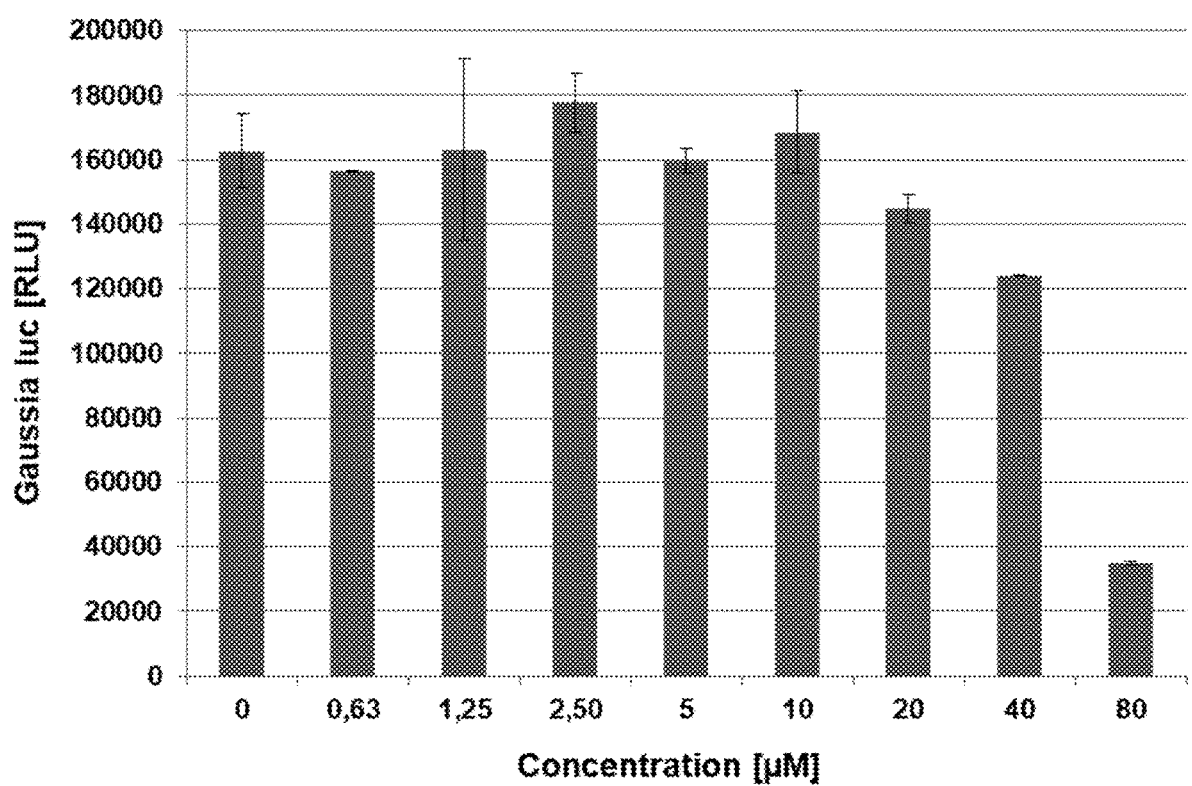

To test the influence of compound C10 on protein expression and secretion, Huh7.5 cells were electroporated with a plasmid encoding *Gaussia* luciferase, treated with C10 and luciferase activity was analyzed in the supernatants. A reduction in *Gaussia* luciferase activity at concentrations >40 µM was observed, which might be related to effects of C10 on the activity of the luciferase at high concentrations or potential cell stress. The result is shown in FIG. 3.

It is shown that only at very high concentrations of over 40 µM a negative impact on protein expression and secretion occurs, indicating a good therapeutic tolerance of the compound. Furthermore, C10 has in general no unspecific interference with the enzymatic activity of the luciferase.

Example 4

Cytotoxicity

In a further experiment, it was tested whether compound C10 according to the invention is cytotoxic. Further, three derivatives of compound C10, i.e., compounds D1, D2, and D3 as shown below, were included in this assay.

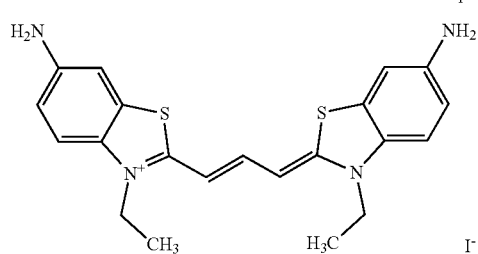

Compound D1

(6-amino-2-[(1E)-3-[(2Z)-6-amino-3-ethyl-2,3-dihydro-1,3-benzothiazol-2-ylidene]prop-1-en-1-yl]-3-ethyl-1,3-benzothiazol-3-ium iodide)

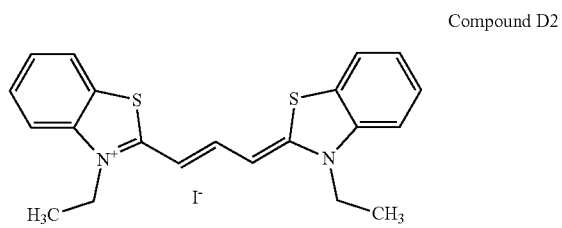 [SMILES: CCN1/C(=C/C=C/c2sc3ccccc3[n+]2CC)Sc2ccccc21 ; [I-]]

Compound D2

(3-ethyl-2-[(1E)-3-[(2Z)-3-ethyl-2,3-dihydro-1,3-benzothiazol-2-ylidene]prop-1-en-1-yl]-1,3-benzothiazol-3-ium iodide)

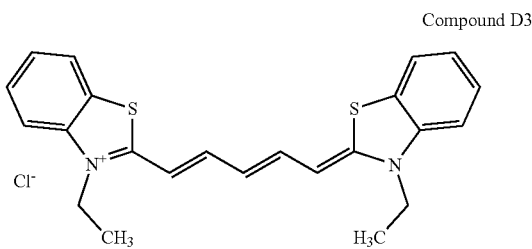 [SMILES: CCN1/C(=C/C=C/C=C/c2sc3ccccc3[n+]2CC)Sc2ccccc21 ; [Cl-]]

Compound D3

(3-Ethyl-2-[(1E)-3-[(2Z)-3-ethyl-6-iodo-2,3-dihydro-1,3-benzothiazol-2-ylidene]prop-1-en-1-yl]-6-iodo-1,3-benzothiazol-3-ium chloride) [Is this correct?]

For this purpose, Huh7.5 cells ($1.5 \times 10^4$ cells/well) were seeded in DMEM with 10% FCS, 1 mM sodium pyruvate, 1% non-essential amino acids and 2 mM glutamine in a plate with 96 wells and treated in triples for 24 h with different concentrations of compound C10 and the derivatives D1, D2, and D3. The final concentration of DMSO in all samples was 0.5%. Cell viability was measured by the presence of ATP using the Promega Cell Titer Glo Kit according to the manufacturer's instructions. Luminescence was detected using a Biotek Cytation3.

In the analysis of the data, all values were normalized against the DMSO control and presented in terms of percentage viability. The result is shown in the bar chart of FIG. 4A and the line chart of FIG. 4B; n≥6 with SEM.

Figure 4B:
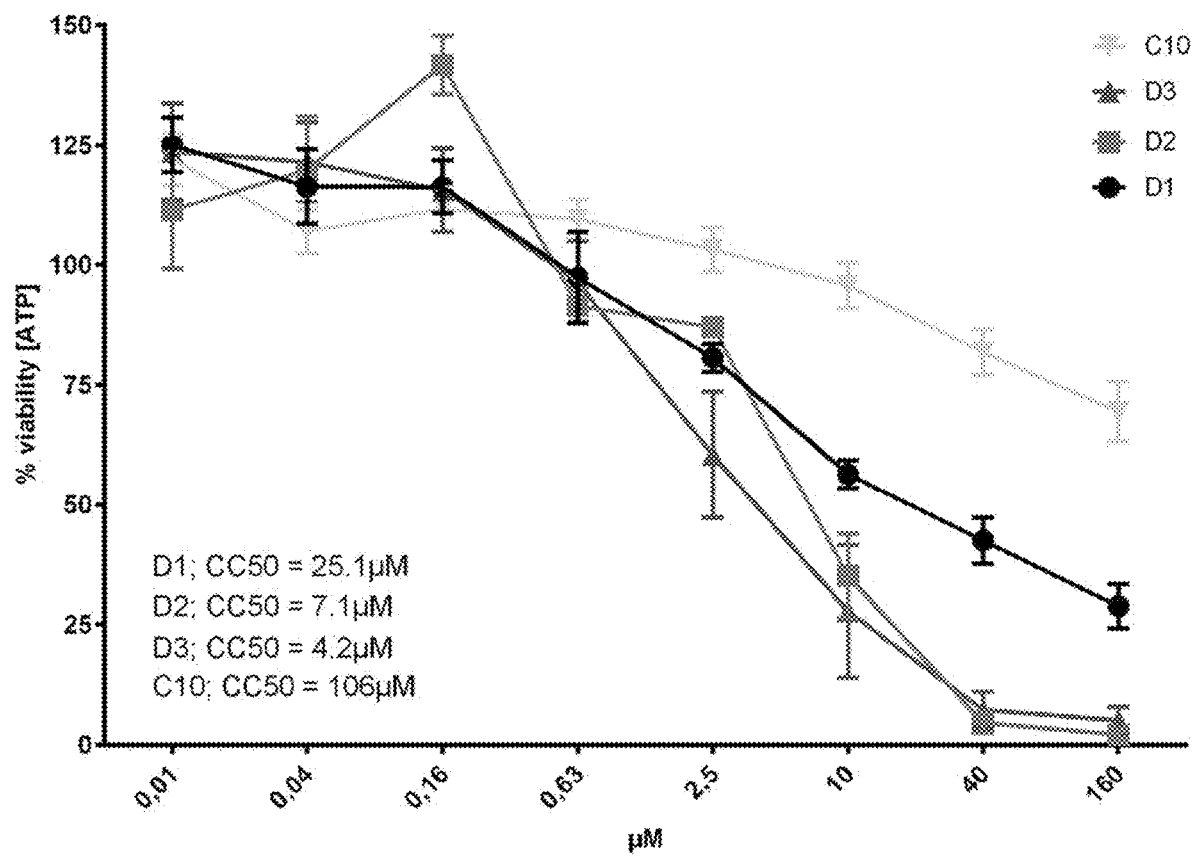
Figure 4C:
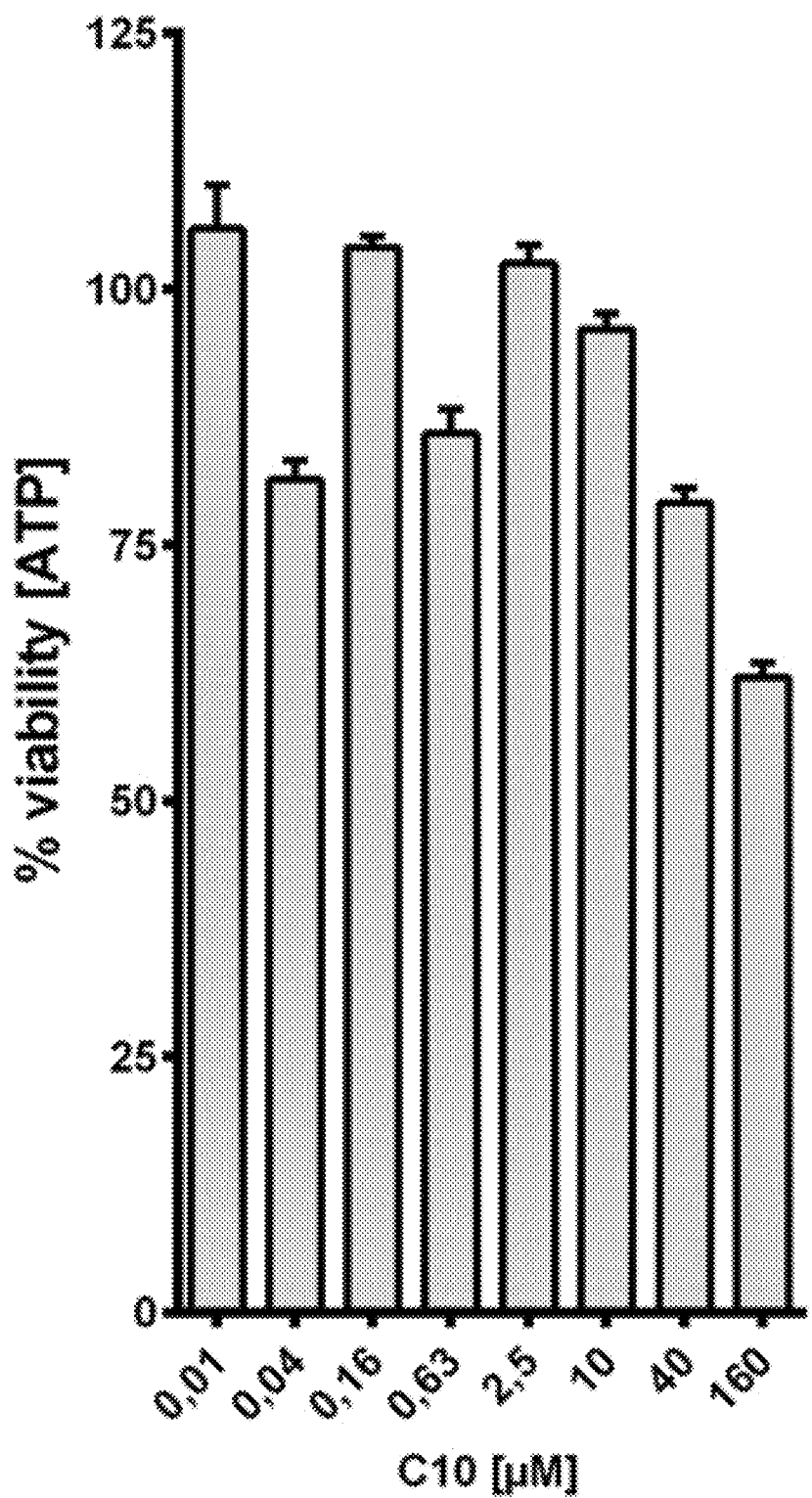
Figure 4D:
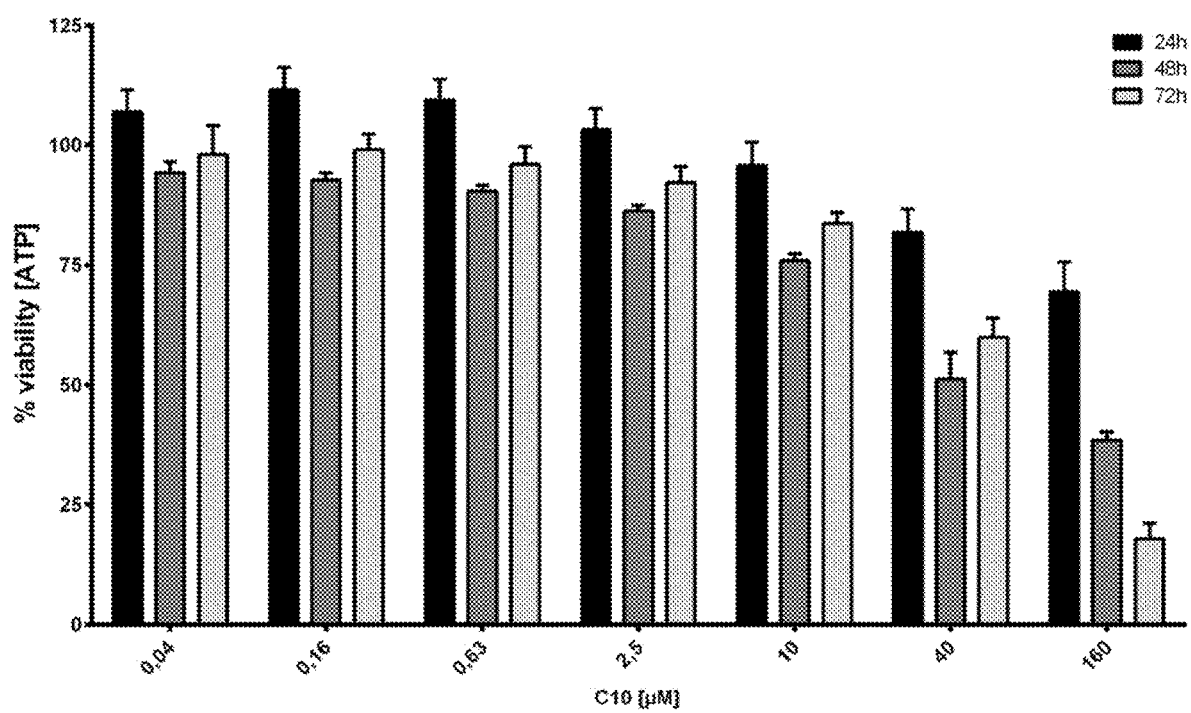

It is shown that compound C10 is not toxic even a high concentrations of up to 40 μM. These results could be confirmed in other experiments using another cell type (HeLa cells; FIG. 4C) or in which the incubation time was varied and extended to up to 72 h (FIG. 4D).

Example 5

Determination of the $CC_{50}$ Value

In a further experiment, the concentration of the tested compounds was determined which is toxic in 50% of the cases (CC50 value).

For this purpose, Huh7.5 cells were seeded, treated and analyzed as described above. The $CC_{50}$ values for C10, D1, D2, and D3 were calculated using GraphPad Prism6 software with a non-linear regression curve fitting algorithm, as shown in FIG. 4B. It should be noted that the tested compounds precipitate at concentrations above 160 μM in aqueous solutions. For this reason, higher concentrations cannot be tested.

The inventors found that compound C10 is extremely well tolerated and does not show cytotoxic effects at high concentrations with an CC50 of 106 μM.

Example 6

Antiviral Effect on HCV (Virus Release)

In the next experiment, the antiviral effect of compound C10 and derivatives D1, D2, and D3 was tested. The extent to which the compound inhibits the release of infectious viruses from the cells was investigated.

Huh7.5 cells ($4 \times 10^6$ cells/100 μl) were electroporated with 10 μg RNA from Jc1-luc-IRES using the Thermo Fisher Neon Transfection System with a pulse of 1300 V for 30 ms. The electroporated cells were resuspended in DMEM mixed with 10% FCS, 1 mM sodium pyruvate, 1% non-essential amino acids and 2 mM glutamine and plated into a plate with 96 wells ($2 \times 10^4$ cells/well). 48 h after electroporation, the medium was exchanged and the cells were incubated in triplets with the indicated concentrations (μM) of compound C10 and derivatives D1, D2, and D3 for 24 h (100 μl total volume). The final concentration of DMSO in all samples was 0.5%. 2 h after infection, 90 μl fresh complete medium was added and the cells were incubated for 48 h. The reinfected cells were lysed in 60 μl luciferase extraction buffer (0.5 M potassium phosphate pH 7.8, 1 % Triton X100, 1 mM dithiothreitol), of which 40 μl were used for the analysis of luciferase activity. Luminescence was detected using Biotek's Cytation3. For data analysis, all values were normalized against the DMSO control and displayed as a percentage of infectivity in a bar graph. The result is shown in FIG. 5 (n≥16 with SEM).

It is shown that compound C10 exhibits antiviral effects even at low concentrations.

Example 7

Determination of the $EC_{50}$ Value

In a further experiment, the concentration that inhibits the release of viruses from cells in 50% of cases ($EC_{50}$) was determined.

Figure 5B:
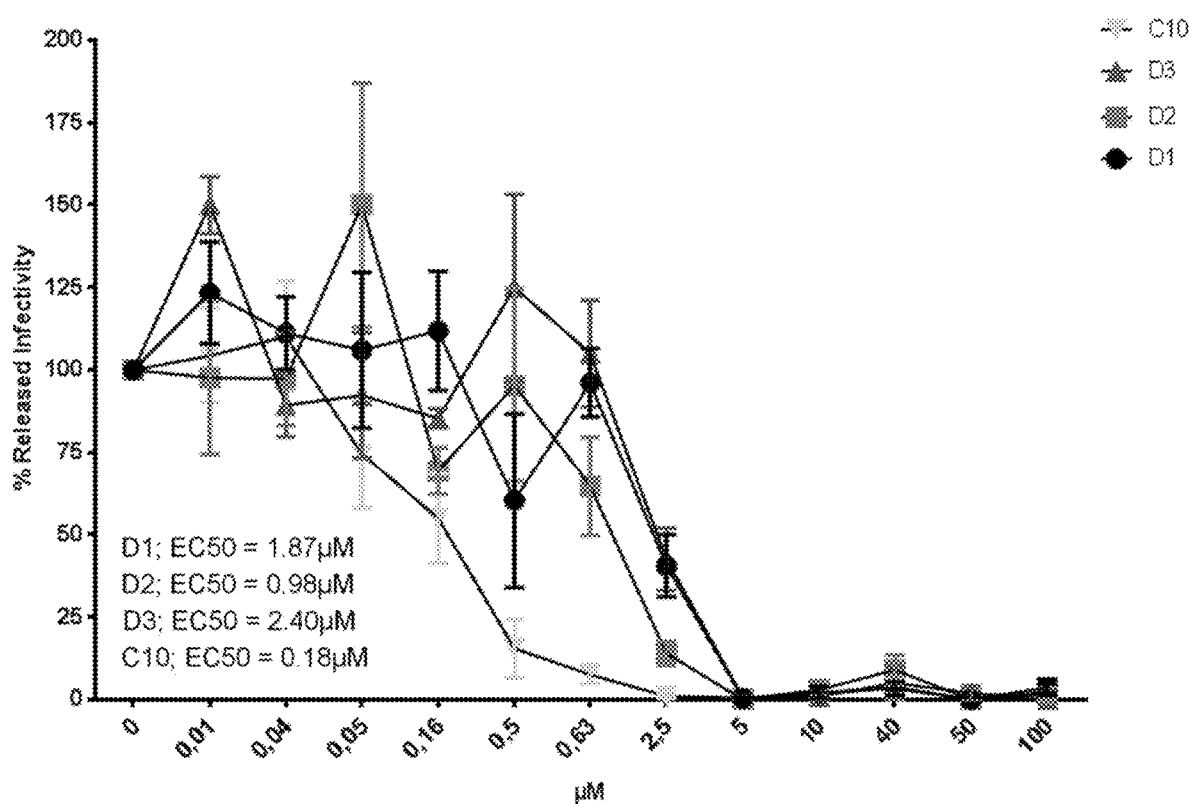

For this purpose, Huh7.5 cells were electroporated, plated, treated and analyzed as described above. The $EC_{50}$ value for compound C10 and derivatives D1, D2 and D3 was calculated using GraphPad Prism6 with a non-linear regression curve fitting algorithm. The result is shown in FIG. 5B.

Figure 6A:
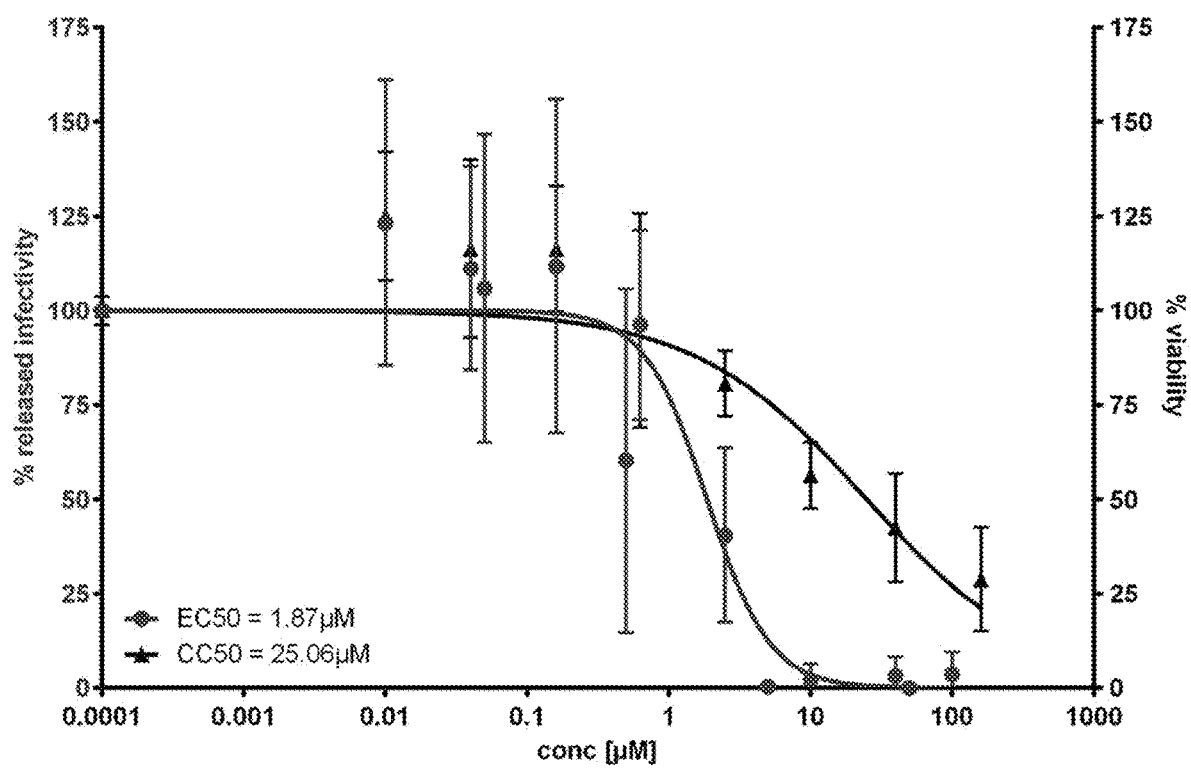
Figure 6B:
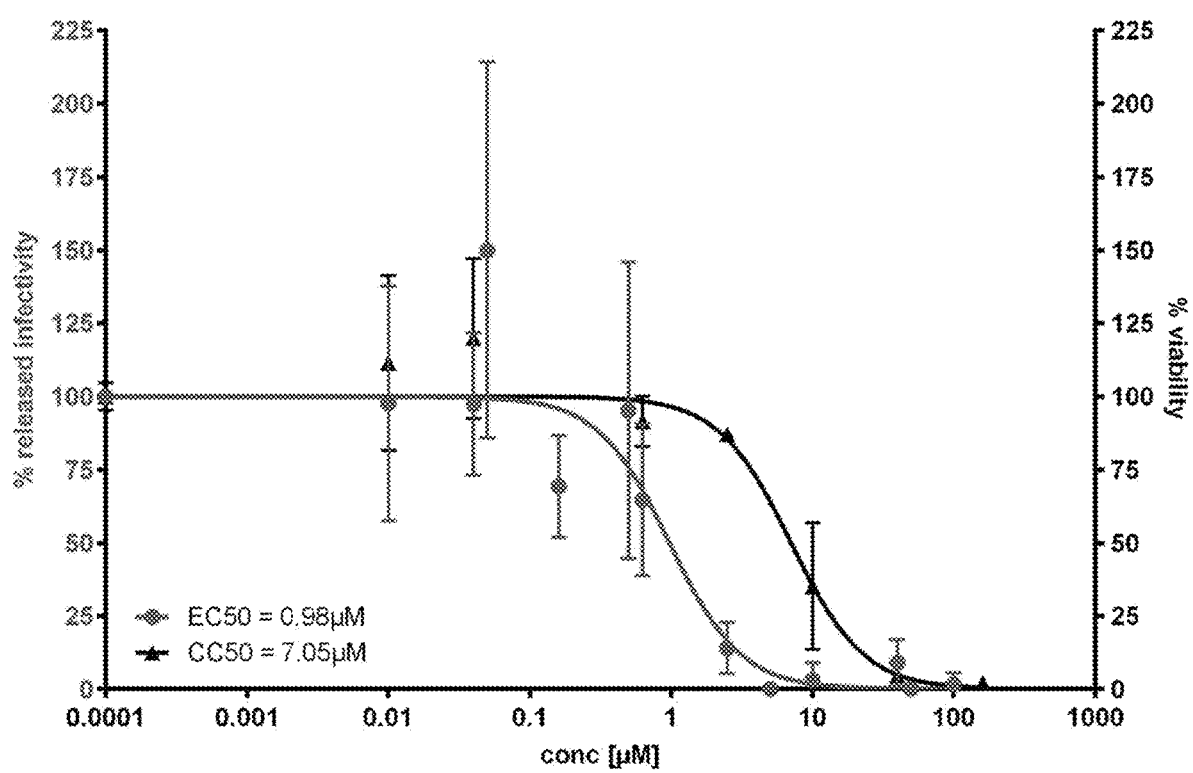
Figure 6C:
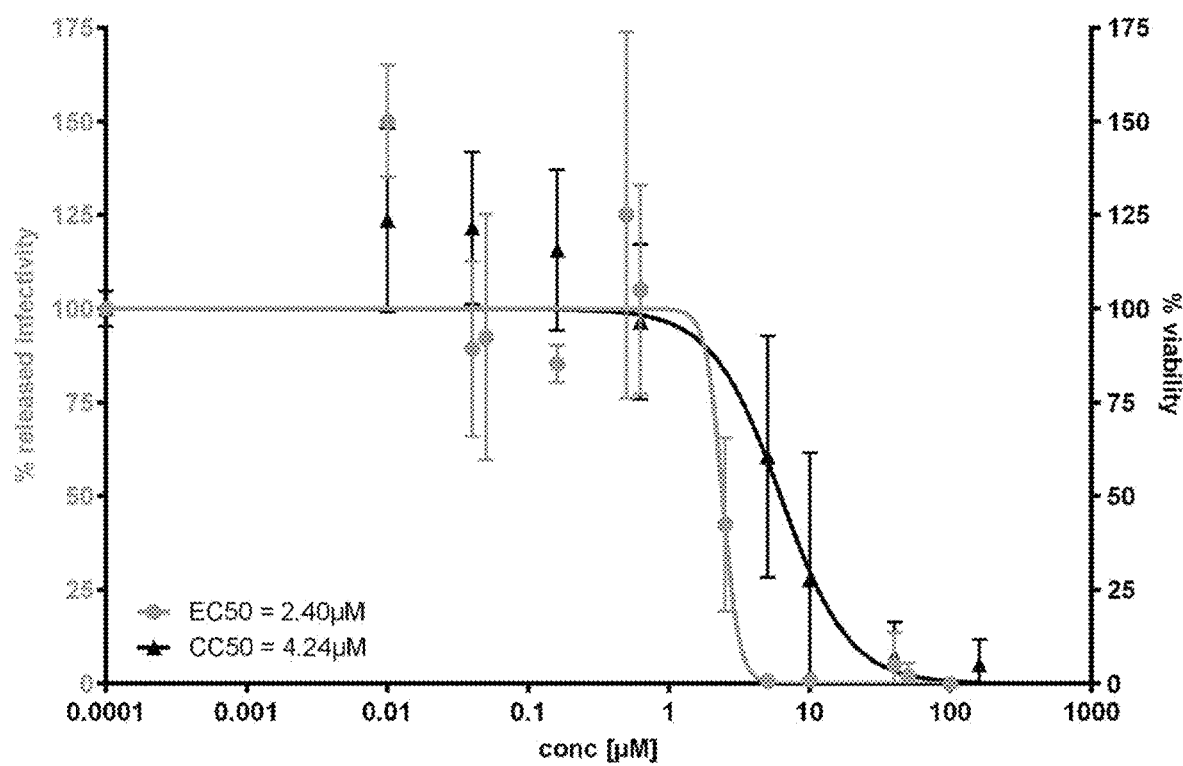
Figure 6D:
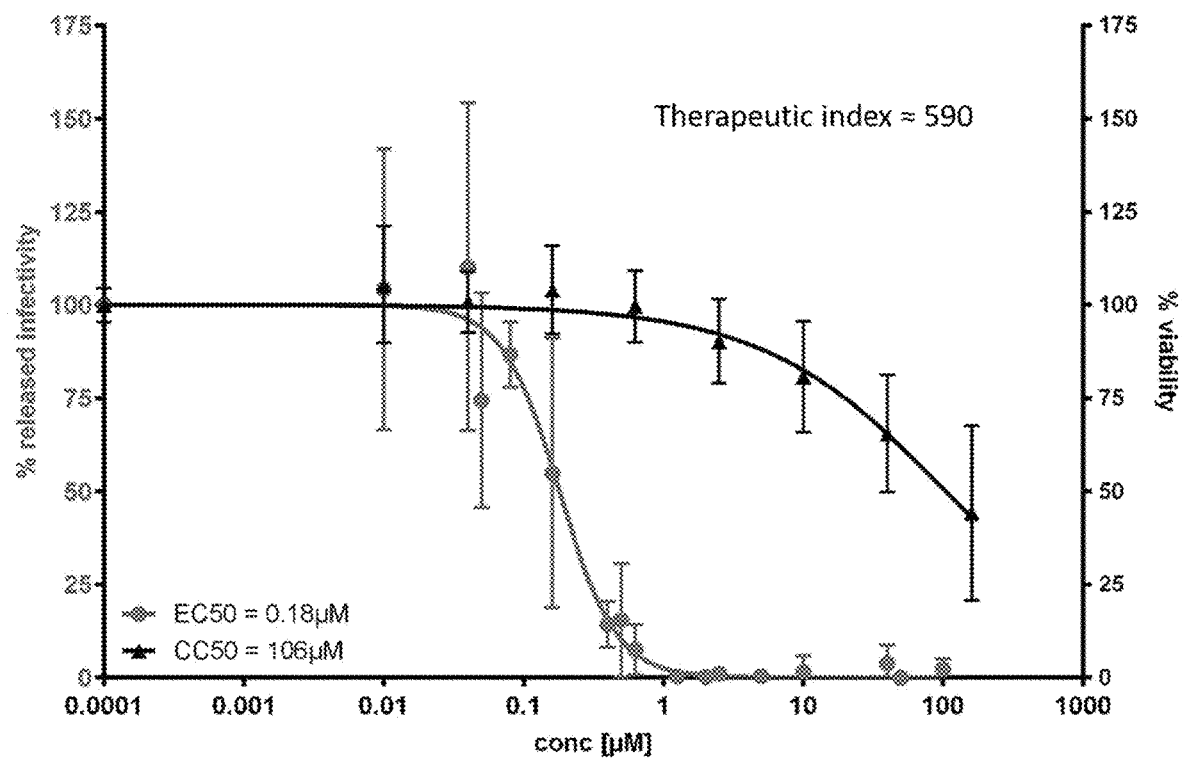

It is shown that compound C10 shows antiviral effects in relation to the release of the viruses from the cells even at low concentrations. The therapeutic index $CC_{50}/EC_{50}$ for C10 is approximately 590 (FIG. 6D). This indicates that the safety of C10 is high.

Example 8

Interaction with HCV Core Protein

Figure 7:
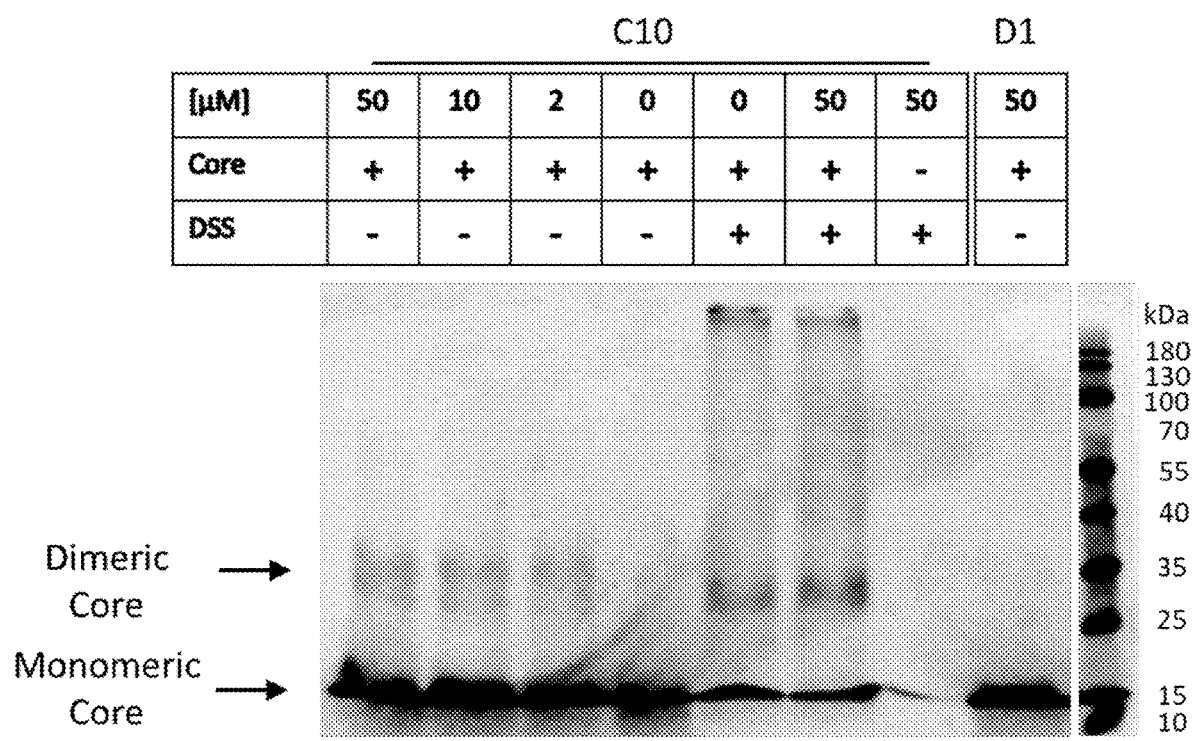

In a further experiment, it was tested whether compound C10 interacts with the core protein of HCV. For this purpose, purified core protein (2.7 μg of the protein containing residues 1 to 117) was mixed with different concentrations of compound C10 and derivative D1, with or without the crosslinker disuccinimidyl suberate (DSS, Thermo Fisher), and incubated at room temperature (RT) for 1 h. The crosslinking reaction was stopped by the addition of 1 μl glycine (1M) and another incubation for 15 min at RT. The samples were mixed with Laemmli buffer and boiled for 10 min, then incubated at 4° C. for 15 min before separation using 12% SDS-PAGE. The result in the form of a representative Western blot is shown in FIG. 7. An antibody directed against the core protein was used in a dilution of 1:1000, clone C7-50 of Abcam. The bands expected for dimeric and monomeric core protein are marked.

It is shown that compound C10 leads to cross-linking of the core protein.

Example 9

Antiviral effect on DENV (virus release and entry)

In a further experiment, the antiviral effect of compound C10 was tested for Dengue virus (DENV).

Figure 8A:
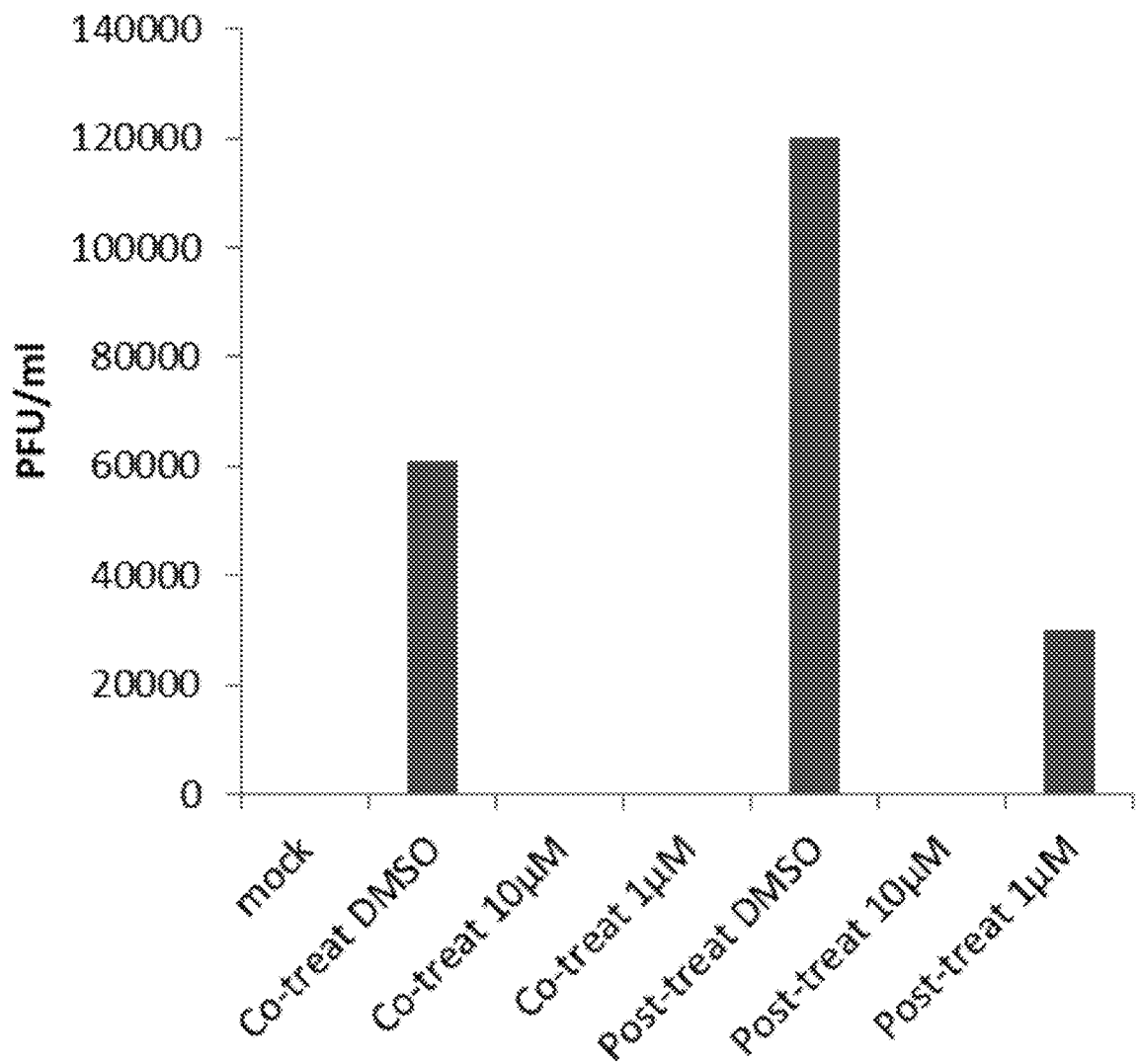
Figure 8B:
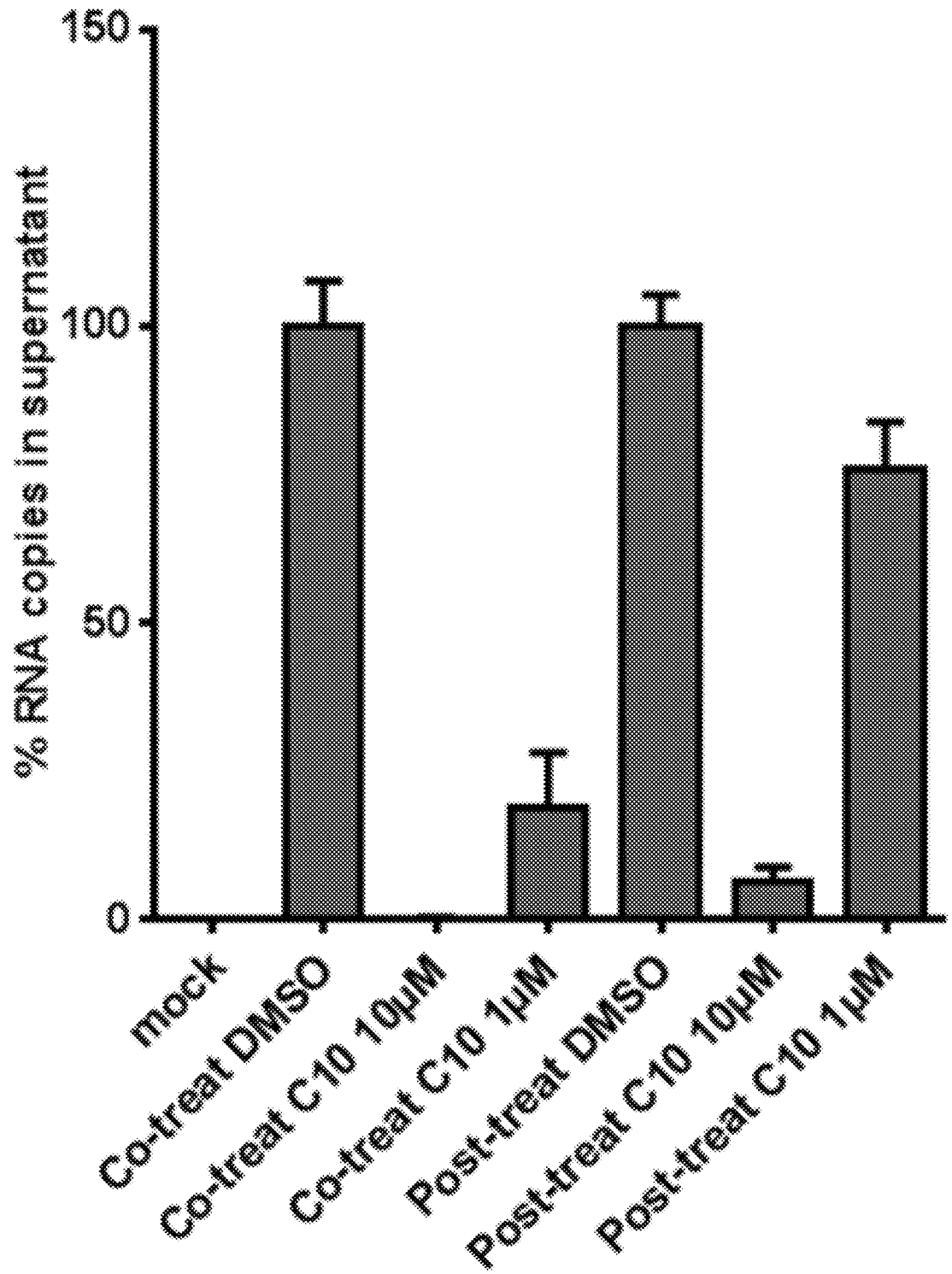
Figure 8C:
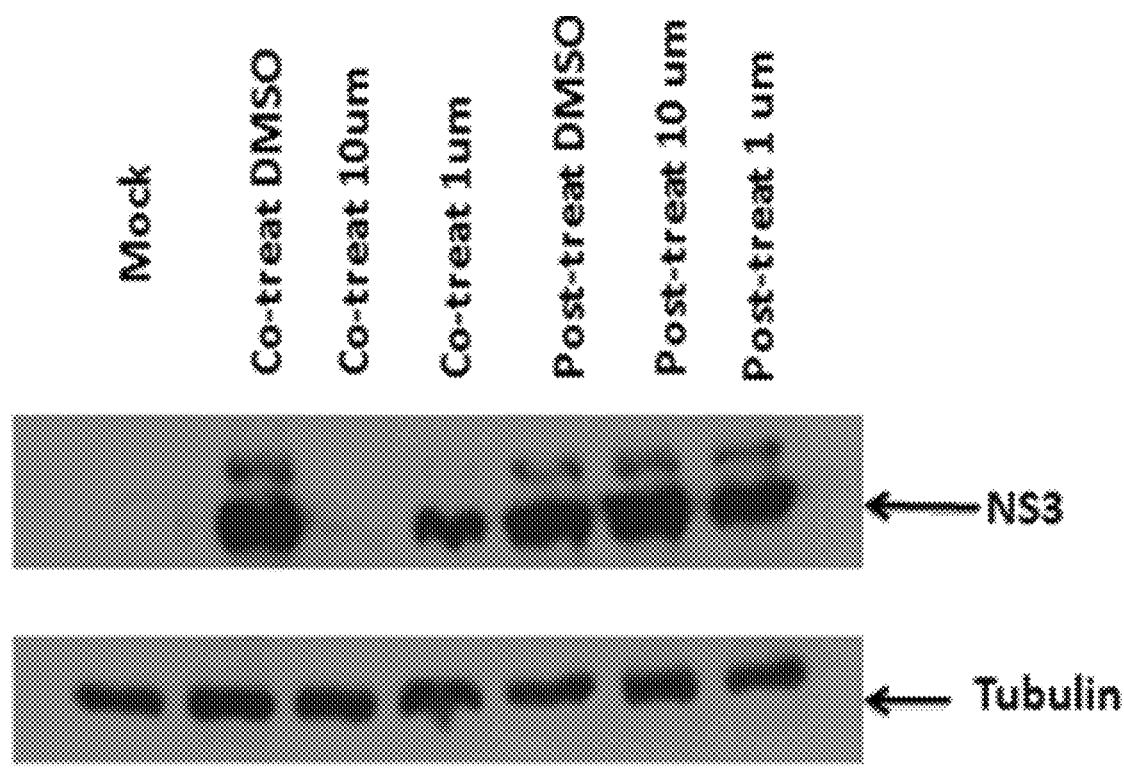

For this purpose, Vero cells were plated and infected with DENV-2 at an infection multiplicity (MOI) of 5. For co-treatment, the cells were incubated with a previously mixed suspension of active substance and virus, for post-treatment with the virus alone, each for 2 h. The cells were then washed with PBS and cultivated for co-treatment in DMEM with 2 % FCS, for post-treatment in DMEM with 2 % FCS mixed with the indicated concentrations of compound C10. For the post-treated cells, the medium containing the active substance was removed after 2 h and replaced by fresh medium with 2 % FCS. 24 h after infection the supernatants were used for a plaque assay. The result is shown in FIG. 8A. The result of RNA extraction (n=3 with SEM) is shown in FIG. 8B. The cells were lysed and a Western blot analysis was performed using antibodies against the viral proteins NS3 and NS5 and the cellular protein tubulin as charge control. The result is shown in FIG. 8C.

Figure 8D:
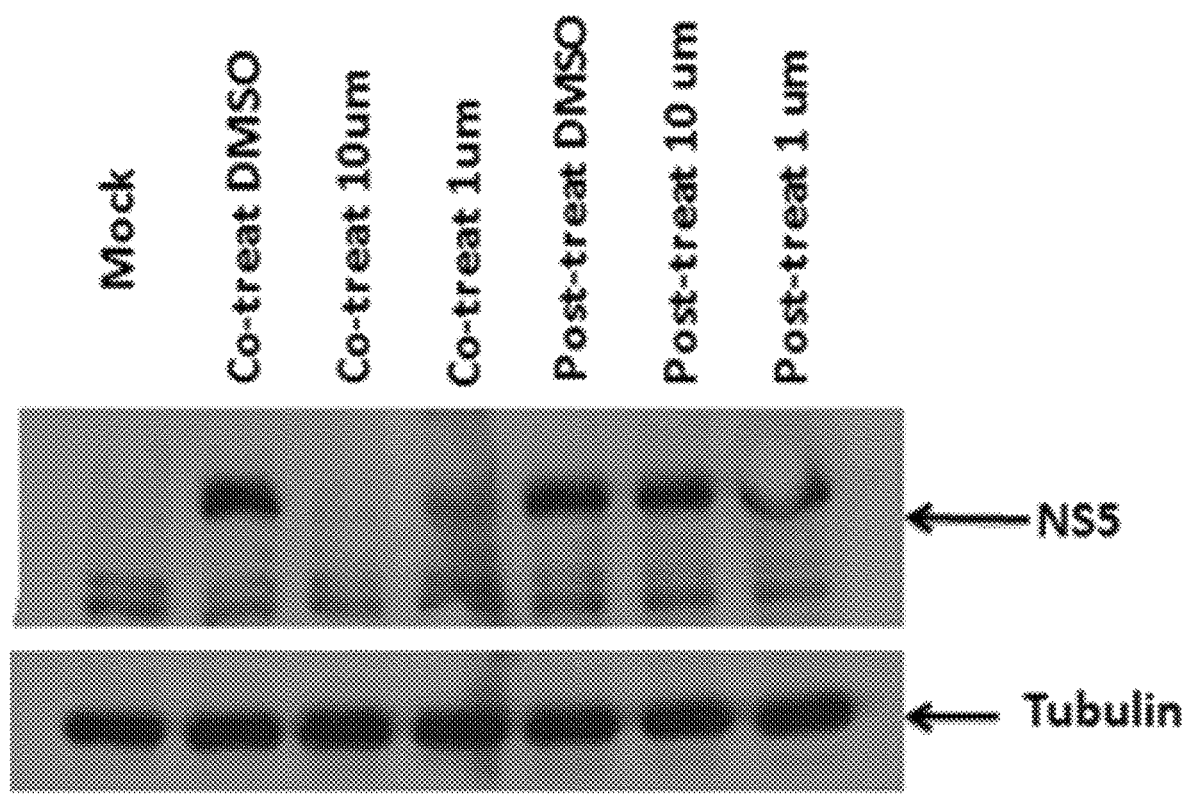

The Western blot analysis in FIG. 8D shows that co-treatment with C10 in a high concentration (10 μM) prevents a productive infection of the cells, whereas at a lower concentration (1 μM) viral proteins are detectable in the cells, albeit at lower amounts as compared to DMSO treated cells.

To summarize the data presented in FIG. 8, when co-treated with C10, the release of infectious DENV particles is still inhibited to about 75% even at low concentrations (1 μM). This effect is similar to that of HCV, although lower.

Example 10

Compound C10—A potent Inhibitor of Dengue, Zika and West-Nile Virus Infection

Material and Methods

Cell Culture and Virus Propagation

Vero and BHK-21 cells were maintained in DMEM media supplemented with 10% heat-inactivated FBS at 37° C. in a humidified incubator supplemented with 5% $CO_2$; A549 cells were maintained in F-12K medium supplemented with 10% heat-inactivated Fetal Bovine Serum (FBS), 2 mM L-glutamine, 50 U/I penicillin, 0.05 mg/l streptomycin. DENV-1-4 strains, cell culture conditions and Gen-Bank accession numbers, as well as details of RSV strains and culture are known in the art. KUNV (MRM61C strain) and ZIKV (Asian strain/Cook Islands/2014) was propagated in Vero cells, whereby cells at 80% confluency were infected at a multiplicity of infection (MOI) of 0.1. At 48 h, when >70% of the cells were detached, the supernatant was harvested as the virus stock. Viral titer was subsequently determined by plaque assay (see below).

Plaque Assays

Vero cells were seeded into 24-well plates at a density of $2 \times 10^5$ cells/well and grown overnight in culture medium at 37° C. with 5% $CO_2$ prior to infection with RSV, KUNV, ZIKV as indicated. BHK-21 cells were used for DENV1-4. The virus inoculum was removed and replaced with semi-solid overlays of 0.8% aquacide II (Calbiochem) in DMEM+ 2% FBS, and the mixture was incubated at 37° C. with 5% $CO_2$. After 3-5 days, the cells were fixed with neutral buffered formalin (Sigma) for 3 h at room temperature, rinsed with tap water, and stained with 1% crystal violet for 10 min. The stain was removed by rinsing the cells with tap water, and the viral plaques were counted visually. Dose-response curves were plotted from the plaque number versus the log of the concentration of the test compounds.

Quantitative Reverse Transcription Polymerase Chain Reaction (RT-qPCR)

Viral RNA was extracted using Isolate II RNA extraction kit (Bioline), and the absolute number of RNA copies determined by Taqman One Step RT-qPCR (Applied Biosystems) by extrapolation from a standard curve generated from in vitro—transcribed virus RNA.

Statistical Analysis

Statistical analysis was performed using GraphPad Prism software.

Results

C10 is a potent inhibitor of flaviviruses infection

Figure 9A:
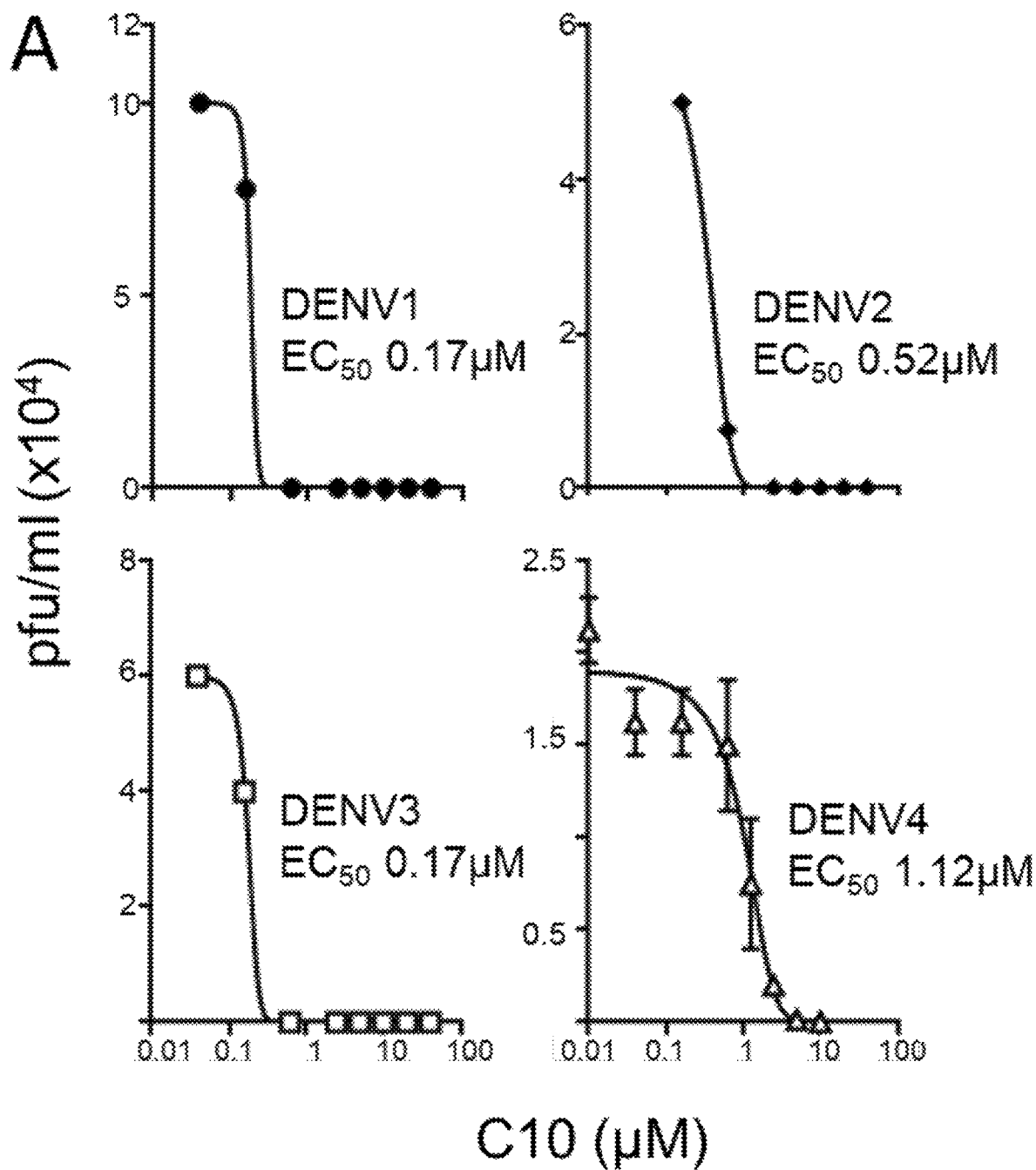
Figure 9B:
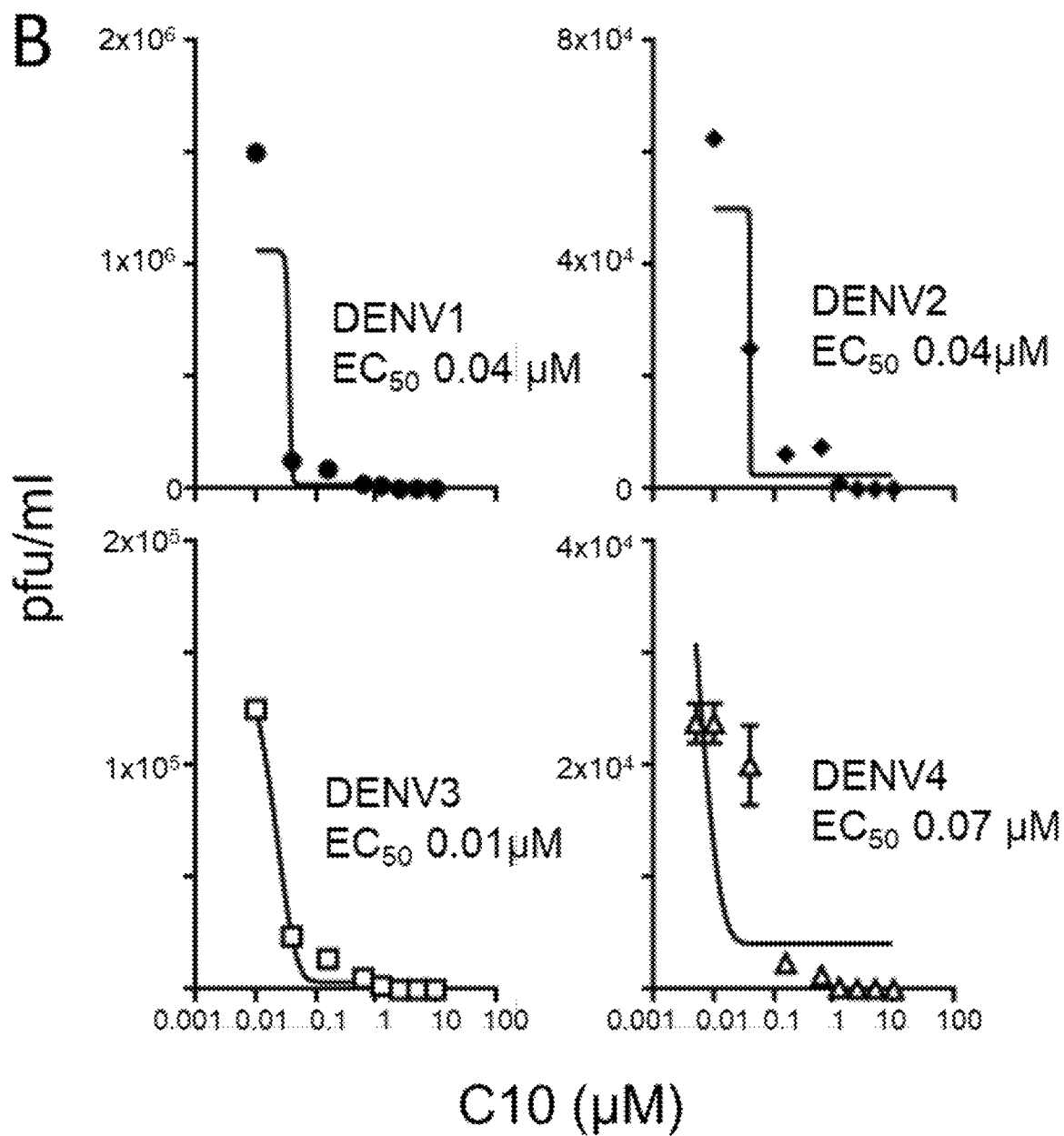
Figure 9C:
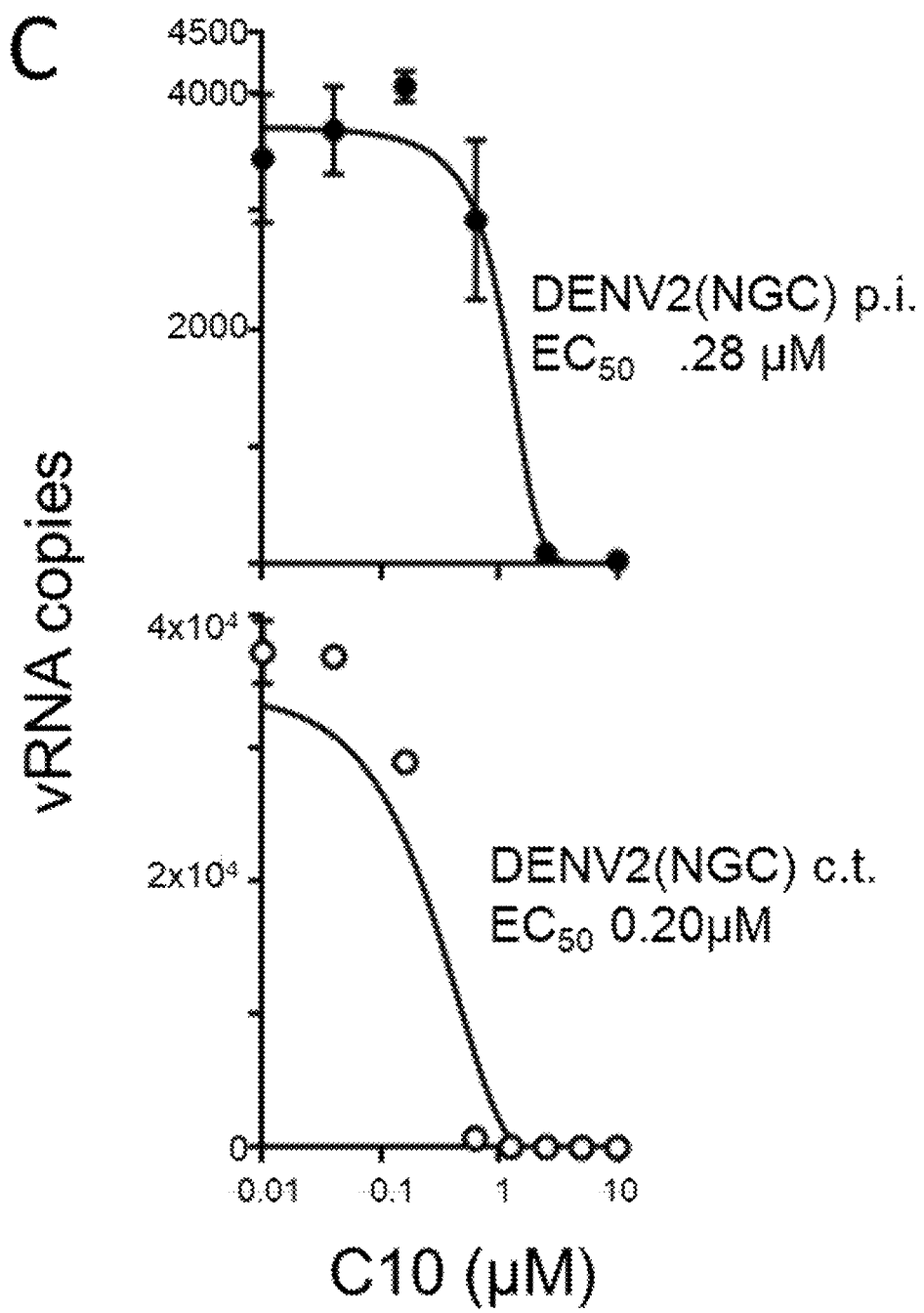
Figure 10:
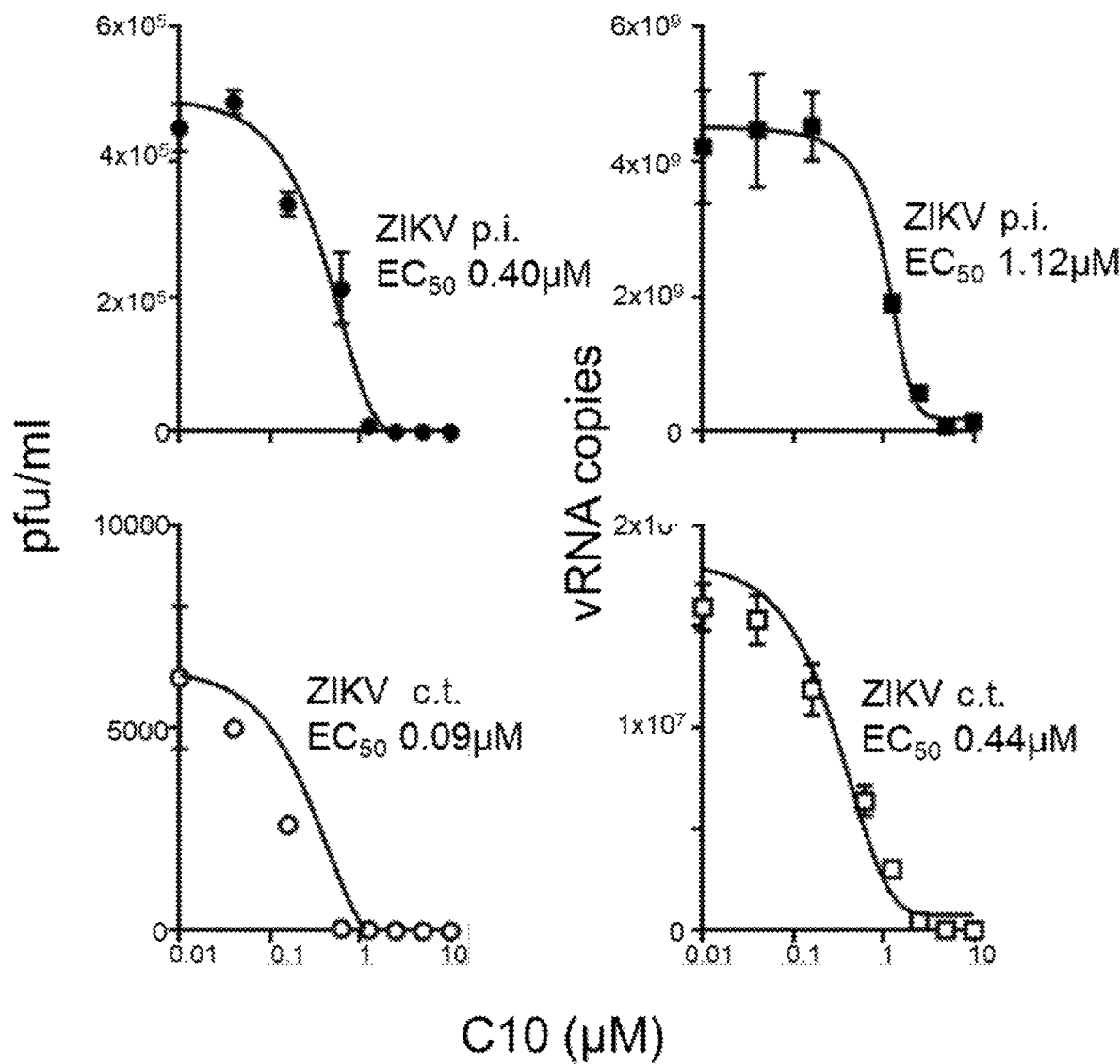
Figure 11:
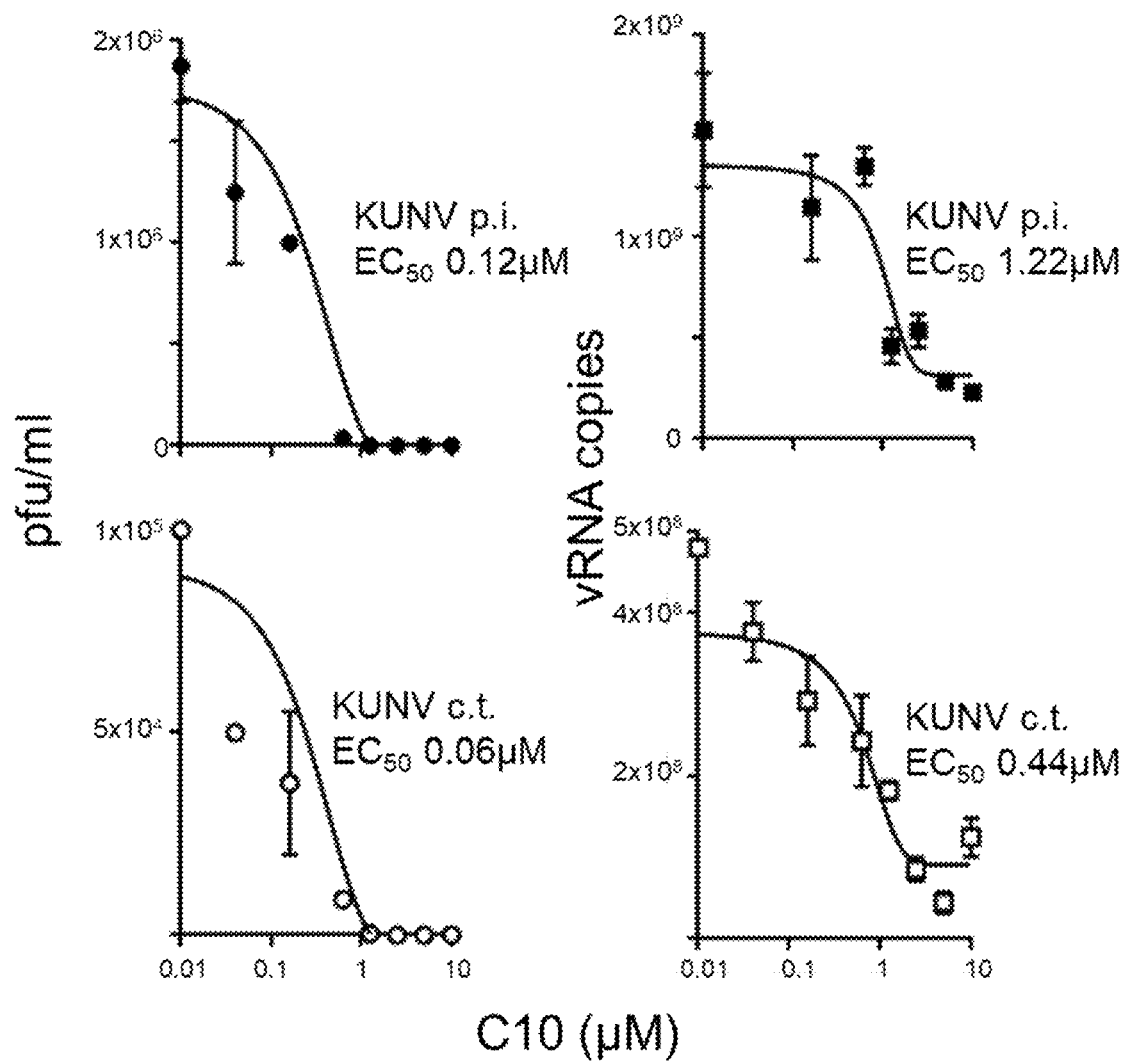

It was decided to test the ability of C10 to inhibit the flaviviruses DENV1-4, KUNV and ZIKV, in addition to the paramyxovirus RSV, as a control. Vero cells were infected at a multiplicity of infection (MOI) of 1 with DENV1-4, ZIKV (Asian/Cook Islands/2014) or KUNV (MRM61C strain), with increasing concentrations of C10 added 2 h later (post infection, p.i.), or infected at an MOI of 1 in the presence of C10 for 2 h (co-treat, c.t.). Released virus was quantified by plaque assays and RT-qPCR analysis 22 h later; in the case of RSV, A549 cells were lysed at 22 h to estimate virus production. Results were very clear in showing that C10 is a potent inhibitor of DENV, ZIKV and KUNV infection, with an EC50 of c. <0.5 μM for c.t.; $EC_{50}$ of c. <2 μM for p.i. (FIGS. 9 to 11), whether estimations were made in terms of infectious virus (plaque-forming units; $EC_{50}$ of c. <0.1 μM c.t. and $EC_{50}$ of c. <1.5 pM p.i.; Table 2) or virus genomes as determined by RT-qPCR ($EC_{50}$ of c. <0.5 μM c.t. and $EC_{50}$ of c. <1.7 μM p.i.; Tables 2A and 2B).

C10 was also able to inhibit RSV infection when co-added with virus, albeit at higher concentrations than observed for the flaviviruses ($EC_{50}$ of c. 0.8 μM, Tables 2A and 2B). The implication is that C10 has specificity and broad antiviral activity against flaviviruses. Further, it has been shown that C10 does not act on HIV and is inactive or has only minor activity against other viruses such as Measles morbillivirus (MeV) or Hepatits B Virus (HBV) (Table 1).

TABLE 1

C10 is a potent flavivirus inhibitor

| Virus | HCV | DEN1/2 | ZIKA | ChikV | RSV | FluAV | MeV | HIV | HBV |
|---|---|---|---|---|---|---|---|---|---|
| $IC_{50}$ [μM] | 0.18 | 0.11-0.18 | 0.1-0.2 | 5.6 | 4.3 | ~5 | >10 | >100 | >10 |

TABLE 2A

Summary of $EC_{50}$ data for C10 from plaque assays.
$EC_{50}$ (μM)*

| Viruses | DENV1 | DENV2 | DENV3 | DENV4 | KUNV | ZIKV | RSV |
|---|---|---|---|---|---|---|---|
| p.i.+ | 0.11 ± 0.07 (2) | 1.30 ± 0.78 (2) | 0.60 ± 0.43 (2) | 0.79 ± 0.47 (2) | 0.42 ± 0.42 (2) | 0.21 ± 0.27 (2) | — |
| c.t.+ | 0.04 ± 0 (2)_ | 0.04 ± 0.01 (2) | 0.01 ± 0.001 (2) | 0.05 ± 0.04(2) | 0.05 ± 0.01 (2) | 0.09 (1) | 0.89 ± 0.64 (2) |

Figure 13:
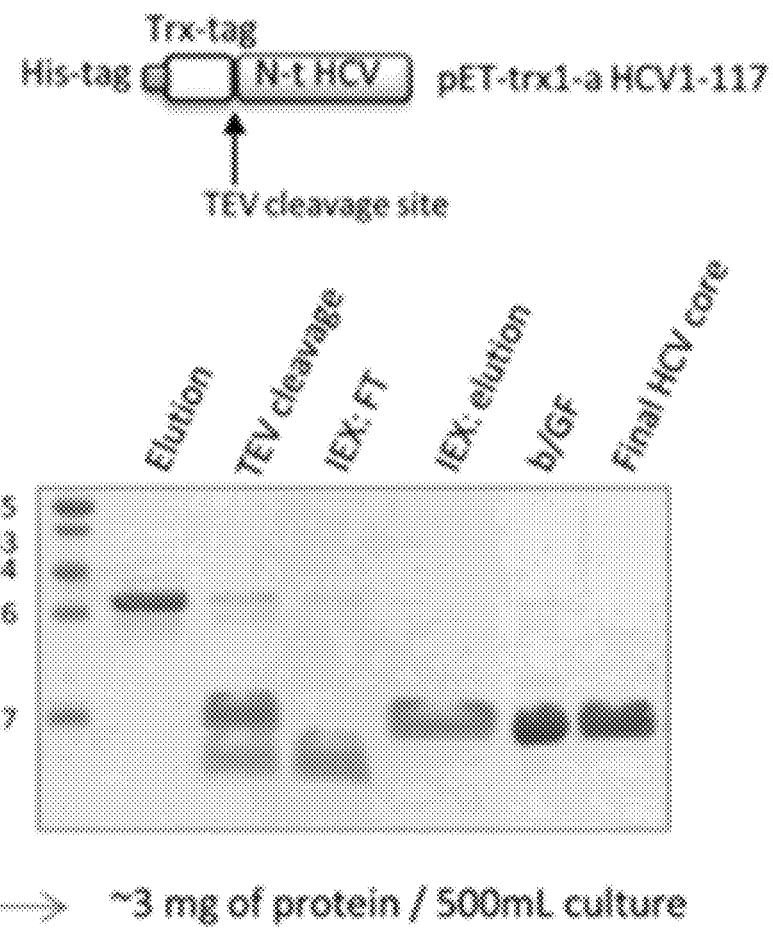
Figure 13:
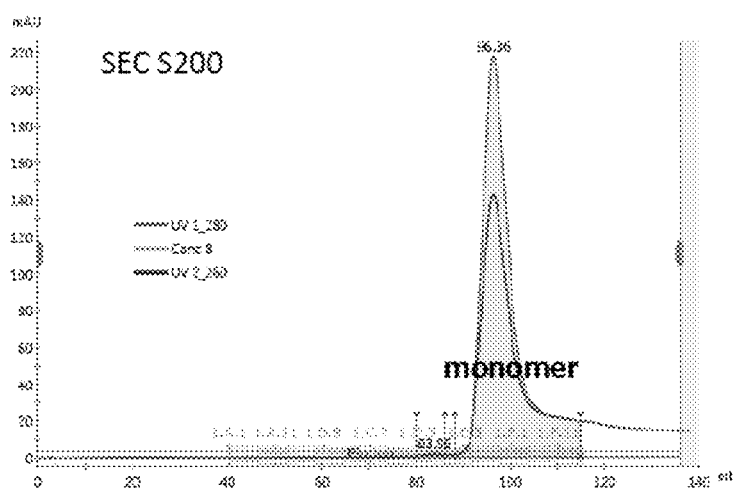
Figure 14B:
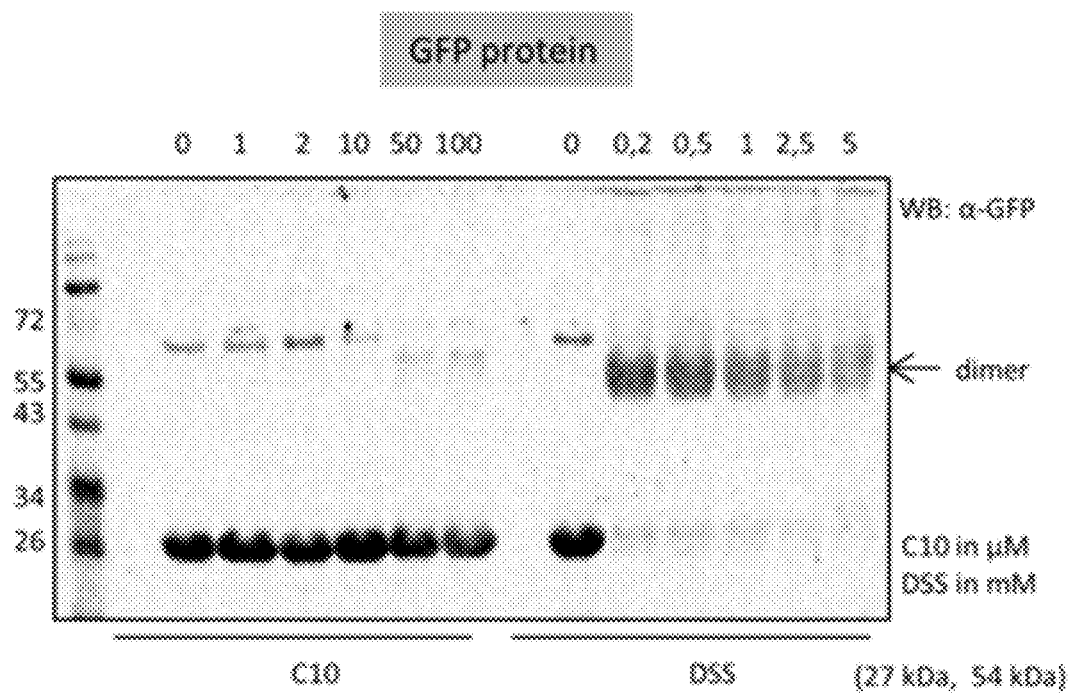
Figure 14B:
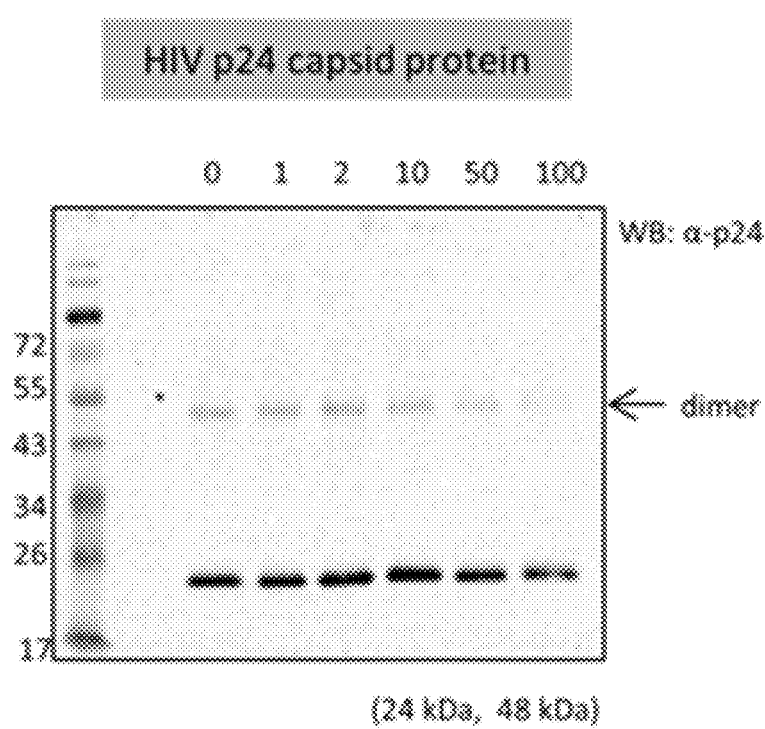

*Results represent the mean + SD (n) from analysis as per FIGS. 13-15.
+Post infection (p.i.) and co-treat (c.t.) condition details are described in the legends to FIGS. 13-15.

TABLE 2B

Summary of $EC_{50}$ data for C10 from RT-qPCR analysis.
$EC_{50}$ (μM)*

| Viruses* | DENV2 | KUNV | ZIKV | RSV |
|---|---|---|---|---|
| p.i.+ | 0.81 ± 0.48 (2) | 1.68 ± 0.64 (2) | 1.13 ± 1.10 (2) | — |
| c.t.+ | 0.20 (1) | 0.31 ± 0.18 (2) | 0.44 (1) | 0.83 ± 0.97 (2) |

*Results represent the mean + SD (n) from analysis as per FIGS. 13-15.

The $EC_{50}$ values for blocking these flaviviruses are lower for co-treatment as addition post-infection, This implies that C10 inhibits early as well as late steps in the viral cycle of these viruses. In contrast, for HCV only late steps of infection were affected. Considering the fact that C10 targets the viral capsid, one hypothesis is that C10 can not inactivate assembled viral particles, which are strongly covered with lipids. In contrast, infectivity of assembled flavivirus particles other than HCV could be reduced by C10 due to the fact that the capsids are accessible to C10.

Summary and Conclusion

C10 was found to have potent antiviral activity against a range of flaviviruses, including all serotypes of DENV, as well as ZIKV and WNV, with $EC_{50}$s for co-addition of 10-100 nM as determined in plaque assays or qPCR. Post-addition of C10 could also inhibit infection at higher concentrations, implying that the C10 targets early as well as late steps in the viral cycle of these flaviviruses.

Example 11

Design, Identification and Characterization of C10 Derivatives

To validate the capsid protein of Flaviviridae as the target of compound C10, the first milestone was to produce recombinant HCV and DENV capsid proteins. In this regard, a successful expression and purification protocol for the HCV core protein D1 domain as well as DENV capsid protein could be established. Both proteins were extracted from the soluble fraction of E.coli cultures and purified using different chromatographic steps, including affinity chromatography (IMAC), cationic exchange (IEX) and size exclusion chromatography (SEC). As a result, both proteins were obtained pure and in good yield (FIG. 13).

The characterization of the purified proteins was done using different biophysical techniques. In the case of HCV core protein D1 domain, the identity of the protein was confirmed by Mass Spectrometry since the existence of an alternative protein of a similar size but with a different amino acid composition is reported. SEC confirmed the monomeric state of the domain and Circular Dichroism (CD) indicates its disordered state, as described in the literature. For DENV capsid protein, the identity of the pure protein was verified by western blot with an antibody against it. As expected from the literature, the elution volume of the protein in the SEC corroborates its dimeric state in solution. In addition, also CD results were in agreement with previous literature, confirming the folding state and the a-helical character of DENV capsid protein.

As a next step, a possible direct interaction between C10 and the capsid protein was evaluated. Previous data (FIG. 7)

showed that incubation of HCV core protein with C10 might induce protein oligomerization. Crosslinking assays were performed using the HCV core protein D1 domain co-incubated with C10 or disuccinimidyl suberate (DSS), a known crosslinker, as a positive control. Using western blot with antibodies against the core protein of HCV as read-out, dimers, trimers, tetramers, and higher molecular weight species were detected. A highly similar pattern was indeed observed upon the interaction of HCV core with C10, confirming that C10 triggers the oligomerization of HCV core protein. In addition to the initial C10 concentrations tested, the effect can be detected starting at concentrations near the $IC_{50}$ value (~0.2 µM) and it increases in a dose-dependent manner (FIG. 14A).

Due to the difficulties of expressing HCV core full-length protein and the fact that the D1 domain is disorder, other techniques such as crystallography are not an option for mapping the binding site. As well, in silico modeling is not possible since there is no structural information available. NMR preliminary data confirm the disordered nature of the domain, but titration experiments have not been informative regarding the binding surface.

In the case of DENV, there is also a clear effect of C10 in the oligomerization state of the capsid protein, which seems to enhance the presence of dimers, tetramers and higher oligomeric states (FIG. 14A), while DSS stabilizes mainly the dimer.

To study the specificity of C10, capsid proteins of other viruses (VP1 polyomavirus, LP1 HPV16, and p24 HIV) as well as non-related proteins (BSA, GFP), were incubated in the so-called cross-linking assay, with DSS or C10. In the case of DSS, there is a clear effect of monomer consumption and dimer formation. On the contrary, C10 shows either no effect on these proteins or it starts at concentrations around 200 times higher than the $IC_{50}$, which confirms the specificity of C10 towards Flaviviridae capsids (FIG. 14B).

Concerning the SAR studies, 45 C10 derivatives were designed and synthesized, which were tested regarding both their antiviral activity against HCV and DENV, as well as their cytotoxicity. For the activity test, a construct including the viral genome and the reporter gene RLuc was used.

Huh7.5 cells were electroporated with the corresponding RNA, seeded in 96-well plate and treated during 24/48 h with C10 and the different compounds. The supernatant of virus-producing cells was used to re-infect naïve Huh7.5 cells, which were then lysed and their RLuc signal measured. A reduction in the RLuc signal in comparison with the DMSO signal means that the virus produced in the presence of the compound is less infectious and therefore the compound shows antiviral activity.

Figure 15A:
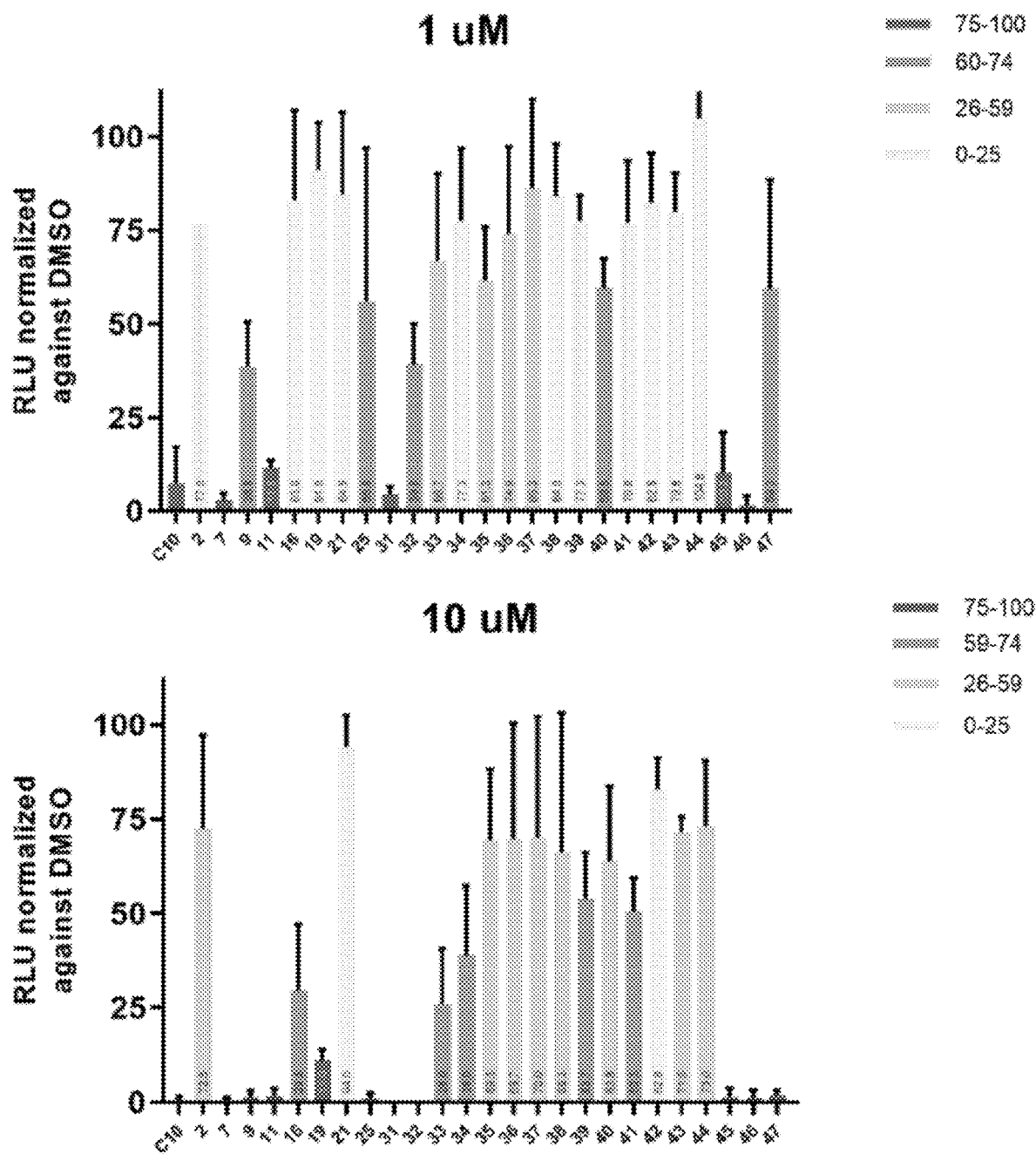
Figure 15A:
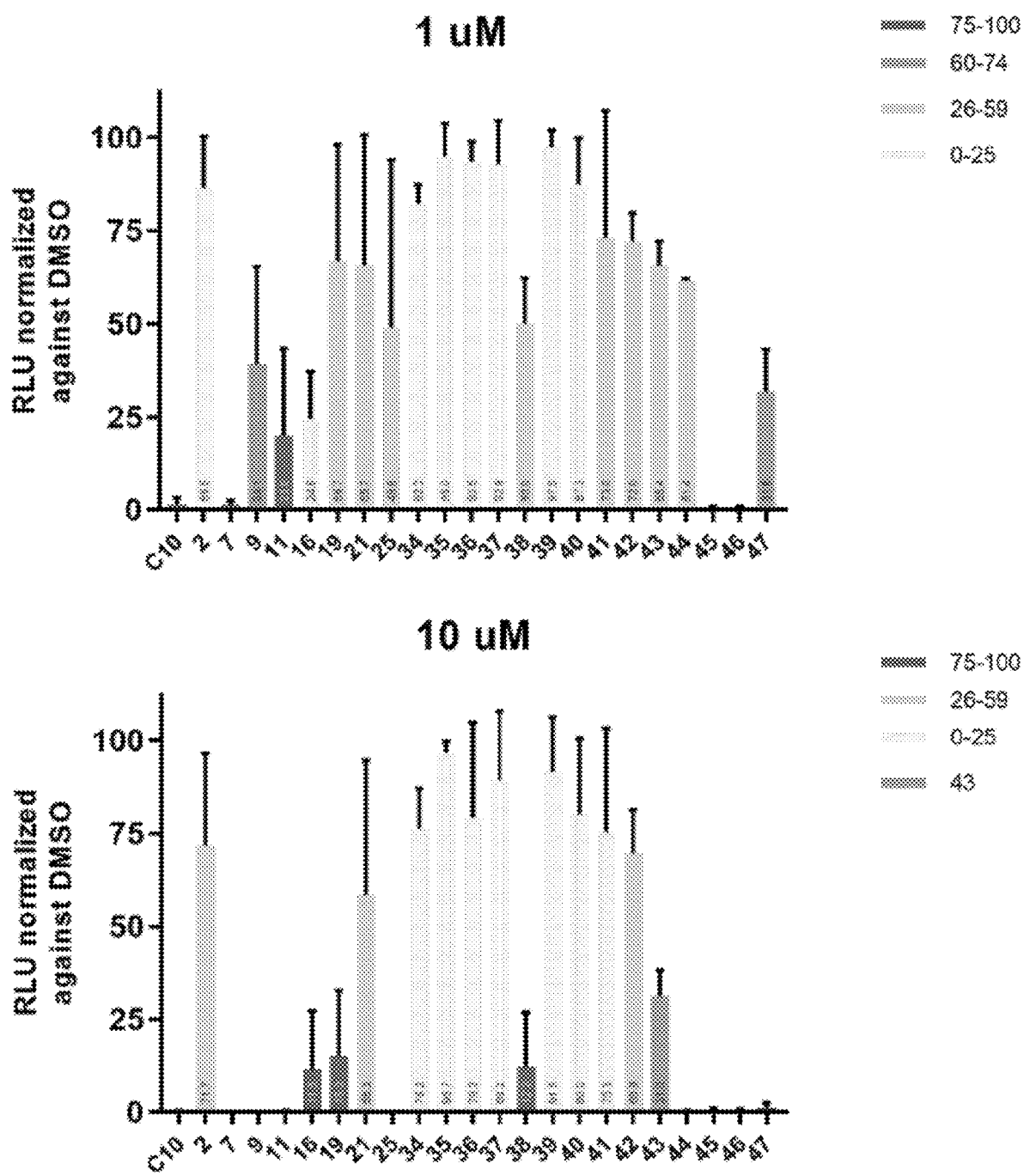
Figure 15A:
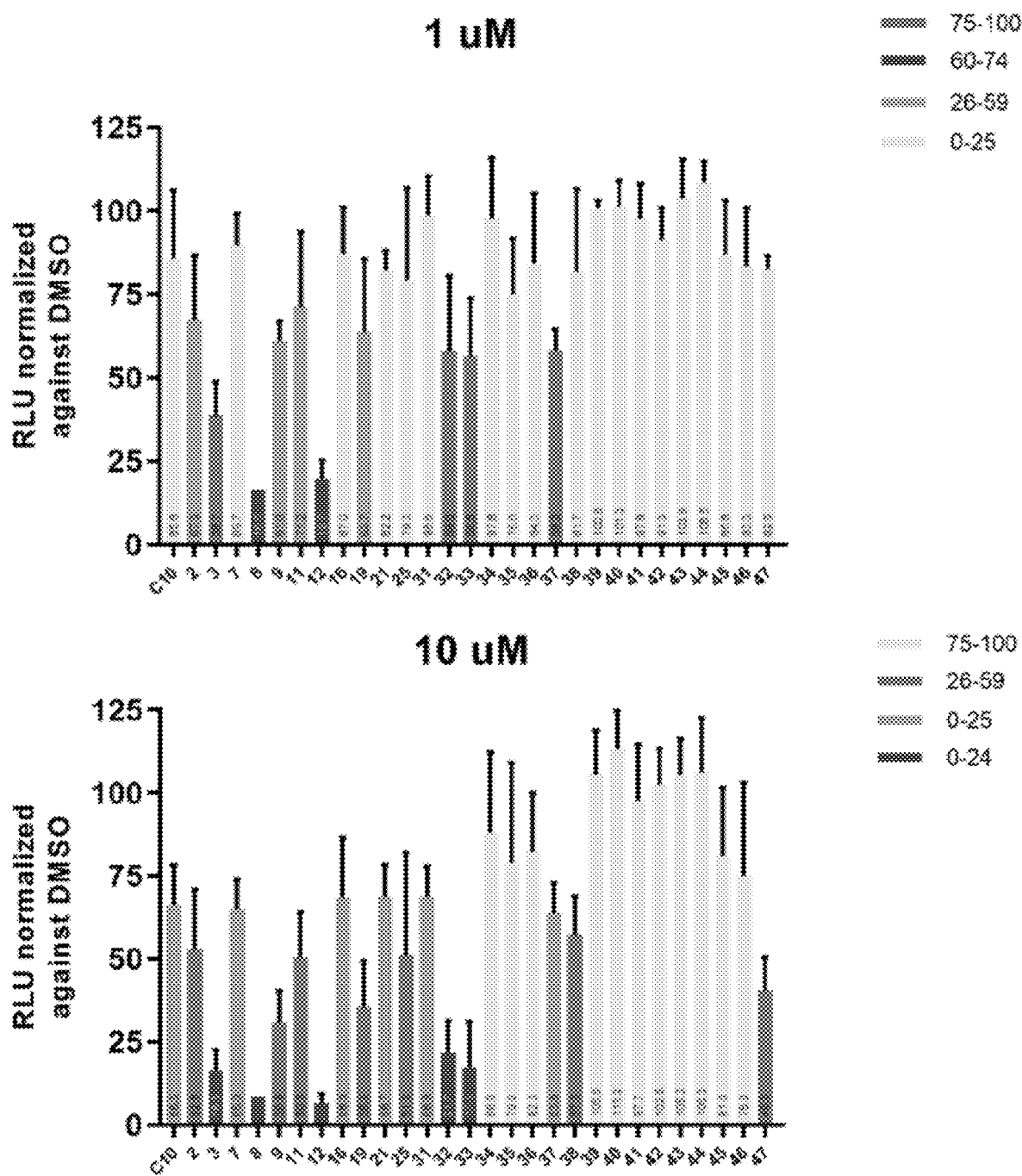
Figure 15B:
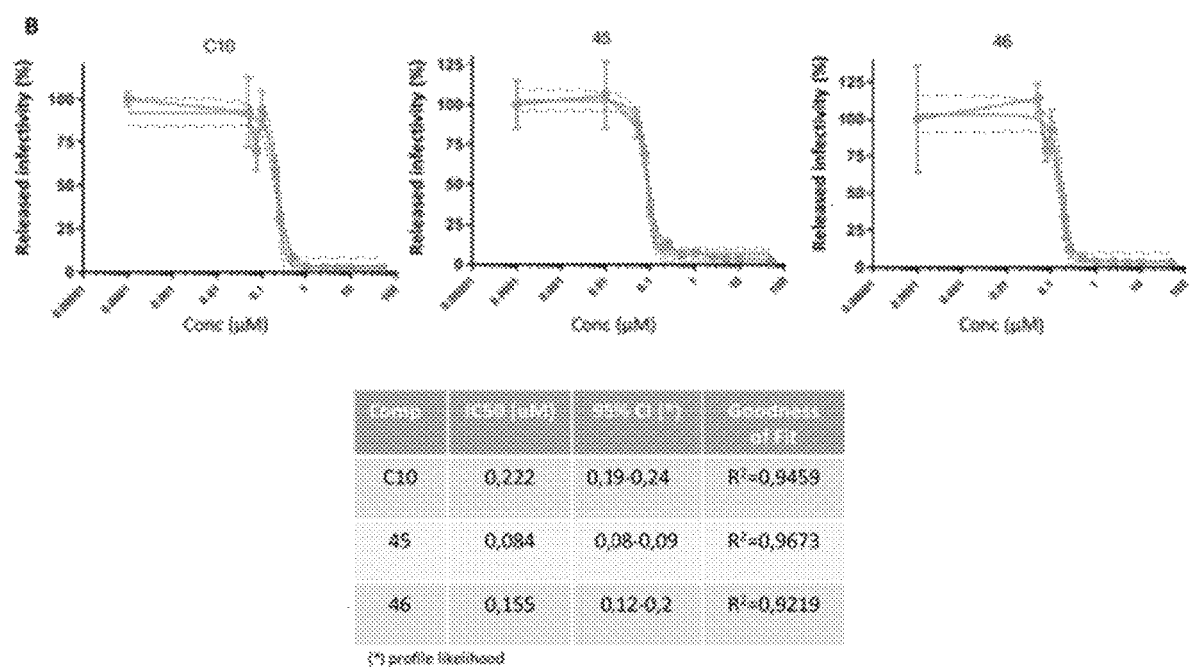

The cytotoxicity was measured using the CellTiterGlo kit, which is also based on a Luciferase reaction. In this case, the Luc signal is proportional to the amount of ATP, which in turn reflects the number of living cells in the assay. As a result, 19 monomeric compounds (referring to compounds which have only one half of the C10 molecule) were inactive, supporting the idea that the two "arms" of the C10 molecule are important. From 26 dimeric compounds, 5 were cytotoxic and 13 were inactive (the infectivity of the released particles was reduced only between 0-50% in comparison with DMSO) (FIG. 15A). Those were in general more planar compounds in comparison with C10, in which the linker region was longer and the positive charge was removed. The remaining 8 compounds were classified as active, being all of them the closest variants to C10 itself. With only one exception, all shared the length and composition of the linker as well as the amide group at the extremes of the molecule. Moreover, the majority of compounds displayed the same antiviral activity both for HCV and DENV. Furthermore, among the 8 active compounds, two promising hits were found (compounds 45 and 46) which show low $IC_{50}$ values, being 2.5 and 1.5 times more potent than C10 (FIG. 15B). Their structure is similar to C10 with the addition of one or two methyl groups at different parts of the molecule (FIG. 12). $CC_{50}$ values indicate they are not cytotoxic at the concentrations in which they are antiviral with a high therapeutic index.

Figure 16:
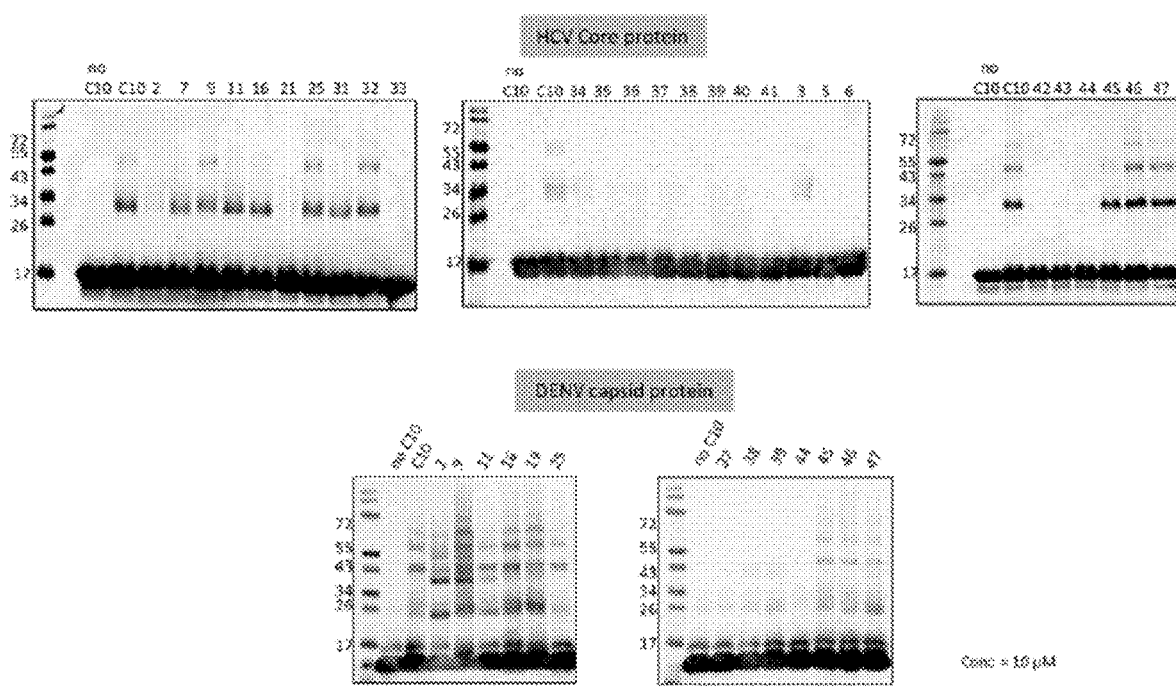

In parallel, the ability of the different C10 derivatives to crosslink the HCV core D1 domain and DENV capsid protein was tested. With only a few exceptions, the activity found in the cell-based assay highly correlates with the ability of each compound to interact with the HCV/DENV core protein forming oligomers (FIG. 16). Although interactions between C10 and other viral proteins cannot be excluded, these results support the notion that the capsid protein is the target of C10.

In summary, a set of C10 derivatives (FIG. 12) was designed, synthesized and tested against HCV (which is considered as an established system to monitor drug effects against Flaviviridae) as well as DENV for comprehensive structure-activity relationship (SAR) analysis and target validation. $IC_{50}$ and $CC_{50}$ values for compound C10 were determined in established virological assays (Table 1). These experiments lead to the verification of the flaviviral capsid protein as target structure for compound C10 and revealed active sites in C10. Further, said experiments underline the specificity of compound C10 for flaviviruses. Finally, C10 derivatives with superior antiviral activity as compared to C10 were identified.

Example 12

Effect of C10 on Zebrafish Development and Hematopoietic Stem Cell Formation

Finally, in vivo experiments were conducted wherein C10 was tested in experiments using Zebrafish embryos.

Embryos were exposed 20-30 min after fertilization to differing concentrations of the compounds C10 and D1 (5 µM; 15 µM; 25 µM) or to medium containing the corresponding solvent (DMSO) concentration. Therefore, 3-5 embryos were sorted into each of three wells of a 96 well plate containing 200 µl of medium. For phenotype analysis, triplicates were imaged after 6-7 h post fertilization (hpf) at approximately shield stage, after 24 hpf and after 48 hpf. Dead+unfertilized embryos were removed. For imaging at 24 hpf +48 hpf; embryos were anesthetized using MESAB. To additionally elucidate the influence on hematopoietic stem cell formation, approx. half of the embryos were sampled at 36 hpf and an in situ for runx-1+c-myb was performed. Indomethacin serves as positive control as a substance impairing stem cell differentiation.

Figure 17A:
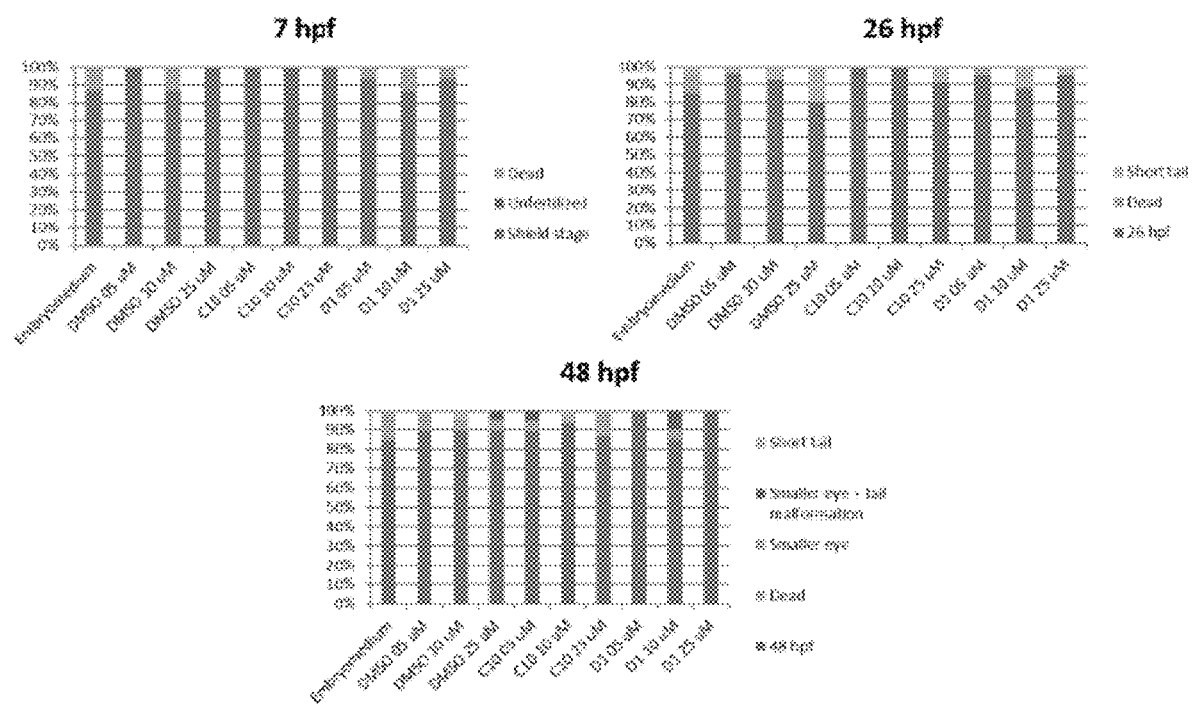
Figure 17B:
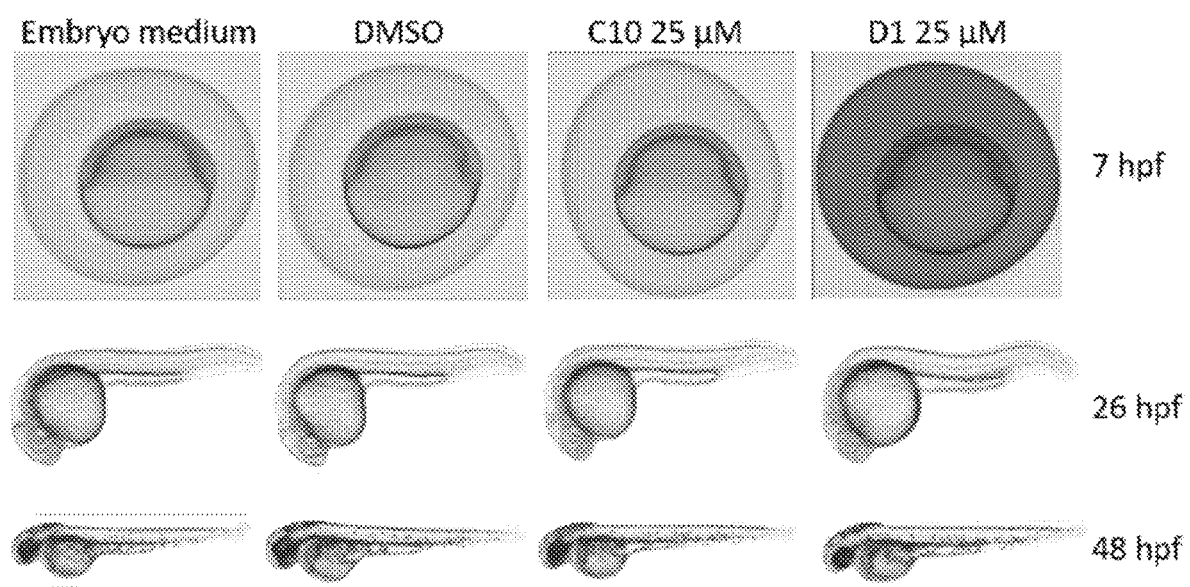

Phenotype analysis showed no influence on early embryonic development (6-7 hpf) in any of the control or treated samples during early development. Most of the embryos showed normal development after 24 hpf. Some embryos exhibited a shorter tail, which indicates a small delay in development. But as this was also seen in the controls, this can be attributed to variance in development; therefore no drug specific toxicity was observed at 24 hpf. After 48 hpf, most of the embryos continued to exhibited normal development. Although some embryos exhibited smaller eyes and/or tails, this can again mainly be attributed to variance in development. Therefore no drug specific toxicity was observed at 48 hpf. (FIGS. 17A and B).

Figure 17C:
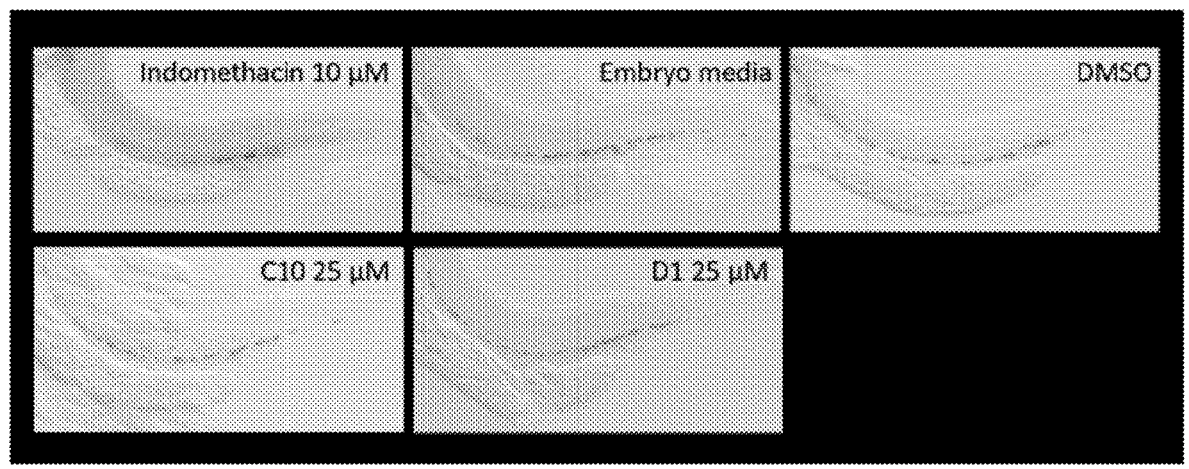

Hematopoietic stem cell analysis showed that during normal development, the hematopoietic stem cells form a clear line of cells dorsally of the yolk sac extension, stretching into the tail region. They are normally distributed uniformly along the axis in untreated embryos. In embryos treated with either the solvent DMSO, the inhibitor C10 or D1, no difference to the WT embryos was seen (FIG. 17C).

Example 13

Pharmacokinetic Study of C10 in Balb/c Mice Following Intravenous and Peroral Administration Furthermore, some important pharmacokinetic characteristics of C10 were tested in Balb/c mice following peroral (PO) and intravenous (IV) administration, as well as stability in mouse liver microsomes and mouse plasma (cf. Examples 13 to 15). The results indicated that C10 was non-cytotoxic and mice tolerated IV application of the compound in a concentration of 5 mg/kg. Half-life in plasma after IV administration was rather short (approx. 2 h), while microsomal and plasma stability was good in comparison with the standards used.

Study objective

The purpose of this study was to determine the pharmacokinetic characteristics of compound C10 in Balb/c mice following peroral (PO) and intravenous (IV) administration. Levels of compound C10 were determined by LC-MS/MS in blood plasma over time after a single dose.

Materials and methods

Reagents and consumables

DMSO Chromasolv Plus, HPLC grade, >99.7% (Sigma-Aldrich, USA; Cat #34869) Kolliphor HS 15 (Sigma-Aldrich, USA; Cat #42966)

Polyethylene glycol (PEG) 400 (PEG400) (BerTek Chemical, Turkey; Cat# 25322-68-3)

Physiological saline (Pharmaceutical Firm "Yuria-Pharm", Ukraine, Cat # AA1807/1)

Dextrose, assay grade 99% (Reggie's Reagents, CAS 50-99-7)

Cremophor EL (Acros, Thermo Fisher Scientific, Belgium; Cat#397282500)

D-mannitol, >98% (Sigma-Aldrich, USA; Cat #M4125)

Acetonitrile Chromasolv, gradient grade, for HPLC, >99.9% (Sigma-Aldrich, USA; Cat #34851)

Methanol Chromasolv Plus, for HPLC, >99.9% (Sigma-Aldrich, USA; Cat 34860)

Formic acid for mass spectrometry, ~98% (Fluka, USA; Cat #94318)

BD Microtainer® Blood Collection Tubes, K2EDTA, 0.5 ml (BD, USA; Ref# 365974)

2,2,2-Tribromoethanol 97% (Sigma-Aldrich; Cat # T48402)

Compound IS-02-03 was used as internal standard (IS)

Compound C10 was supplied as dry powder.

The compound was assessed for solubilization in 5 different vehicle recipes:
1. Physiological saline (0.9% NaCl solution in water)
2. Kolliphor HS—physiological saline (20%:80%)
3. DMSO-PEG400—physiological saline (20%:50%:30%)
4. PEG400—5% dextrose in water (75%:25%)
5. DMSO-Cremophor EL—5% Mannitol (10%:10%:80%)

Compound has very low solubility. Full dissolution at a concentration of 1 mg/ml was achieved only in dosing vehicle consisting of DMSO-PEG400 —physiological saline (20%:50%:30%).

To prepare the formulation using the DMSO-PEG400 —physiological saline (20%:50%:30%) recipe, the compound was first supplemented with the calculated volume of DMSO, vortexed for 1 minute and sonicated for 2 minutes at 40° C. Next, PEG400 and physiological saline were added. The final mixture was vortexed and sonicated for 2 minutes at 40° C. The working formulations batch was prepared for 1 h prior to the in vivo study.

Equipment

Gradient HPLC system VP (Shimadzu, Japan)

MS/MS detector API 3000 PE with TurbolonSpray Electrospray module (PE Sciex, USA)

VWR Membrane Nitrogen Generators N2-04-L1466, nitrogen purity 99%+(VWR, USA)

Water purification system NANOpure Diamond D11911 (Thermo Scientific Barnstead, USA)

Fixed Speed Vortex Mixer "IKA Lab Dancer" (IKA®-Werke GmbH & Co. KG, Germany; IP-40)

Centrifuge 4-15C (Qiagen) (Sigma, Germany)

Study Design

Study design, animal selection, handling and treatment were all in accordance with the study protocols and institutional animal care and use guidelines. Male Balb/c mice (9-10 weeks old, body weight 22.3 to 38.1 g and average body weight across all groups 31.4 g, SD=3.20 g) were used in this study. The animals were randomly assigned to the treatment groups before the pharmacokinetic study; all animals were fasted for 4 h before dosing. Six time points for PO (15, 30, 60, 120, 240 and 360 min) and IV (5, 15, 30, 60, 120 and 240 min) routes were used in this pharmacokinetic study. Each of the PO and IV time point treatment groups included 4 animals. There was also control group of 2 animals. Dosing was done according to the treatment schedules outlined in Table 3. Mice were injected IV with 2,2,2-tribromoethanol at the dose of 150 mg/kg prior to taking blood. Blood collection was performed from the orbital sinus in microtainers containing K₂EDTA. Animals were sacrificed by cervical dislocation after blood samples collection. All samples were immediately prepared, flash-frozen and stored at −70° C. until subsequent bioanalysis.

TABLE 3

Study design

| Number of Mice (male) | Compound | Formulation | Delivery Route | Target Dose Level (mg/kg) | Target Dose Conc. (mg/ml) | Target Dose Volume (ml/kg) |
|---|---|---|---|---|---|---|
| 24 | C10 | DMSO- | IV | 5 | 5 | 5 |
| 24 | C10 | PEG400- | PO | 10 | 5 | 10 |
| 1 | Vehicle dosed | physiological saline | IV | 0 | 0 | 5 |

TABLE 3-continued

<table>
<tr><td colspan="7">Study design</td></tr>
<tr><td>Number of Mice (male)</td><td>Compound</td><td>Formulation</td><td>Delivery Route</td><td>Target Dose Level (mg/kg)</td><td>Target Dose Conc. (mg/ml)</td><td>Target Dose Volume (ml/kg)</td></tr>
<tr><td>1</td><td>Vehicle dosed</td><td>(20%:50%:30%)</td><td>PO</td><td>0</td><td>0</td><td>10</td></tr>
</table>

Samples Processing Plasma samples (50 ml) were mixed with 200 ml of IS solution. After mixing by pipetting and centrifuging for 4 min at 6,000 rpm, 2 ml of each supernatant was injected into LC-MS/MS system. Solution of compound IS-02-03 (200 ng/ml in acetonitrile-methanol mixture, 1:1, v/v) was used as internal standard (IS) for quantification of C10 in plasma samples.

Samples Analysis The concentrations of C10 were determined using high performance liquid chromatography/tandem mass spectrometry (HPLC-MS/MS). Shimadzu H PLC system comprised of 2 isocratic pumps LC-10Advp, an autosampler SIL-HTc, a sub-controller FCV-14AH and a degasser DGU-14A. Mass spectrometric analysis was performed using an API 3000 (triple-quadrupole) instrument from AB Sciex (Canada) with an electro-spray (ESI) interface. The data acquisition and system control was performed using Analyst 1.5.2 software from AB Sciex.

HPLC-MS/MS Conditions

Chromatographic Conditions:

Column: Discovery C18 (50×2.1 mm, 5 mm)

Mobile phase A:Acetonitrile:Water:Formic acid=50: 950:1

Mobile phase B:Acetonitrile:Formic acid=100 : 0.1

Linear gradient: 0 min 15% B, 1.0 min 100% B, 1.01 min 10% B, 2.0 min stop

Elution rate: 400 mL/min. A divert valve directed the flow to the detector from 1.3 to 1.7 min Column temperature: 30° C.

MS/MS Detection:

Scan type: Positive MRM, Ion source: Turbo spray, Ionization mode: ESI

Nebulize gas: 15 L/min, Curtain gas: 8 L/min, Collision gas: 4 L/min

Ionspray voltage: 5000 V, Temperature: 400° C.

pipetting and centrifuging for 4 min at 6,000 rpm, 2 ml of each supernatant was injected into LCMS/MS system.

Method Validation Results

Figure 18:
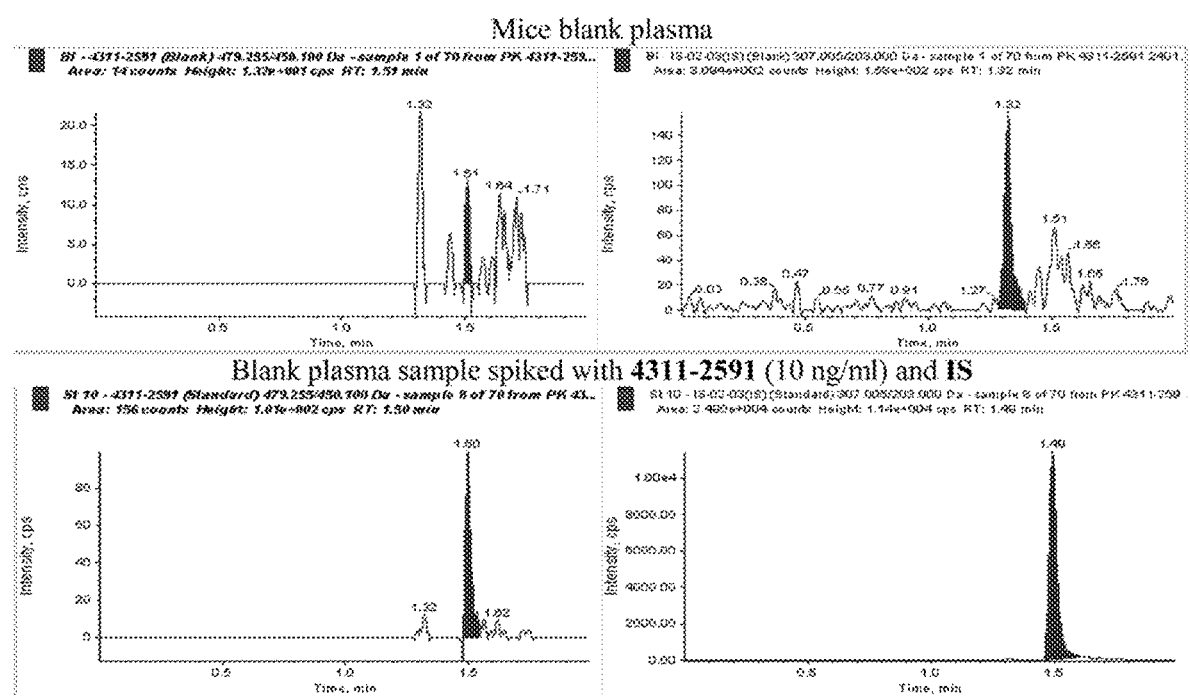

Specificity: FIG. 18 shows that mice blank plasma has no interference with compound C10 and IS.

Figure 19:
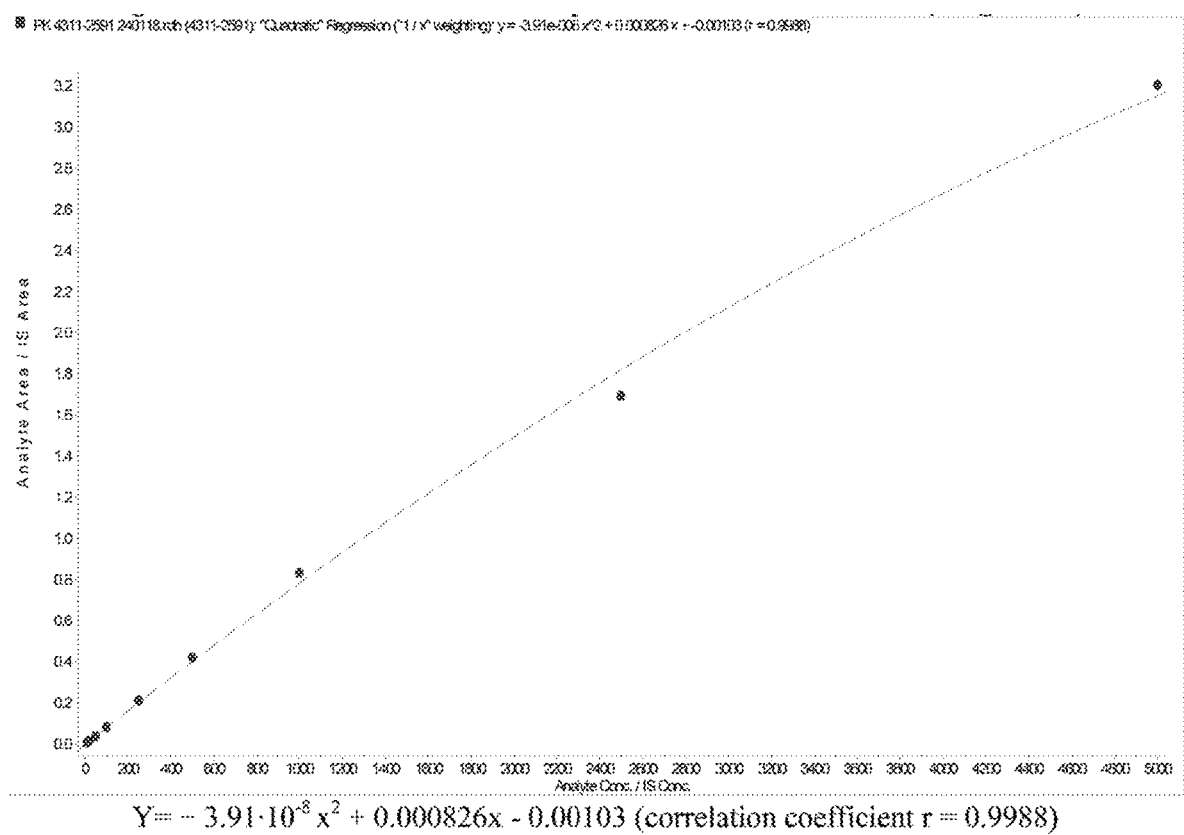

Calibration curve: The regression analysis of compound C10 was performed by plotting the peak area ratio (y) against the compound concentration in calibration solutions (x, ng/ml). The validity of the calibration curve (relationship between peak area and concentration of compound) is proved by the correlation coefficient (R) calculated for the quadratic regression (FIG. 19).

Pharmacokinetic Method Analysis

The concentrations of C10 in plasma samples below the lower limit of quantitation (LLOQ-10 ng/ml) were designated as zero. The pharmacokinetic data analysis was performed using non-compartmental, bolus injection or extravascular input analysis models in WinNonlin 5.2 (PharSight). Data below LLOQ were presented as missing to improve validity of T1/2 calculations. No outlier data points were removed from calculations. The bioavailability for the peroral route was calculated as:

$$F(\%) = \frac{\text{Dose}_{IV} \times AUC_{(0-\infty)PO}}{\text{Dose}_{PO} \times AUC_{(0-\infty)IV}} \times 100\%$$

Results and Discussion

Figure 20:
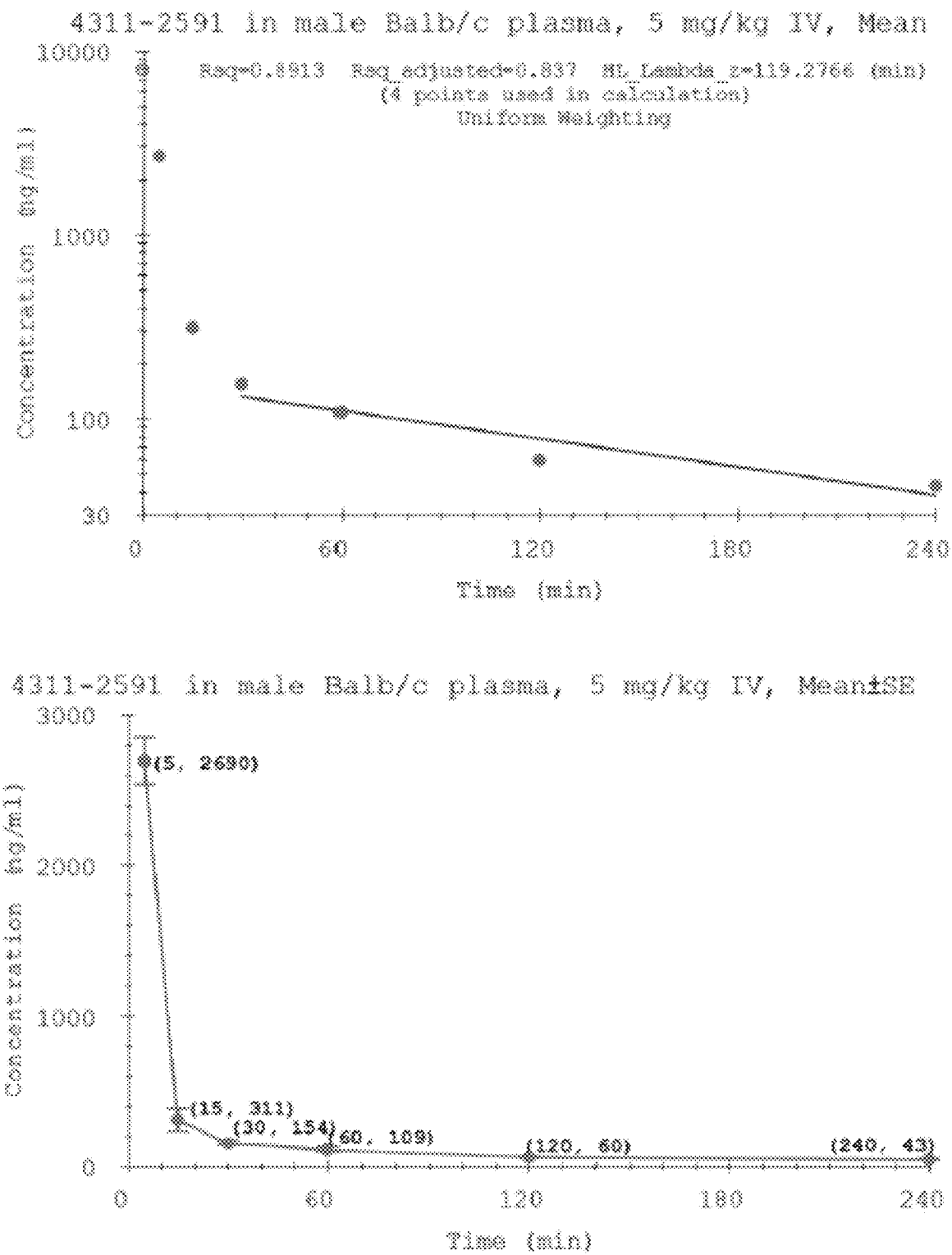

The individual and average C10 concentrations data in plasma for intravenously-and perorally-dosed groups are listed in the Tables below and graphically presented in FIG. 20.

TABLE 4

<table>
<tr><td colspan="8">Other MS parameters</td></tr>
<tr><td>Compound</td><td>Parent, m/z</td><td>Daughter, m/z</td><td>Time, ms</td><td>DP, V</td><td>FP, V</td><td>EP, V</td><td>CE, V</td><td>CXP, V</td></tr>
<tr><td>C10</td><td>479.255</td><td>450.1</td><td>60</td><td>71</td><td>350</td><td>11</td><td>39</td><td>26</td></tr>
<tr><td>IS-02-03</td><td>307.005</td><td>203.0</td><td>60</td><td>66</td><td>190</td><td>11</td><td>41</td><td>14</td></tr>
</table>

Preparation of Calibration Standards for Quantification of C10

Calibration standards for quantification of C10 in blood plasma. The compound C10 was dissolved in DMSO, and resulting solution with concentration of 1 mg/ml was used for calibration standards preparation (stock solution). 11 calibration standards were prepared by serial dilution of stock compound solution with blank mouse plasma to a final concentration of 20 000, 10 000, 5 000, 2 500, 1 000, 500, 250, 100, 50, 20 and 10 ng/ml. Standard plasma samples (50 ml) were mixed with 200 ml of IS solution. After mixing by

TABLE 5

<table>
<tr><td colspan="7">Plasma concentrations of compound C10 in male Balb/c mice following intravenous (5 mg/kg) administration</td></tr>
<tr><td>Sample collection</td><td colspan="6">Plasma concentration (ng(ml)</td></tr>
<tr><td>time point, min</td><td>Group A</td><td>Group B</td><td>Group C</td><td>Group D</td><td>Mean</td><td>SD</td><td>SE</td></tr>
<tr><td>0</td><td>0</td><td></td><td></td><td></td><td>0</td><td></td><td></td></tr>
<tr><td>5</td><td>2780</td><td>2310</td><td>2606</td><td>3063</td><td>2690</td><td>316</td><td>158</td></tr>
</table>

TABLE 5-continued

Plasma concentrations of compound C10 in male Balb/c mice following intravenous (5 mg/kg) administration

| Sample collection time point, min | Plasma concentration (ng(ml) | | | | | | |
|---|---|---|---|---|---|---|---|
| | Group A | Group B | Group C | Group D | Mean | SD | SE |
| 15 | 185 | 316 | 521 | 221 | 311 | 151 | 75 |
| 30 | 109 | 152 | 189 | 164 | 154 | 33 | 17 |
| 60 | 93 | 160 | 89 | 92 | 109 | 34 | 17 |
| 120 | 69 | 44 | 59 | 67 | 60 | 11 | 6 |
| 240 | 47 | 43 | 40 | 43 | 43 | 3 | 1 |

Selected pharmacokinetic parameters for compound C10 in male Balb/c mice following intravenous (5 mg/kg) administration

| Animal | Admin-istration | Dose, mg/kg | Tmax, min | Cmax, ng/ml | $AUC_{0 \to t = 240\,min}$ (AUClast), ng*min/ml | $AUC_{0 \to \infty}$ (AUCINF_obs), ng*min/ml | $T_{1/2}$ (HL_Lambda_z), min | $K_{el}$ (Lambda_z), min | MRT (MRTlast), min | MRT (MRTinf), min | $V_d$ (Vz_obs), ml/kg | CL (Cl_obs), ml/min/kg |
|---|---|---|---|---|---|---|---|---|---|---|---|---|
| Mice | IV | 5 | 5.00 | 2690 | 53500 | 60900 | 119 | 0.00581 | 35.4 | 81.4 | 14100 | 82.1 |

TABLE 7

Plasma concentrations of compound C10 in male Balb/c mice following peroral (10 mg/kg) administration

| Sample collection time point, min | Plasma concentration (ng(ml) | | | | | | |
|---|---|---|---|---|---|---|---|
| | Group A | Group B | Group C | Group D | Mean | SD | SE |
| 0 | 0 | | | | 0 | | |
| 15 | 0 | 0 | 0 | 0 | 0 | 0 | 0 |
| 30 | 0 | 0 | 0 | 0 | 0 | 0 | 0 |
| 60 | 0 | 0 | 0 | 0 | 0 | 0 | 0 |
| 120 | 0 | 0 | 0 | 0 | 0 | 0 | 0 |
| 240 | 0 | 0 | 0 | 0 | 0 | 0 | 0 |
| 360 | 0 | 0 | 0 | 0 | 0 | 0 | 0 |

TABLE 8

Selected pharmacokinetic parameters for compound C10 in male Balb/c mice following peroral (10 mg/kg) administration

| Animal | Admin-istration | Dose, mg/kg | Tmax, min | Cmax, ng/ml | $AUC_{0 \to t = 240\,min}$ (AUClast), ng*min/ml | $AUC_{0 \to \infty}$ (AUCINF_obs), ng*min/ml | $T_{1/2}$ (HL_Lambda_z), min | $K_{el}$ (Lambda_z), min | MRT (MRTlast), min | MRT (MRTinf), min | $V_d$ (Vz_obs), ml/kg | CL (Cl_obs), ml/min/kg |
|---|---|---|---|---|---|---|---|---|---|---|---|---|
| Mice | PO | 10 | N/A* | N/A* | N/A* | N/A* | N/A* | N/A* | N/A* | N/A* | N/A* | N/A* |

Figure 21:
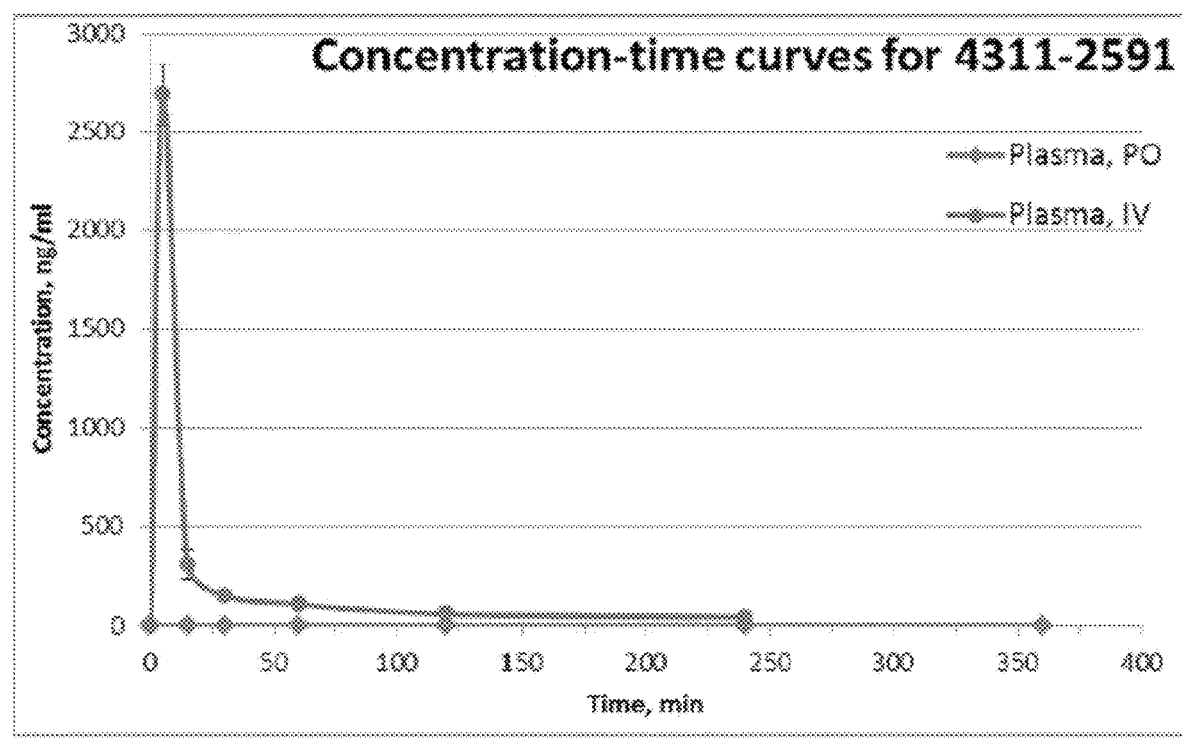

*Not available—Pharmacokinetic parameters cannot be calculated, due to zero plasma levels of C10 following PO dosing Conclusions:

The pharmacokinetic parameters for C10 in blood plasma are shown in the tables above (Tables 6 and 8). Plasma levels of C10 following PO dosing were below the lower limit of quantitation. The zero value of oral bioavailability could be explained by instability of the substance in the gastrointestinal tract, high hydrophilicity, which prevents penetration through lipid cell-membranes, or other properties of the compound. Calculated volume of distribution is 14.1 L/kg and suggests a substantial distribution of the compound into peripheral tissues. FIG. 21 summarizes the results of the PK study for compound C10 in mice.

Example 14

Analysis of Stability in Mouse Plasma for Compound C10

Study Objective

Determining plasma stability of compound C10 and 2 reference compounds (Verapamil and Propantheline) at five time points over 120 minutes using HPLC-MS/MS. Plasma stability is defined as the percentage of parent compound remaining in plasma over the time.

Materials

Reagents and Consumables

DMSO Chromasolv Plus, HPLC grade, >99.7% (Sigma-Aldrich, USA; Cat #34869)

Acetonitrile Chromasolv, gradient grade, for HPLC, >99.9% (Sigma-Aldrich, USA; Cat #34851)

Formic acid for mass spectrometry, ~98% (Fluke) (Sigma-Aldrich, USA; Cat #94318)

Propantheline bromide >97% (TLC), powder (Sigma-Aldrich, USA; P8891)

Verapamil hydrochloride (Sigma Aldrich, USA; Cat #V4629)

Non-sterile mouse plasma with heparin (MPH07-0500, Equitech-Bio, Inc.)

Disposable pipette tips (Thermo Scientific, USA)

Discovery C18 column 2.1×50 mm, 5 μm (Supelco HPLC Columns, Sigma, USA; Cat # 50494721)

1,1 ml microtubes in multiracks (National Scientific Supply Co, USA; Cat # TN0946-12R)

DMSO stock solutions of the test compounds at 10mM

Equipment

Gradient HPLC system VP (Shimadzu, Japan)

MS/MS detector API 3000 PE with TurbolonSpray Electrospray module (PE Sciex, USA)

VWR Membrane Nitrogen Generators N2-04-L1466, nitrogen purity 99%+(VWR, USA)

Innova 4080 Incubator Shaker (New Brunswick Scientific, USA)

Centrifuge 4-15C (Qiagen) (Sigma, Germany)

Water purification system NANOpure Diamond D11911 (Thermo Scientific Barnstead, USA)

Multichannel Electronic Pipettes 2-125 µL, 5-250 µL, 15-1250 µL, Matrix (Thermo Scientific, USA; Cat ## 2001, 2002, 2004)

Analytical System

All measurements were performed using Shimadzu VP HPLC system including vacuum degasser, gradient pumps, reverse phase column, column oven and autosampler. The HPLC system was coupled with tandem mass spectrometer API 3000 (PE Sciex). Both the positive and negative ion modes of the TurbolonSpray ion source were used. Acquisition and analysis of the data were performed using Analyst 1.5.2 software (PE Sciex).

Methods

Incubations were carried out in 5 aliquots of 70 µL each (one for each time point), in duplicates. Test compounds (1 µM, final DMSO concentration 1%) were incubated at 37° C. with shaking at 100 rpm. Five time points over 120 minutes have been analyzed. The reactions were stopped by adding 420 µL of acetonitrile-water mixture (90:10) with subsequent plasma proteins sedimentation by centrifuging at 5500 rpm for 5 minutes. Supernatants were analyzed by the HPLC system coupled with tandem mass spectrometer. The percentage of the test compounds remaining after incubation in plasma and their half-lives ($T_{1/2}$) were calculated.

Results and Discussion

Figure 22:
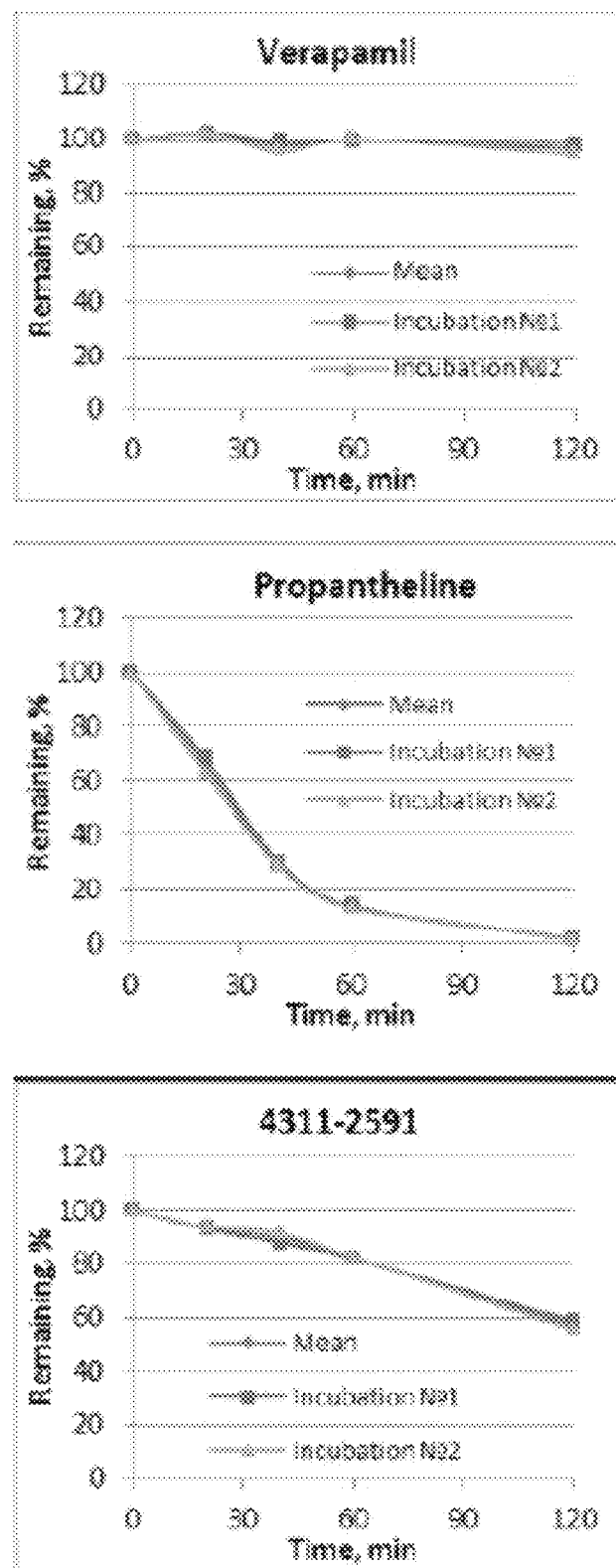

Plasma stability data for test and reference compounds are provided in the Table below. Plots are shown in FIG. 22 (Compound 4311-2591 shown therein is Compound C10).

TABLE 9

Mouse plasma stability data

| Compound ID | Time, min | Analyte Peak Area Inc. 1 | Analyte Peak Area Inc. 2 | Mean Analyte Peak Area | % Remain. Mean | $T_{1/2}$, min |
|---|---|---|---|---|---|---|
| Verapamil | 0 | 2.17E+04 | 2.22E+04 | 2.20E+04 | 100 | >240 |
|  | 20 | 2.22E+04 | 2.27E+04 | 2.24E+04 | 102 |  |
|  | 40 | 2.15E+04 | 2.12E+04 | 2.14E+04 | 97 |  |
|  | 60 | 2.16E+04 | 2.22E+04 | 2.19E+04 | 100 |  |
|  | 120 | 2.13E+04 | 2.10E+04 | 2.12E+04 | 96 |  |
| Pro-pantheline | 0 | 1.80E+05 | 1.83E+05 | 1.82E+05 | 100 | 20 |
|  | 20 | 1.23E+05 | 1.15E+05 | 1.19E+05 | 66 |  |
|  | 40 | 5.40E+04 | 5.16E+04 | 5.28E+04 | 29 |  |
|  | 60 | 2.44E+04 | 2.37E+04 | 2.40E+04 | 13 |  |
|  | 120 | 3.18E+03 | 2.90E+03 | 3.04E+03 | 2 |  |

TABLE 9-continued

Mouse plasma stability data

| Compound ID | Time, min | Analyte Peak Area Inc. 1 | Analyte Peak Area Inc. 2 | Mean Analyte Peak Area | % Remain. Mean | $T_{1/2}$, min |
|---|---|---|---|---|---|---|
| C10 | 0 | 2.88E+04 | 2.93E+04 | 2.90E+04 | 100 | 221 |
|  | 20 | 2.68E+04 | 2.75E+04 | 2.72E+04 | 93 |  |
|  | 40 | 2.52E+04 | 2.68E+04 | 2.60E+04 | 90 |  |
|  | 60 | 2.36E+04 | 2.42E+04 | 2.39E+04 | 82 |  |
|  | 120 | 1.69E+04 | 1.62E+04 | 1.66E+04 | 57 |  |

Conclusions:

Compound C10 showed good stability in mouse plasma.

Example 15

Assessment of Metabolic Stability in Mouse Liver Microsomes for Compound C10

Study Objective

Determining metabolic stability of compound C10 and 2 reference compounds (Imipramine and Propranolol) in mouse liver microsomes at five time points over 40 minutes using HPLC-MS. Metabolic stability is defined as the percentage of parent compound lost over time in the presence of a metabolically active test system.

Materials

Reagents and Consumables
DMSO (Sigma-Aldrich, 34869-Chromasolv Plus, for HPLC, >99.7%)
Acetonitrile (Sigma-Aldrich, 34851-Chromasolv Plus, for HPLC, >99.9%)
Potassium phosphate monobasic (Helicon, Am-O781-0.5)
Potassium phosphate dibasic (Helicon, Am-O705-0.5)
Magnesium chloride hexahydrate (Helicon, Am-O288-0.1)
Microsomes from liver, pooled, male BALB/c mice
Glucose-6-phosphate dehydrogenase from baker's yeast, type XV (Sigma-Aldrich, G6378)
Glucose-6-phosphate sodium salt (Sigma-Aldrich, G7879)
b-Nicotinamide adeninedinucleotide-2'-phosphate reduced, tetrasodium salt (Santa Cruz Biotechnology, Inc., sc-202725A)
Formic acid (Sigma-Aldrich, 94318)
DMSO stock solutions of the tested compound(s) 10 mM
(+,−) Propranolol hydrochloride (Sigma-Aldrich, P0884)
Imipramine hydrochloride (Sigma-Aldrich, I7379)
Discovery C18 (50×2.1 mm, 5 mm)
1.1 ml microtubes in microracks, pipettor tips (Thermo Scientific).

Equipment
Gradient HPLC system VP (Shimadzu)
MS/MS detector API 3000 with TurbolonSpray Electrospray module (PE Sciex, USA)
Nitrogen generator N2-04-L1466, nitrogen purity 99%+ (Whatman)
Environmental Incubator Shaker G24; Digital Refrigerated Incubator/Shaker Innova 4330 (New Brunswick Scientific)
Water purification system NANOpure Diamond D11911 (Barnstead)

Multichannel pipettors 5-250 µL, 2-125 µL, 15-1250 µL (Thermo Scientific)

Analytical System

All measurements were performed using Shimadzu VP HPLC system including vacuum degasser, gradient pumps, reverse phase HPLC column, column oven and autosampler. The HPLC system was coupled with tandem mass spectrometer API 3000 (PE Sciex). The TurbolonSpray ion source was used in both positive and negative ion modes. Acquisition and analysis of the data were performed using Analyst 1.5.2 software (PE Sciex).

Methods

Mouse hepatic microsomes were isolated from pooled (50), perfused livers of Balb/c male mice according to the standard protocol. The batch of microsomes was tested for quality control using Imipramine, Propranolol and Verapamil as reference compounds.

Microsomal incubations were carried out in 96-well plates in 5 aliquots of 40 mL each (one for each time point). Liver microsomal incubation medium contained PBS (100 mM, pH 7.4), $MgCl_2$ (3.3 mM), NADPH (3 mM), glucose-6-phosphate (5.3 mM), glucose-6-phosphate dehydrogenase (0.67 units/ml) with 0.42 mg of liver microsomal protein per ml. Control incubations were performed replacing the NADPH-cofactor system with PBS. Test compound (2 mM, final solvent concentration 1.6%) was incubated with microsomes at 37° C., shaking at 100 rpm. Incubations were performed in duplicates. Five time points over 40 minutes had been analyzed. The reactions were stopped by adding 12 volumes of 90% acetonitrile-water to incubation aliquots, followed by protein sedimentation by centrifuging at 5500 rpm for 3 minutes. Incubations were performed in duplicates. Supernatants were analyzed using the HPLC system coupled with tandem mass spectrometer.

The elimination constant (kel), half-life (t½) and intrinsic clearance (Clint) were determined in plot of ln(AUC) versus time, using linear regression analysis (In order to indicate the quality of the linear regression analysis, the R (correlation coefficient) values are provided. In some cases, the last time point is excluded from the calculations to ensure acceptable logarithmic linearity of decay):

$$k_{el} = -\text{slope}$$

$$t_{1/2} = \frac{0.693}{k}$$

$$Cl_{int} = \frac{0.693}{t_{1/2}} \times \frac{\mu l_{incubation}}{mg_{microsomes}}$$

Results and Discussion

Figure 23:
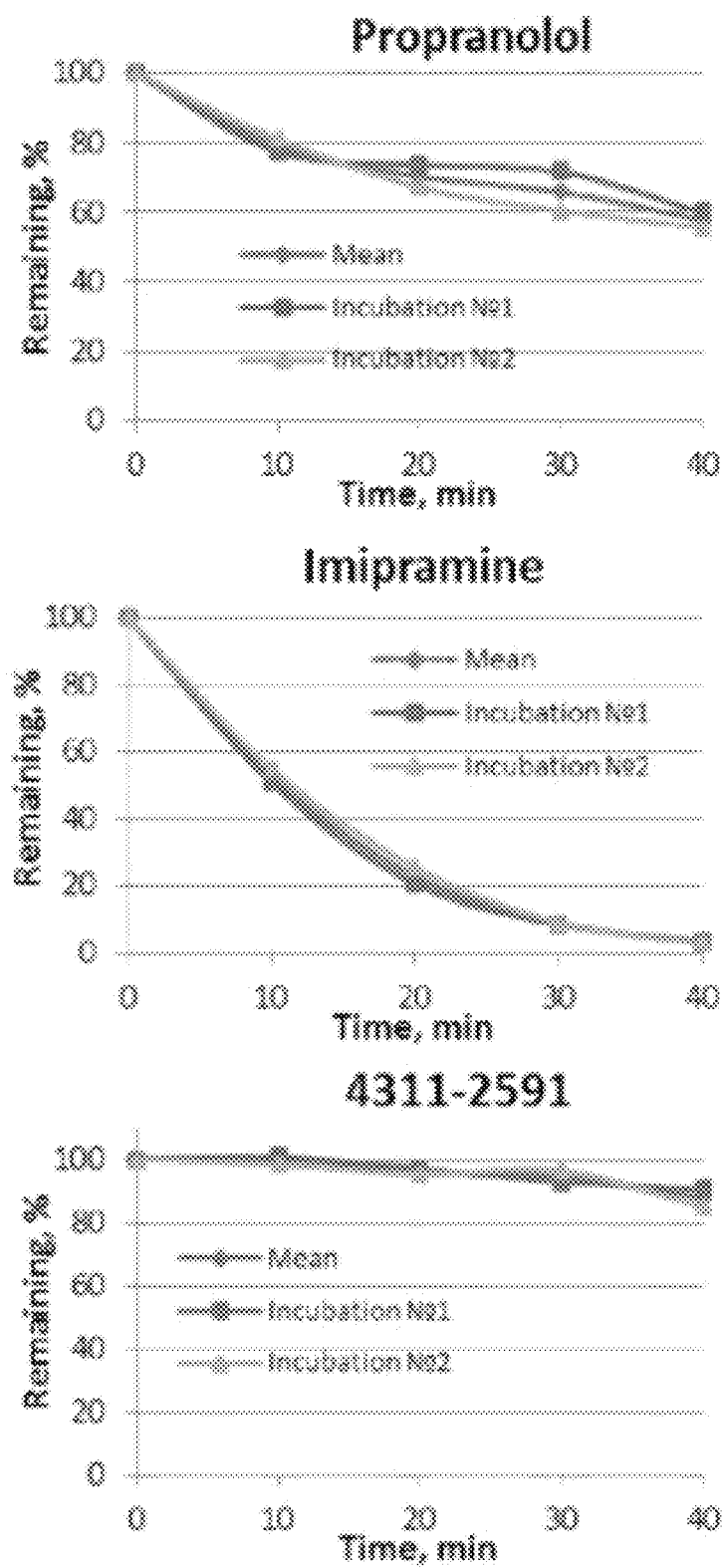

Mouse microsomal stability data for test compound C10 and 2 reference (Imipramine and Propranolol) compounds are provided in the table below (Table 10). Plots are shown in FIG. 23 (Compound 4311-2591 shown therein is Compound C10).

TABLE 10

Mouse microsomal stability data

| Compound ID | Time, min | Analyte Peak Area Inc. 1 | Analyte Peak Area Inc. 2 | Analyte Peak Area, Mean of 2 | % Remain. Mean of 2 | R | $K_{el}$, $min^{-1}$ | $t_{1/2}$, min | $Cl_{int}$, µl/min/mg | % Remain. without cofactor, Mean of 2 |
|---|---|---|---|---|---|---|---|---|---|---|
| Propranolol | 0 | 1.55E+04 | 1.64E+04 | 1.60E+04 | 100 | 0.977 | 0.013 | 53.9 | 31 | 100 |
|  | 10 | 1.20E+04 | 1.33E+04 | 1.26E+04 | 79 |  |  |  |  |  |
|  | 20 | 1.14E+04 | 1.10E+04 | 1.12E+04 | 70 |  |  |  |  |  |
|  | 30 | 1.11E+04 | 9.91E+03 | 1.05E+04 | 66 |  |  |  |  |  |
|  | 40 | 9.28E+03 | 9.12E+03 | 9.20E+03 | 58 |  |  |  |  | 98 |
| Imipramine | 0 | 1.94E+05 | 1.80E+05 | 1.87E+05 | 100 | 0.996 | 0.087 | 8.0 | 209 | 100 |
|  | 10 | 9.85E+04 | 9.91E+04 | 9.88E+04 | 53 |  |  |  |  |  |
|  | 20 | 4.10E+04 | 4.59E+04 | 4.30E+04 | 23 |  |  |  |  |  |
|  | 30 | 1.65E+04 | 1.65E+04 | 1.65E+04 | 9 |  |  |  |  |  |
|  | 40 | 6.69E+03 | 5.31E+03 | 6.00E+03 | 3 |  |  |  |  | 91 |
| C10 | 0 | 3.07E+04 | 3.06E+04 | 3.06E+04 | 100 | 0.967 | 0.002 | 347.7 | 5 | 100 |
|  | 10 | 3.09E+04 | 3.01E+04 | 3.05E+04 | 100 |  |  |  |  |  |
|  | 20 | 2.98E+04 | 2.92E+04 | 2.95E+04 | 96 |  |  |  |  |  |
|  | 30 | 2.85E+04 | 2.95E+04 | 2.90E+04 | 95 |  |  |  |  |  |
|  | 40 | 2.87E+04 | 2.60E+04 | 2.69E+04 | 88 |  |  |  |  | 86 |

Conclusion:

The compound C10 exhibits good stability in a mouse hepatic microsomal test system.

All publications, patents, patent applications and other documents cited in this application are hereby incorporated by reference in their entireties for all purposes to the same extent as if each individual publication, patent, patent application or other document were individually indicated to be incorporated by reference for all purposes.

The invention claimed is:

1. A method for treating er preventing a viral infection cause by an RNA virus in a subject, comprising, providing to the subject a compound according to Formula (I)

(I)

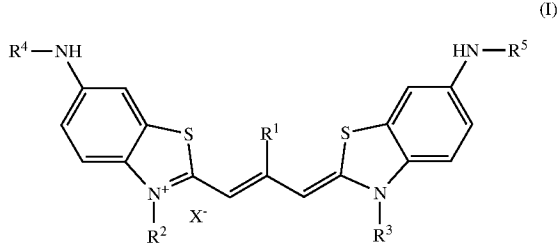

wherein
$R^1$ is H or methyl,
$R^2$ is methyl or ethyl,
$R^3$ is methyl or ethyl, R[4] is H, acetyl, propionyl, benzoyl, cyclopropionyl, or methylsulfonyl, R[5] is H, acetyl, propionyl, benzoyl, cyclopropionyl, or methylsulfonyl, and X− is a monovalent anion.

2. The method according to claim 1, wherein R[4] and R[5] is acetyl.

3. The method according to claim 1, wherein said compound is selected from the group consisting of (Compound C10)

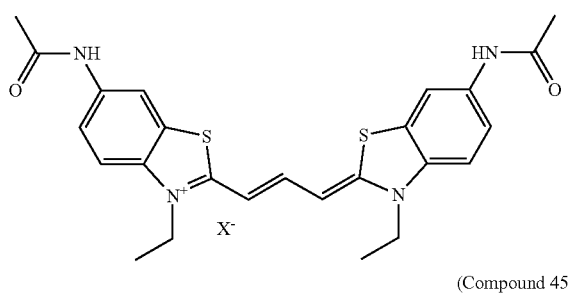

(Compound 45)

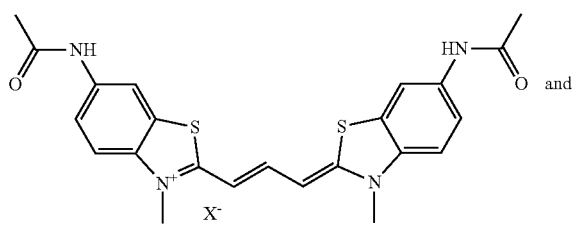

and (Compound 46)

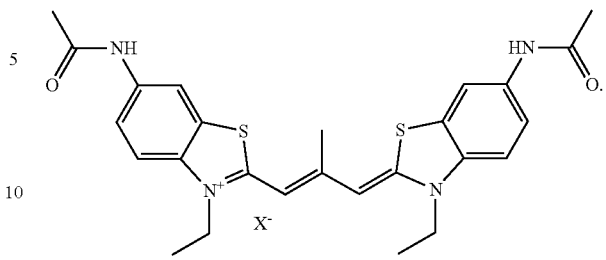

4. The method according to claim 3, wherein said compound is Compound C10.

5. The method according to claim 1, wherein X− is selected from the group consisting of I−, Cl−, tosylate, and mesylate.

6. The method according to claims 1, wherein said viral infection is caused by a single-stranded positive-sense RNA (ssRNA (+)) virus.

7. The method according to claim 6, wherein the ssRNA (+) virus is a member of the family Flaviviridae.

8. The method according to claim 7, wherein the ssRNA (+) virus is a member of the genus *Hepacivirus* or the genus *Flavivirus*.

9. The method according to claim 8, wherein said virus is selected from the group consisting of Hepatitis C virus (HCV), Dengue virus (DENV), Zika virus (ZIKV), West-Nile virus (WNV), Kunjin virus (KUNV), Tick-borne encephalitis virus (TBEV), Japanese encephalitis virus (JEV), Saint Louis encephalitis virus (SLEV), and Yellow fever virus (YFV).

10. The method according to claim 1, wherein the subject is a human subject.

* * * * *